(12) United States Patent
Welch et al.

(10) Patent No.: US 11,467,408 B2
(45) Date of Patent: Oct. 11, 2022

(54) VIRTUAL AND AUGMENTED REALITY SYSTEMS AND METHODS

(71) Applicant: Magic Leap, Inc., Plantation, FL (US)

(72) Inventors: William Hudson Welch, Fort Lauderdale, FL (US); Paul M. Greco, Parkland, FL (US); Rony Abovitz, Weston, FL (US); Yonatan Munk, Fort Lauderdale, FL (US); Samuel A. Miller, Hollywood, FL (US)

(73) Assignee: Magic Leap, Inc., Plantation, FL (US)

( * ) Notice: Subject to any disclaimer, the term of this patent is extended or adjusted under 35 U.S.C. 154(b) by 206 days.

(21) Appl. No.: 16/904,423

(22) Filed: Jun. 17, 2020

(65) Prior Publication Data
US 2020/0319466 A1 Oct. 8, 2020

Related U.S. Application Data

(62) Division of application No. 15/469,369, filed on Mar. 24, 2017, now Pat. No. 10,698,215.
(Continued)

(51) Int. Cl.
*G02B 27/01* (2006.01)
*F21V 8/00* (2006.01)

(52) U.S. Cl.
CPC ....... *G02B 27/0172* (2013.01); *G02B 6/0076* (2013.01); *G02B 27/0179* (2013.01);
(Continued)

(58) Field of Classification Search
CPC ... A61B 3/113; A61B 3/12; A61B 2562/0204; A61B 2562/0219; A61B 2562/0247;
(Continued)

(56) References Cited

U.S. PATENT DOCUMENTS 6,388,639 B1   5/2002   Hoshino et al.
6,850,221 B1   2/2005   Tickle
(Continued)

FOREIGN PATENT DOCUMENTS

EP   0 849 959   6/1998
EP   3 109 689   12/2016
(Continued)

OTHER PUBLICATIONS

US 10,481,681 B2, 11/2019, Mor (withdrawn)
(Continued)

*Primary Examiner* — Brandi N Thomas
(74) *Attorney, Agent, or Firm* — Knobbe, Martens, Olson & Bear, LLP

(57) ABSTRACT

Methods and systems are disclosed for presenting virtual objects on a limited number of depth planes using, e.g., an augmented reality display system. A farthest one of the depth planes is within a mismatch tolerance of optical infinity. The display system may switch the depth plane on which content is actively displayed, so that the content is displayed on the depth plane on which a user is fixating. The impact of errors in fixation tracking is addressed using partially overlapping depth planes. A fixation depth at which a user is fixating is determined and the display system determines whether to adjust selection of a selected depth plane at which a virtual object is presented. The determination may be based on whether the fixation depth falls within a depth overlap region of adjacent depth planes. The display system may switch the active depth plane depending upon whether the fixation depth falls outside the overlap region.

20 Claims, 29 Drawing Sheets

Related U.S. Application Data

(60) Provisional application No. 62/313,698, filed on Mar. 25, 2016, provisional application No. 62/378,109, filed on Aug. 22, 2016.

(52) U.S. Cl.
CPC .............. *G02B 2027/0127* (2013.01); *G02B 2027/0185* (2013.01)

(58) Field of Classification Search
CPC ..... A61B 3/0008; A61B 3/0025; A61B 3/005; A61B 3/022; A61B 3/024; A61B 3/028; A61B 3/063; A61B 3/066; A61B 3/08; A61B 3/085; A61B 3/10; A61B 3/1005; A61B 3/101; A61B 3/1015; A61B 3/102; A61B 3/1035; A61B 3/1216; A61B 3/1241; A61B 3/13; A61B 3/14; A61B 3/165; A61B 5/0059; A61B 5/0066; A61B 5/0077; A61B 5/01; A61B 5/14532; A61B 5/1455; A61B 5/14555; A61B 5/361; A61B 5/369; A61B 5/398; A61B 5/6803; A61B 8/10; A61B 8/461; A61B 5/12; A61B 3/111; A61B 2562/0238; A61B 2562/04; A61B 3/0033; A61B 3/0058; A61B 3/0091; A61B 3/032; A61B 3/09; A61B 3/103; A61B 3/112; A61B 3/135; A61B 3/16; A61B 5/14552; A61B 5/4064; A61B 8/4483; A61B 8/5207; A61B 2090/365; A61B 3/107; G02B 27/0172; G02B 2027/0138; G02B 27/0093; G02B 2027/0185; G02B 27/0179; G02B 2027/014; G02B 21/0032; G02B 2027/0187; G02B 2027/0134; G02B 2027/0178; G02B 27/017; G02B 6/0076; G02B 2027/0127; G02B 27/0176; G02B 27/0081; G02B 2027/0174; G02B 30/40; G02B 2027/0181; G02B 6/005; G02B 2027/0123; G02B 2027/0112; G02B 21/0028; G02B 21/0076; G02B 6/0035; G02B 2027/012; G02B 2027/0154; G02B 2027/0159; G02B 25/001; G02B 27/0018; G02B 27/0149; G02B 30/24; G02B 30/34; G02B 30/52; G02B 5/201; G02B 6/0011; G02B 6/0023; G02B 6/0065; G02B 6/2706; G02B 2027/011; G02B 6/0013; G02B 30/00; G02B 30/27; G02B 6/00; G02B 2027/0156; G02B 2027/0158; G02B 2027/0194; G02B 26/0808; G02B 26/0833; G02B 27/0101; G02B 27/0927; G02B 27/0944; G02B 27/0977; G02B 6/003; G02B 27/01; G02B 6/0026; G02B 6/0031; G02B 6/0066; B32B 17/10036; B32B 17/1022; B32B 17/10614; B32B 17/10761; B32B 17/10788; B32B 2307/406; B32B 2307/416

See application file for complete search history.

(56) References Cited

U.S. PATENT DOCUMENTS

| | | |
|---|---|---|
| D514,570 S | 2/2006 | Ohta |
| 8,437,513 B1 | 5/2013 | Derakhshani et al. |
| 8,950,867 B2 | 2/2015 | Macnamara |
| 8,976,110 B2 | 3/2015 | Eskilsson et al. |
| 9,081,426 B2 | 7/2015 | Armstrong |
| 9,207,760 B1 | 12/2015 | Wu et al. |
| 9,215,293 B2 | 12/2015 | Miller |
| D752,529 S | 3/2016 | Loretan et al. |
| 9,310,559 B2 | 4/2016 | Macnamara |
| 9,348,143 B2 | 5/2016 | Gao et al. |
| D758,367 S | 6/2016 | Natsume |
| D759,657 S | 7/2016 | Kujawski et al. |
| 9,417,452 B2 | 8/2016 | Schowengerdt et al. |
| 9,470,906 B2 | 10/2016 | Kaji et al. |
| 9,489,044 B2 | 11/2016 | Fateh |
| 9,547,174 B2 | 1/2017 | Gao et al. |
| 9,606,622 B1 | 3/2017 | Brothers et al. |
| 9,671,566 B2 | 6/2017 | Abovitz et al. |
| D794,288 S | 8/2017 | Beers et al. |
| 9,740,006 B2 | 8/2017 | Gao |
| 9,791,700 B2 | 10/2017 | Schowengerdt et al. |
| D805,734 S | 12/2017 | Fisher et al. |
| 9,851,563 B2 | 12/2017 | Gao et al. |
| 9,857,591 B2 | 1/2018 | Welch et al. |
| 9,874,749 B2 | 1/2018 | Bradski |
| 10,649,527 B2 | 5/2020 | Mor |
| 10,698,215 B2 | 6/2020 | Welch et al. |
| 2004/0130680 A1 | 7/2004 | Zhou et al. |
| 2006/0028436 A1 | 2/2006 | Armstrong |
| 2006/0140166 A1 | 6/2006 | Albulet |
| 2007/0081123 A1 | 4/2007 | Lewis |
| 2010/0118019 A1 | 5/2010 | Cases et al. |
| 2011/0075257 A1 | 3/2011 | Hua et al. |
| 2011/0085700 A1 | 4/2011 | Lee |
| 2011/0182469 A1 | 7/2011 | Ji et al. |
| 2011/0242661 A1 | 10/2011 | Simmonds |
| 2012/0127062 A1 | 5/2012 | Bar-Zeev et al. |
| 2012/0162549 A1 | 6/2012 | Gao et al. |
| 2013/0082922 A1 | 4/2013 | Miller |
| 2013/0117377 A1 | 5/2013 | Miller |
| 2013/0125027 A1 | 5/2013 | Abovitz |
| 2013/0135196 A1 | 5/2013 | Park et al. |
| 2013/0208234 A1 | 8/2013 | Lewis |
| 2013/0242262 A1 | 9/2013 | Lewis |
| 2013/0257709 A1 | 10/2013 | Raffle et al. |
| 2013/0300652 A1 | 11/2013 | Raffle et al. |
| 2013/0314793 A1 | 11/2013 | Robbins et al. |
| 2014/0071539 A1 | 3/2014 | Gao |
| 2014/0145914 A1 | 5/2014 | Latta et al. |
| 2014/0177023 A1 | 6/2014 | Gao et al. |
| 2014/0218468 A1 | 8/2014 | Gao et al. |
| 2014/0247210 A1 | 9/2014 | Henderek et al. |
| 2014/0267420 A1 | 9/2014 | Schowengerdt |
| 2014/0306866 A1 | 10/2014 | Miller et al. |
| 2014/0380249 A1 | 12/2014 | Fleizach |
| 2015/0016777 A1 | 1/2015 | Abovitz et al. |
| 2015/0029096 A1 | 1/2015 | Ishihara |
| 2015/0061999 A1 | 3/2015 | Kim et al. |
| 2015/0103306 A1 | 4/2015 | Kaji et al. |
| 2015/0178939 A1 | 6/2015 | Bradski et al. |
| 2015/0205126 A1 | 7/2015 | Schowengerdt |
| 2015/0222883 A1 | 8/2015 | Welch |
| 2015/0222884 A1 | 8/2015 | Cheng |
| 2015/0235435 A1 | 8/2015 | Miller et al. |
| 2015/0241967 A1 | 8/2015 | Saripalle et al. |
| 2015/0248169 A1 | 9/2015 | Abovitz et al. |
| 2015/0248170 A1 | 9/2015 | Abovitz et al. |
| 2015/0248788 A1 | 9/2015 | Abovitz et al. |
| 2015/0248793 A1 | 9/2015 | Abovitz et al. |
| 2015/0268415 A1 | 9/2015 | Schowengerdt et al. |
| 2015/0268720 A1 | 9/2015 | Kobayashi |
| 2015/0301599 A1 | 10/2015 | Miller |
| 2015/0302652 A1 | 10/2015 | Miller et al. |
| 2015/0309263 A2 | 10/2015 | Abovitz et al. |
| 2015/0326570 A1 | 11/2015 | Publicover et al. |
| 2015/0338915 A1 | 11/2015 | Publicover et al. |
| 2015/0346490 A1 | 12/2015 | TeKolste et al. |
| 2015/0346495 A1 | 12/2015 | Welch et al. |
| 2015/0356781 A1 | 12/2015 | Miller |
| 2016/0011419 A1 | 1/2016 | Gao |
| 2016/0025971 A1 | 1/2016 | Crow et al. |
| 2016/0026253 A1* | 1/2016 | Bradski ............... H04N 13/128 345/8 |
| 2016/0048220 A1 | 2/2016 | Shen |

(56) References Cited

U.S. PATENT DOCUMENTS

| | | | |
|---|---|---|---|
| 2016/0062459 A1 | 3/2016 | Publicover et al. |
| 2016/0085300 A1 | 3/2016 | Robbins et al. |
| 2016/0109709 A1 | 4/2016 | Osterhout |
| 2016/0131905 A1 | 5/2016 | Takahashi et al. |
| 2016/0133201 A1 | 5/2016 | Border et al. |
| 2016/0270656 A1 | 9/2016 | Samec et al. |
| 2017/0011210 A1 | 1/2017 | Cheong et al. |
| 2017/0237974 A1 | 8/2017 | Samec et al. |
| 2017/0255259 A1 | 9/2017 | Mor |
| 2017/0276948 A1 | 9/2017 | Welch et al. |
| 2017/0293356 A1 | 10/2017 | Khaderi et al. |
| 2018/0039083 A1 | 2/2018 | Miller et al. |
| 2019/0369724 A1 | 12/2019 | Mor |
| 2020/0379553 A1 | 12/2020 | Mor |
| 2021/0181514 A1 | 6/2021 | Martin |

FOREIGN PATENT DOCUMENTS

| | | |
|---|---|---|
| JP | 2012-022150 | 2/2012 |
| JP | 2012-203127 | 10/2012 |
| JP | 2013-162407 | 8/2013 |
| JP | 2015-081313 | 4/2015 |
| JP | 2015-205114 | 11/2015 |
| JP | 2017-058853 | 3/2017 |
| KR | 10-2012-0107949 | 10/2012 |
| KR | 10-2015-0099430 | 8/2015 |
| WO | WO 2015/134740 | 9/2015 |
| WO | WO 2015/184412 | 12/2015 |
| WO | WO 2016/018487 | 2/2016 |
| WO | WO 2017/139667 | 8/2017 |
| WO | WO 2017/151974 | 9/2017 |
| WO | WO 2017/165848 | 9/2017 |
| WO | WO 2020/042654 | 1/2020 |

OTHER PUBLICATIONS

Farabet, C. et al., "Hardware Accelerated Convolutional Neural Networks for Synthetic Vision Systems", Proceedings of the 2010 IEEE International Symposium (May 30-Jun. 2, 2010) Circuits and Systems (ISCAS), pp. 257-260.
European Extended Search Report, re EP Application No. 17771290, dated Oct. 17, 2019.
Invitation to Pay Additional Fees And, Where Applicable, Protest Fee for PCT Application No. PCT/US17/24145, dated Jun. 2, 2017.
International Search Report and Written Opinion for PCT Application No. PCT/US17/24145, dated Jul. 26, 2017.
International Preliminary Report on Patentability for PCT Application No. PCT/US17/24145, dated Sep. 25, 2018.
"Basic Psychological Process—B.Sc. in Counseling Psychology Core Course", University of Calicut, School of Distance Education, (2011 Admission onwards) in 189 pages. URL: http://www.universityofcalicut.info/syl/CP1B01BasicPsychologicalProcesses.pdf.
"Big Tree Measuring Methods", Nature Nova Scotia, accessed Jul. 11, 2017, in 5 pages. URL: http://www.nature1st.net/naturens/files/tree_measure.html.
"Digital Mirror Fashion", GibamVision, retrieved Sep. 22, 2016, in 2 pages. URL: http://www.gibamvision.com/en/digital-mirror-fashion.
"How do I calculate total acceleration from the x, y, and z g-force values given by an accelerometer?", Quora, answered Dec. 28, 2015, accessed Jul. 11, 2017, in 4 pages. URL: https://www.quora.com/How-do-I-calculate-total-acceleration-from-the- -y-and-z-g-force-values-given-by-an-accelerometer.
"Research helps stroke victims retrain brain", Victoria University, Dec. 10, 2015, as archived Aug. 10, 2017, in 3 pages. URL: https://web.archive.org/web/20170810220140/https://www.vu.edu.au/news-events/media-releases/research-helps-stroke-victims-retrain-brain.
"Scientists Literally Stretch Brain to Map Details", Medgadget, Aug. 1, 2016, as archived Aug. 4, 2017, in 5 pages. URL: https://web.archive.org/web/20170804161858/https://www.medgadget.com/2016/08/scientists-stretch-brain.html.
"Transcranial Direct Current Stimulation Shown to Improve Learning Skills", Medgadget, Mar. 1, 2016, as archived Aug. 10, 2017, in 6 pages. URL: https://web.archive.org/save/_embed/https://www.medgadget.com/2016/03/transcranial-direct-current-stimulation-shown-improve-learning-skills.html.
"True Mirror®: See Yourself™", True Mirror, The True Mirror Company, Inc., 2015, accessed Jun. 30, 2016, in 3 pages. URL: http://www.truemirror.com/.
"True Mirrors" (homepage), True Mirror Company, as archived Aug. 17, 2017, in 2 pages. URL: https://web.archive.org/web/20170817144914/http://www.truemirror.com/.
"Eye Intensity Response, Contrast Sensitivity", Telescope-Optics.net, retrieved Jul. 11, 2017, in 14 pages. URL: http://www.telescope-optics.net/eye_intensity_response.htm.
"Eye Spectral Response", Telescope-Optics.net, retrieved Jul. 11, 2017, in 9 pages. URL: http://www.telescope-optics.net/eye_spectral_response.htm.
"The Telescopic Eye", Telescope-Optics.net, archived Jul. 21, 2016, in 5 pages. URL: https://web.archive.org/web/20160721003510/https://www.telescope-optics.net/eye.htm.
American Academy of Neurology (AAN), "Ultrasound headset may be new way to recognize concussion on the sidelines." ScienceDaily, Apr. 13, 2016, as archived Aug. 10, 2017, in 3 pages. URL: https://web.archive.org/web/20170810201930/https://www.sciencedaily.com/releases/2016/04/160413183041.htm.
Anthony, S., "MIT releases open-source software that reveals invisible motion and detail in video", Extreme Tech, Feb. 28, 2013, as accessed Aug. 4, 2017, in 5 pages.
Butler, D. et al., "Mirror, Mirror, on the Wall, How Does My Brain Recognize My Image at All?" PLoS One, vol. 7, Issue 2, 2012, published online Feb. 16, 2012, in 11 pages. URL: http://www.ncbi.nlm.nih.gov/pmc/articles/PMC3281068.
Carter, T. et al., "UltraHaptics: Multi-Point Mid-Air Haptic Feedback for Touch Surfaces", UIST '13 Proceedings of the 26th Annual ACM Symposium on User Interface Software and Technology, Oct. 2013, in 10 pages. URL: http://big.cs.bris.ac.uk/wp-content/uploads/2013/10/Ultrahaptics.Carter.2013.pdf.
CNRS, "Learning to read: Tricking the brain," ScienceDaily, Aug. 28, 2014, in 3 pages. URL: http://www.sciencedaily.com/releases/2014/08/140828115248.htm.
Curawave: "About The Curawave (MRgFUS) Treatment", Curawave, as archived Aug. 16, 2017, in 4 pages. URL: https://web.archive.org/web/20170816232429/http://usa.uterine-fibroids.org/about-mrgfus/.
Economic and Social Research Council, "How can we still read words when the letters are jumbled up?" ScienceDaily, Mar. 15, 2013, in 2 pages. URL: https://www.sciencedaily.com/releases/2013/03/130315074613.htm.
Fotopoulou, A. et al., "Mirror-view reverses somatoparaphrenia: dissociation between first- and third-person perspectives on body ownership", Neuropsychologia, vol. 49, Dec. 2011, in 10 pages. URL: http://www.ncbi.nlm.nih.gov/pubmed/22023911.
Gilliam, C., "Can VR Justify QHD and 4K Displays?", DA Developers, Feb. 11, 2015, as archived Aug. 4, 2017, in 7 pages. URL:https://web.archive.org/web/20170804164547/https://www.da-developers.com/can-vr-justify-qhd-and-4k-displays/.
Green, M., "Night Vision", Visual E pert, as archived Aug. 4, 2017, in 9 pages. URL: https://web.archive.org/web/20170804160954/http://www.visuale pert.com/Resources/nightvision.html.
Griffith, D., "'Digital neurotherapeutic' developed at UC Davis Mind Institute", Daily Democrat, Jun. 24, 2016, as archived Aug. 3, 2017, in 3 pages. URL: https://web.archive.org/web/20170803232850/http://www.dailydemocrat.com/general-news/20160624/digital-neurotherapeutic-developed-at-uc-davis-mind-institute.
Harrison, W., "Eye movement targets are released from visual crowding", Will J Harrison, Mar. 13, 2013, as archived Aug. 4, 2017, in 3 pages. URL: https://web.archive.org/web/20170804165524/http://willjharrison.com/2013/03/eye-movement-targets-are-released-from-visual-crowding/.

(56) References Cited

OTHER PUBLICATIONS

Ibsen, S. et al., "Sonogenetics is a non-invasive approach to activating neurons in Caenorhabditis elegans". Nature Communications, Sep. 15, 2015, in 12 pages. URL: http://www.nature.com/ncomms/2015/150915/ncomms9264/full/ncomms9264.html.
Intel: "Retail Solution Configuration: Memory Mirror Solution", Intel, printed Sep. 25, 2015, in 3 pages. URL: http://www.intel.com/content/www/us/en/retail/nrf-2014/memory.html?wapkw=mi.
Iosa, M. et al., "Seven Capital Devices for the Future of Stroke Rehabilitation", Stroke Research and Treatment, vol. 2012, Nov. 2012, in 9 pages. URL: http://www.ncbi.nlm.nih.gov/pmc/articles/PMC3530851/.
Jurcina, K., "clinApp—Prism Adaptation", YouTube, published Dec. 7, 2015, as archived Sep. 8, 2017, in 10 pages (with video transcription). URL: https://web.archive.org/web/20170908195617/https://www.youtube.com/watch?v=k1K5qV678wQ.
Khan Academy: "The effects of ultrasound on different tissue types", Khan Academy, as archived Aug. 11, 2017, in 9 pages. URL: https://web.archive.org/web/20170811162328/https://www.khanacademy.org/test-prep/mcat/physical-sciences-practice/physical-sciences-practice-tut/e/the-effects-of-ultrasound-on-different-tissue-types.
Kolb, H., "Part XIII: Facts and Figures concerning the human retina by Helga Kolb", Webvision, archived Jul. 2, 2016, in 5 pages. URL: https://web.archive.org/web/20160702134518/http://webvision.med.utah.edu/book/part-xiii-facts-and-figures-concerning-the-human-retina/.
Le, et al., "Robust and Accurate Skeletal Rigging from Mesh Sequences," ACM Transactions on Graphics (TOG), vol. 33(4), pp. 84-93, Jul. 2014.
Matsumoto, J., "I was recently diagnosed with parkinsonism. What causes it, and how can I cope as it progresses?", Mayo Clinic, as archived Aug. 11, 2017, in 3 pages. URL: https://web.archive.org/web/20170811161634/http://www.mayoclinic.org/diseases-conditions/parkinsons-disease/e pert-answers/parkinsonism/faq-20058490.
Milde, C. et al., "Do Mirror Glasses Have the Same Effect on Brain Activity as a Mirror Bo ? Evidence from a Functional Magnetic Resonance Imaging Study with Healthy Subjects", PLoS One, vol. 10, Issue. 5, published online May 27, 2015, in 13 pages. URL: http://www.ncbi.nim.nih.gov/pmc/articles/PMC4446290/.
MillenniumDroid, "True Mirror—Android Apps on Google Play", Google Play Store, retrieved Jun. 30, 2016, in 2 pages. URL: https://play.google.com/store/apps/details?id=com.blogspot.mdroid.mymirror&hl=en.
ModernNeurology, "Binocular Stereoscopic Depth Perception", YouTube, published Mar. 15, 2016, as archived Sep. 8, 2017, in 11 pages (with video transcription). URL: https://web.archive.org/web/20170906181457/https://www.youtube.com/watch?v=NarhP8PAdyc&feature=youtube&app=desktop.
Morries, L. et al., "Treatments for traumatic brain injury with emphasis on transcranial near-infrared laser phototherapy", Neuropsychiatric Disease and Treatment, vol. 11, Aug. 2015, in 17 pages. URL: http://www.ncbi.nlm.nih.gov/pubmed/26347062.
Mrovlje, J. et al., "Distance measuring based on stereoscopic pictures", 9th International PhD Workshop on Systems and Control: Young Generation Viewpoint, Oct. 2008, in 6 pages. URL: http://dsc.ijs.si/files/papers/S101%20Mrovlje.pdf.
Plataforma SINC, "Through the looking glass: Research into brain's ability to understand mirror-image words sheds light on dysle ia," ScienceDaily, Mar. 31, 2011, in 3 pages. URL: https://www.sciencedaily.com/releases/2011/03/110331080037.htm.
Podda, M. et al, "Anodal transcranial direct current stimulation boosts synaptic plasticity and memory in mice via epigenetic regulation of Bdnf e pression", Scientific Reports, Feb. 24, 2016, in 19 pages. URL: http://www.nature.com/articles/srep22180.
Preston, C. et al., "Owning the body in the mirror: The effect of visual perspective and mirror view on the full-body illusion", Scientific Reports, vol. 5, published online Dec. 17, 2015, in 13 pages. URL: http://www.ncbi.nlm.nih.gov/pmc/articles/PMC4683587/.
Pullen, L., "Brain Therapy Helps Rehabilitate Stroke Patients", Medscape, Dec. 5, 2013, in 10 pages. URL: http://www.medscape.com/viewarticle/815458.
Rubinstein, M., "Eulerian Video Magnification", YouTube, published May 23, 2012, as archived Sep. 6, 2017, in 13 pages (with video transcription). URL: https://web.archive.org/wreb/20170906180503/https://www.youtube.com/watch?v=ONZcjs1Pjmk&feature=youtube.
Rutkin, A., "Digital mirror reveals what lies under your skin", New Scientist, Apr. 15, 2014, in 3 pages. URL: https://www.newscientist.com/article/mg22229653-800-digital-mirror-reveals-what-lies-under-your-skin/.
Searle, R., "10 Crazy Facts About Mirrors," ListVerse, Dec. 30, 2013, in 11 pages. URL: http://listverse.com/2013/12/30/10-crazy-facts-about-mirrors/.
Szegedy et al., "Going deeper with convolutions", arXiv:1409.4842v1, Sep. 17, 2014 in 12 pages.
The New York Times, "MIT Computer Program Reveals Invisible Motion in Video | The New York Times", YouTube, published Feb. 27, 2013, as archived Sep. 8, 2017, in 10 pages (with video transcription). URL: https://web.archive.org/web/20170906180629/https://www.youtube.com/watch?feature=youtu.be&t=1m5s&v=3rWycBEHn3s&app=desktop.
Wang, W. et al., "Neural Interface technology for Rehabilitation: E plotting and Promoting Neuroplasticity", Physical Medicine Rehabilitation Clinics of North America, vol. 21, Feb. 2010, in 22 pages. URL: http://www.ncbi.nlm.nih.gov/pmc/articles/PMC2788507/.
Wikipedia: "Adaptation", Wikipedia, printed Jul. 11, 2017, in 9 pages. URL: https://en.wikipedia.org/wiki/Adaptation_(eye).
Wikipedia: "Atomic Mirror", Wikipedia, printed Dec. 13, 2016, in 2 pages. URL: http/en.wikipedia.org/wiki/Atomic_mirror.
Wikipedia: "Body transfer illusion", Wikipedia, as archived Aug. 10, 2017, in 4 pages. URL: https://web.archive.org/web/20170810213201/https://en.wikipedia.org/wiki/Body_transfer_illusion.
Wikipedia: "Mirror Neuron", Wikipedia, printed Jun. 30, 2016, in 17 pages. URL: https://en.wikipedia.org/wiki/Mirror_neuron.
Wikipedia: "Non-reversing mirror," Wikipedia, printed Jun. 30, 2016, in 2 pages. URL: https://en.wikipedia.org/wiki/Non-reversing_mirror.
Wikipedia: "Parkinsonism", Wikipedia, as archived Aug. 10, 2017, in pages. URL: https://web.archive.org/web/20170810214355/https://en.wikipedia.org/wiki/Parkinsonism.
Wikipedia: "Peripheral vision", Wikipedia, as archived Aug. 3, 2017, in 6 pages. URL: https://web.archive.org/web/20170803223449/https://en.wikipedia.org/wiki/Peripheral_vision.
"Positron emission tomography", Wikipedia, as archived Aug. 3, 2017, in 14 pages. URL: https://web.archive.org/web/20170803232043/https://en.wikipedia.org/wiki/Positron_emission_tomography.
Wikipedia: "Prism adaptation", Wikipedia, as archived Aug. 10, 2017, in 5 pages. URL: https://web.archive.org/web/20170810213634/https://en.wikipedia.org/wiki/Prism_adaptation.
Zult, T. et al., "Mirror illusion reduces motor cortical inhibition in the ipsilateral primary motor corte during forceful unilateral muscle contractions", Journal of Neurophysiology, vol. 113, Issue 7, Apr. 2015, published online Jan. 28, 2015, in 14 pages. URL: http://www.ncbi.nlm.nih.gov/pmc/articles/PMC4416555/.
ARToolKit: https://web.archive.org/web/20051013062315/http://www.hitl.washington.edu:80/artoolkit/documentation/hardware.htm, archived Oct. 13, 2005.
Azuma, "A Survey of Augmented Reality," Teleoperators and Virtual Environments 6, 4 (Aug. 1997), pp. 355-385. https://web.archive.org/web/20010604100006/http://www.cs.unc.edu/~azuma/ARpresence.pdf.
Azuma, "Predictive Tracking for Augmented Realty," TR95-007, Department of Computer Science, UNC-Chapel Hill, NC, Feb. 1995.
Bimber, et al., "Spatial Augmented Reality—Merging Real and Virtual Worlds," 2005 https://web.media.mit.edu/~raskar/book/BimberRaskarAugmentedRealityBook.pdf.
Jacob, "Eye Tracking in Advanced Interface Design," Human-Computer interaction Lab Naval Research Laboratory, Washington, D.C. / paper/ in Virtual Environments and Advanced Interface

(56) References Cited

OTHER PUBLICATIONS

Design, ed. by W. Barfield and T.A. Furness, pp. 258-288, Oxford University Press, New York (1995).
Tanriverdi and Jacob, "Interacting With Eye Movements in Virtual Environments," Department of Electrical Engineering and Computer Science, Tufts University, Medford, MA—paper/Proc. ACM CHI 2000 Human Factors in Computing Systems Conference, pp. 265-272, Addison-Wesley/ACM Press (2000).

* cited by examiner

VIRTUAL AND AUGMENTED REALITY SYSTEMS AND METHODS

PRIORITY CLAIM

This application claims priority to, and is a divisional of, U.S. patent application Ser. No. 15/469,369 titled "VIRTUAL AND AUGMENTED REALITY SYSTEMS AND METHODS" and filed on Mar. 24, 2017. U.S. patent application Ser. No. 15/469,369 claims the benefit of priority under 35 U.S.C. § 119(e) of: U.S. Provisional Application No. 62/313,698, filed on Mar. 25, 2016; and U.S. Patent Application No. 62/378,109, filed on Aug. 22, 2016. The entire disclosure of each of these priority documents is incorporated herein by reference.

CROSS-REFERENCE TO RELATED APPLICATIONS

This application incorporates by reference the entirety of each of the following patent applications: U.S. application Ser. No. 14/555,585 filed on Nov. 27, 2014; U.S. application Ser. No. 14/690,401 filed on Apr. 18, 2015; U.S. application Ser. No. 14/212,961 filed on Mar. 14, 2014; and U.S. application Ser. No. 14/331,218 filed on Jul. 14, 2014.

BACKGROUND

Field

The present disclosure relates to display systems, including augmented reality imaging and visualization systems.

Description of the Related Art

Modern computing and display technologies have facilitated the development of systems for so called "virtual reality" or "augmented reality" experiences, in which digitally reproduced images or portions thereof are presented to a user in a manner wherein they seem to be, or may be perceived as, real. A virtual reality, or "VR", scenario typically involves the presentation of digital or virtual image information without transparency to other actual real-world visual input; an augmented reality, or "AR", scenario typically involves presentation of digital or virtual image information as an augmentation to visualization of the actual world around the user. A mixed reality, or "MR", scenario is a type of AR scenario and typically involves virtual objects that are integrated into, and responsive to, the natural world. For example, an MR scenario may include AR image content that appears to be blocked by or is otherwise perceived to interact with objects in the real world.

Referring to FIG. 1, an augmented reality scene 10 is depicted. The user of an AR technology sees a real-world park-like setting 20 featuring people, trees, buildings in the background, and a concrete platform 30. The user also perceives that he/she "sees" "virtual content" such as a robot statue 40 standing upon the real-world platform 30, and a flying cartoon-like avatar character 50 which seems to be a personification of a bumble bee. These elements 50, 40 are "virtual" in that they do not exist in the real world. Because the human visual perception system is complex, it is challenging to produce AR technology that facilitates a comfortable, natural-feeling, rich presentation of virtual image elements amongst other virtual or real-world imagery elements.

Systems and methods disclosed herein address various challenges related to AR and VR technology.

SUMMARY

In some embodiments, a display system comprises a head-mountable display having a hyperfocal distance. The head-mountable display comprises one or more waveguides each having optical power and an associated depth plane. The one or more waveguides are configured to project light to a viewer to display image content on the associated depth planes. Each of the depth planes is at less than optical infinity.

In some other embodiments, a display system comprises a head-mountable display. The head-mountable display comprises one or more waveguides each having optical power and an associated depth plane. The one or more waveguides are configured to project light to a viewer to display image content on the associated depth planes. A farthest one of the depth planes is within about 0.33 dpt of optical infinity.

In yet other embodiments, a display system comprises a head-mountable display. The head-mountable display comprises a plurality of waveguides forming a stack of waveguides. Each waveguide has optical power and an associated depth plane, wherein the waveguides are configured to project light to a viewer to display image content on the associated depth planes. A farthest one of the depth planes is within a mismatch tolerance of optical infinity. The mismatch tolerance is about 0.5 dpt.

In some other embodiments, a method for displaying image content on a head-mounted display is provided. The method comprises determining whether an accommodation-vergence mismatch for the image content exceeds a threshold; and modifying the image content if the combination-vergence mismatch exceeds the threshold.

In yet other embodiments, a method for displaying image content on a head-mounted display worn by a user is provided. The method comprises determining a presence of eye strain in the user; and modifying the image content if eyestrain is determined to be present.

In some embodiments, a wearable head-mounted display system comprises a frame configured to be worn by a user. A display is attached to the frame. The display system also comprises a support structure configured to extend from one side of a head of the user to an other side of the head. The support structure is mechanically coupled to the frame.

In some embodiments, a display system comprises a display device, one or more processors, and computer storage media. The display system performs operations that comprise determining a fixation depth, wherein the fixation depth is a depth at which eyes of the user are fixating. The operations also include determining whether to adjust selection of a selected depth plane at which a virtual object is being presented to the user's eyes is determined based on whether the fixation depth is within a depth plane range that is: (1) solely encompassed by the selected depth plane; or (2) encompassed by both the selected depth plane and an adjacent depth plane. Presentation of the virtual object is caused at a particular depth plane selected based on determinations made in determining whether to adjust selection of a selected depth plane.

In some embodiments, a display system comprises a display device, one or more processors, and computer storage media. The display system performs operations that comprise determining a fixation depth, wherein the fixation depth is a depth at which eyes of the user are fixating. A particular depth plane of the plurality of depth planes at which a virtual object is to be presented to the user is determined, the determination based on the fixation depth and depth plane ranges encompassed by each of the depth planes, wherein adjacent depth planes both encompass a depth overlap region. Presentation of the virtual object is caused at the particular depth plane.

In some embodiments, a method comprises determining a fixation depth, wherein the fixation depth is a depth at which eyes of the user are fixating. Whether to adjust selection of a selected depth plane at which a virtual object is being presented to the user's eyes is determined based on whether the fixation depth is within a depth plane range that is: (1) solely encompassed by the selected depth plane; or (2) encompassed by both the selected depth plane and an adjacent depth plane. Presentation of the virtual object is caused at a particular depth plane selected based on the determination of whether to adjust selection of the selected depth plane.

In some embodiments, a display system comprises a display device, one or more processors, and computer storage media. The display system performs operations that comprise determining a fixation point of a user indicating a three-dimensional location upon which the user is fixating. The operations also include determining whether to switch a depth plane at which a virtual object is to be presented is determined, the determination based, at least in part, on a depth of the determined fixation point. The depth plane at which the virtual object is to be presented is switched, wherein switching the depth plane is triggered by a user perception limiting event.

Additional examples of embodiments are provided below.

Example 1

A display system comprising:
a head-mountable display comprising:
one or more waveguides each having optical power and configured to provide content on an associated depth plane, wherein the one or more waveguides are configured to project light to a viewer to display image content on the associated depth plane of the one or more waveguides,
wherein each of the depth planes is at less than optical infinity.

Example 2

The display system of Claim 1, wherein a farthest one of the depth planes is within about 0.50 dpt of optical infinity.

Example 3

The display system of Claim 2, wherein a farthest one of the depth planes is within about 0.33 dpt of optical infinity.

Example 4

The display system of Claim 3, wherein a farthest one of the depth planes is within about 0.25 dpt of optical infinity.

Example 5

The display system of any of Claims 1-4, wherein the depth planes are separated by no more than about 0.7 dpt.

Example 6

The display system of any of Claims 1-6, wherein the depth planes are separated by no more than about 0.5 dpt.

Example 7

The display system of any of Claims 1-7, wherein the display is configured to display image information on only two depth planes, wherein the two depth planes are each at less than optical infinity.

Example 8

The display system of Claim 1, wherein the display is configured to display image information on only one depth plane, wherein the one depth plane is at less than optical infinity.

Example 9

A display system comprising:
a head-mountable display comprising:
one or more waveguides each having optical power and an associated depth plane, wherein the one or more waveguides are configured to project light to a viewer to display image content on the associated depth planes,
wherein a farthest one of the depth planes is within about 0.33 dpt of optical infinity.

Example 10

The display system of Claim 10, wherein a next farthest one of the depth planes is within about 0.66 dpt of the farthest one of the depth planes.

Example 11

The display system of any of Claims 10-11 wherein a total number of depth planes is two.

Example 12

The display system of any of Claims 10-12, wherein a total number of depth planes is greater than two, wherein a separation between immediately neighboring depth planes is less than about 0.66 dpt.

Example 13

The display system of any of Claims 10-13, wherein a total number of depth planes is less than four.

Example 14

The display system of any of Claims 10-13, wherein the one or more waveguides form a stack of the waveguides, wherein each waveguide comprises incoupling optical elements configured to redirect incident light to propagate by total internal reflection inside the waveguide.

Example 15

The display system of Claim 15, wherein the incoupling optical elements of each waveguide are configured to selectively redirect light having wavelengths corresponding to a single component color.

Example 16

The display system of Claim 15, wherein, as seen in a top-down plan view, the incoupling optical elements of each waveguide are laterally spaced-apart from the incoupling optical elements of other waveguides.

Example 17

The display system of any of Claims 15-17, wherein each waveguide further comprises outcoupling optical elements configured to redirect light propagating within each waveguide out of the waveguide.

Example 18

The display system of any of Claims 15-18, further comprising a light projector system configured to direct image content to the incoupling optical elements of the waveguides, the light projector system comprising:
a light emitter; and
a spatial light modulator.

Example 19

The display system of any of Claims 10-19, wherein each waveguide has optical power for creating only a single depth plane.

Example 20

A display system comprising:
a head-mountable display comprising:
  a plurality of waveguides forming a stack of waveguides, wherein each waveguide has optical power and is configured to provide content on an associated depth plane, wherein the waveguides are configured to project light to a viewer to display image content on the associated depth planes,
  wherein a farthest one of the depth planes is within a mismatch tolerance of optical infinity, wherein the mismatch tolerance is about 0.5 dpt.

Example 21

The display system of Claim 21, wherein the mismatch tolerance is about 0.33 dpt.

Example 22

The display system of any of Claims 21-22, wherein the separation between an associated depth plane and a nearest associated depth plane of the stack is about twice the mismatch tolerance or less.

Example 23

The display system of any of Claims 21-23, wherein a total number of depth planes is four or less.

Example 24

The display system of Claim 24, wherein the total number of depth planes is two.

Example 25

A method for displaying image content on a head-mounted display, the method comprising:
determining whether an accommodation-vergence mismatch for the image content exceeds a threshold; and
modifying the image content if the accommodation-vergence mismatch exceeds the threshold.

Example 26

The method of Claim 26, wherein the accommodation-vergence mismatch threshold is 0.5 dpt or less.

Example 27

The method of Claim 27, wherein the accommodation-vergence mismatch threshold is 0.33 dpt or less.

Example 28

The method of any of Claims 26-28, wherein modifying the image content comprises fading the image content.

Example 29

The method of Claim 29, wherein fading the image content comprises reducing a resolution of the image content.

Example 30

The method of Claim 30, wherein a reduction in the resolution of the image content increases with increasing accommodation-vergence mismatch.

Example 31

The method of any of Claims 26-31, wherein modifying the image content comprises not displaying the image content.

Example 32

A display system comprising:
a processor; and
computer storage media storing instructions that when executed by the display system, cause the display system to perform operations comprising:
the method of any of Claims 26-32.

Example 33

The display system of Claim 33, wherein the display system is configured to display image information on only one depth plane, wherein the one depth plane is at less than optical infinity.

Example 34

The display system of Claim 33, wherein the display system is configured to display image information on only two depth planes, wherein the two depth planes are each at less than optical infinity.

Example 35

A method for displaying image content on a head-mounted display worn by a user, the method comprising:
  determining a presence of eye strain in the user; and
  modifying the image content if eyestrain is determined to be present.

Example 36

The method of Claim 36, wherein determining the presence of eyestrain comprises imaging one or both eyes of the user.

Example 37

The method of any of Claims 36-37, wherein determining the presence of eyestrain comprises detecting one or more of pupil dilation, convergence oscillation, and pupil oscillation.

Example 38

The method of any of Claims 36-38, wherein determining the presence of eyestrain comprises measuring a galvanic skin response.

Example 39

The method of any of Claims 36-39, wherein determining the presence of eyestrain comprises detecting a duration of exposure to image content having an accommodation-vergence mismatch greater than 0.25 dpt.

Example 40

The method of Claim 40, wherein the accommodation-vergence mismatch is greater than 0.33 dpt.

Example 41

The method of Claim 41, wherein the accommodation-vergence mismatch is greater than 0.50 dpt.

Example 42

The method of any of Claims 36-42, wherein modifying image content comprises one or more of:
  increasing a size of features of the image content;
  reducing a resolution of the image content; and
  displaying the image content on a depth plane farther from the viewer than originally specified for the image content.

Example 43

The method of any of Claims 36-43, wherein were modifying image content is performed until the presence of eyestrain is no longer detected in the user.

Example 44

The method of any of Claims 36-44, wherein were modifying image content is performed for a set duration.

Example 45

A display system comprising a processor and computer storage media storing instructions that, when executed by the display system, cause the display system to perform the method of any of Claims 36-44.

Example 46

The display system of Claim 45, wherein the display system is configured to display image information on only one depth plane, wherein the one depth plane is at less than optical infinity.

Example 47

The display system of Claim 45, wherein the display system is configured to display image information on only two depth planes, wherein the two depth planes are each at less than optical infinity.

Example 48

A wearable head-mounted display system comprising:
  a frame configured to be worn by a user;
  a display attached to the frame; and
  a support structure configured to extend from one side of a head of the user to an other side of the head,
  wherein the support structure is mechanically coupled to the frame.

Example 49

The wearable head-mounted display system of Claim 48, further comprising a sound transducer attached to the support structure and configured to direct sound into an ear of the user.

Example 50

The wearable head-mounted display system of Claim 49, wherein the sound transducer is a speaker.

Example 51

The wearable head-mounted display system of any of Claims 48-50, wherein the support structure is a band that is configured to extend from one side of the head to an other side of the head.

Example 52

The wearable head-mounted display system of Claim 51, wherein the band crosses the head of the user at between a 35° and a 55° angle relative to a plane intersecting the eyes and ears of the user.

Example 53

The wearable head-mounted display system of Claim 51, wherein the band crosses the head of the user at between an 80° and a 100° angle relative to a plane intersecting the eyes and ears of the user.

Example 54

The wearable head-mounted display system of any of Claims 52-53, wherein an angle of the band relative to a plane intersecting the eye and the first and second ear of the user is adjustable.

Example 55

The wearable head-mounted display system of any of Claims 48-54, further comprising a waveguide comprising:
an incoupling optical element configured to selectively incouple incident light into the waveguide based upon a property of the incident light; and
an outcoupling optical element configured to project light to an eye of the viewer by outcoupling the light incoupled into the waveguide.

Example 56

The wearable head-mounted display system of Claim 55, wherein the outcoupling optical element has optical power and is configured to project light to the eye to display image content on an associated depth plane, wherein the associated depth plane is at less than optical infinity.

Example 57

The wearable head-mounted display system of Claim 56, wherein the waveguide is part of a stack of waveguides, wherein at least some waveguides of the stack of waveguides comprises different associated depth planes and outcoupling optical elements having different optical power so as to provide different divergence of exiting light for each of the at least some waveguides.

Example 58

A display system comprising:
a display device configured to present virtual objects to a user at a plurality of depth planes;
one or more processors; and
computer storage media storing instructions that, when executed by the display system, cause the display system to perform operations comprising:
determining a fixation depth, wherein the fixation depth is a depth at which eyes of the user are fixating;
determining whether to adjust selection of a selected depth plane at which a virtual object is being presented to the user's eyes based on whether the fixation depth is within a depth plane range that is:
(1) solely encompassed by the selected depth plane; or
(2) encompassed by both the selected depth plane and an adjacent depth plane; and
causing presentation of the virtual object at a particular depth plane selected based on determining whether to adjust selection of a selected depth plane.

Example 59

The display system of claim 58, wherein the fixation depth is within a depth plane range solely encompassed by the selected depth plane, wherein the determination of whether to adjust selection of a depth plane is negative.

Example 60

The display system of claim 58, wherein the fixation depth is within a depth plane range that is encompassed by both the selected depth plane and an adjacent depth plane, wherein the determination of whether to adjust selection of a depth plane is negative.

Example 61

The display system of claim 58, wherein the fixation depth is within a particular depth plane range outside of a depth plane range that is:
(1) solely encompassed by the selected depth plane; and
(2) encompassed by both the selected depth plane and an adjacent depth plane, and wherein the determination of whether to adjust selection of the depth plane is positive.

Example 62

The display system of claim 61, wherein the virtual object is presented at a depth plane that encompasses the particular depth plane range.

Example 63

The display system of claim 58, wherein the fixation depth is within a depth plane range solely encompassed by the adjacent depth plane, and wherein the determination of whether to adjust selection of the depth plane is positive.

Example 64

The display system of claim 63, wherein the virtual object is presented at the adjacent depth plane.

Example 65

The display system of claim 58, wherein, in response to a positive determination to adjust selection of a depth plane, triggering presentation at the adjusted depth plane in response to detecting performance of a blink or a saccade by the user.

Example 66

The display system of claim 58, wherein the operations further comprise:
determining a fixation point of a user indicating a three-dimensional location upon which the user is fixating, the three-dimensional location indicating the fixation depth.

Example 67

A display system comprising:
a display device configured to present virtual objects to a user at a plurality of depth planes;
one or more processors; and
computer storage media storing instructions that when executed by the display system, cause the display system to perform operations comprising:

determining a fixation depth, wherein the fixation depth is a depth at which eyes of the user are fixating;
determining a particular depth plane of the plurality of depth planes at which a virtual object is to be presented to the user, the determination based on the fixation depth and depth plane ranges encompassed by each of the depth planes, wherein adjacent depth planes both encompass a depth overlap region; and
causing presentation of the virtual object at the particular depth plane.

Example 68

The display system of claim 66, wherein a depth plane range encompassed by a depth plane indicates a range of depths from the user that, when fixated at, cause presentation of the virtual object at the depth plane.

Example 69

The display system of claim 66, wherein presentation at the particular depth plane comprises presenting the virtual object with accommodation cues associated with a nominal focal depth of the particular depth plane and vergence cues based on location information associated with the virtual object.

Example 70

The display system of claim 69, wherein a size of the depth plane range encompassed by the particular depth plane is based on a accommodation-vergence mismatch tolerance, the accommodation-vergence mismatch toleranceindicating a maximum difference between a perceived depth associated with vergence cues of a presented virtual object and a perceived depth associated with accommodation cues of the virtual object.

Example 71

The display system of claim 66, wherein a size of the depth overlap region is based on an error associated with determining fixation depths.

Example 72

The display system of claim 66, wherein the fixation depth is solely encompassed by the particular depth plane, such that the depth falls in the depth plane range.

Example 73

The display system of claim 66, wherein the fixation depth is within a depth overlap region encompassed by the particular depth plane and an adjacent depth plane, and wherein determining the particular depth plane is based on prior fixation depths of the user.

Example 74

The display system of claim 73, wherein the operations further comprise:
identifying, based on the prior fixation depths, that the user fixated at a fixation depth solely encompassed by the particular depth plane prior to fixating at one or more fixation depths within the depth overlap region.

Example 75

The display system of claim 73, wherein the operations further comprise:
determining a subsequent fixation depth of the user that is within the depth overlap region; and
causing presentation of the virtual object at the particular depth plane.

Example 76

The display system of claim 73, wherein the operations further comprise:
determining a subsequent fixation depth of the user that is encompassed by the adjacent depth plane and outside of the depth overlap region; and
causing presentation of the virtual object at the adjacent depth plane.

Example 77

The display system of claim 76, wherein the display system is configured to determine that the user has performed a (1) blink or a (2) saccade, and in response cause presentation at the adjacent depth plane.

Example 78

A method implemented, at least in part, by a display device configured to present virtual objects to a user at a plurality of depth planes, the method comprising:
determining a fixation depth, wherein the fixation depth is a depth at which eyes of the user are fixating;
determining whether to adjust selection of a selected depth plane at which a virtual object is being presented to the user's eyes based on whether the fixation depth is within a depth plane range that is:
(1) solely encompassed by the selected depth plane; or
(2) encompassed by both the selected depth plane and an adjacent depth plane; and
causing presentation of the virtual object at a particular depth plane selected based on the determination whether to adjust selection of the selected depth plane.

Example 79

The method of claim 78, wherein the fixation depth is within a particular depth plane range outside of a depth plane range that is:
(1) solely encompassed by the selected depth plane; and
(2) encompassed by both the selected depth plane and an adjacent depth plane,
and wherein the determination of whether to adjust selection of the depth plane is positive.

Example 80

The method of claim 78, wherein in response to a positive determination to adjust selection of a depth plane, triggering presentation at the adjusted depth plane in response to detecting performance of a blink or a saccade by the user.

Example 81

A display system comprising:
a display device configured to present virtual objects to a user at a plurality of depth planes;

processors; and computer storage media storing instructions that when executed by the display system, cause the display system to perform operations comprising:

determining a fixation point of a user indicating a three-dimensional location upon which the user is fixating;

determining whether to switch a depth plane at which a virtual object is to be presented, the determination based, at least in part, on a depth of the determined fixation point; and switching the depth plane at which the virtual object is to be presented, wherein switching the depth plane is triggered by a user perception limiting event.

Example 82

The display system of claim 81, wherein the operations further comprise:

monitoring the user's eyes to detect the user perception limiting event comprising one or more of a blink or a saccade being performed.

Example 83

The display system of claim 82, wherein monitoring the user's eyes comprises monitoring the user's pupils, and wherein detecting a saccade is based on a rotational velocity of the pupils exceeding a threshold velocity.

Example 84

The display system of claim 83, wherein detecting the saccade is further based on movement information associated with the user's head.

Example 85

The display system of claim 81, wherein switching the depth plane comprises:

detecting a blink being performed by the user; and
in response, switching the depth plane.

Example 86

The display system of claim 81, wherein switching the depth plane comprises:

detecting a saccade being performed by the user; and
in response, switching the depth plane.

Example 87

The display system of claim 81, wherein switching the depth plane comprises:

in response to not detecting performance of a blink or a saccade after a threshold amount of time, switching the depth plane.

Example 88

The display system of claim 81, wherein determining whether to switch a depth plane comprises:

determining that the depth of the determined fixation point is encompassed by the switched depth plane.

Example 89

The display system of claim 81, wherein the operations further comprise:

storing information indicating that the depth plane is to be switched, and monitoring eyes of the user to determine the user perception limiting event.

Example 90

The display system of claim 81, wherein the display device comprises a plurality of stacked waveguides forming a display area and providing a view of an ambient environment through the display area, wherein at least some waveguides of the plurality of waveguides are configured to output light with different wavefront divergence than other waveguides, each waveguide being associated with a depth plane; and wherein presenting the virtual object at the switched depth plane comprises a waveguide associated with the switched depth plane outputting light for forming the virtual object.

Example 91

A method implemented, at least in part, by a display device configured to present virtual objects to a user at a plurality of depth planes, the method comprising:

determining a fixation point of a user indicating a three-dimensional location upon which the user is fixating;

determining whether to switch a depth plane at which a virtual object is to be presented, the determination based, at least in part, on a depth of the determined fixation point; and switching the depth plane at which the virtual object is to be presented, wherein switching the depth plane is triggered by a user perception limiting event.

Example 92

The method of claim 91, further comprising: monitoring the user's eyes to detect the user perception limiting event comprising one or more of a blink or a saccade being performed.

Example 93

The method of claim 92, wherein monitoring the user's eyes comprises monitoring the user's pupils, and wherein detecting a saccade is based on a rotational velocity of the pupils exceeding a threshold velocity.

Example 94

The method of claim 93, wherein detecting the saccade is further based on movement information associated with the user's head.

Example 95

The method of claim 91, wherein switching the depth plane comprises:

detecting a blink being performed by the user; and
in response, switching the depth plane.

Example 96

The method of claim 91, wherein switching the depth plane comprises:

detecting a saccade being performed by the user; and in response, switching the depth plane.

Example 97

A display system comprising a display device, processors, and computer storage media storing instructions that, when executed by the processors, cause the display system to perform operations comprising:
presenting, by the display device, frames including virtual content to a user at a plurality of depth planes, wherein for each frame presented to the user, the virtual content is presented at a same depth plane selected based on user fixation information; and
in response to identifying that selection of a selected depth plane is to be adjusted, storing information indicating that, upon detection of a blink or a saccade being performed by the user, one or more frames of the virtual content are to be presented, by the display device, at the adjusted depth plane.

Example 98

The display system of claim 97, wherein the operations further comprise:
detecting performance of a blink or a saccade; and
in response to the determination, presenting the virtual content at the adjusted depth plane.

Example 99

The display system of claim 97, wherein the operations further comprise:
determining that the user has not performed a blink or a saccade for greater than a threshold time; and
in response to the determination, presenting the virtual content at the adjusted depth plane.

Example 100

The display system of claim 97, wherein the operations further comprise:
monitoring the user's eyes to detect a blink or a saccade, and while monitoring, presenting one or more frames of virtual content at the selected depth plane.

Example 101

The display device of claim 97, wherein while waiting for detection of a blink or a saccade, determining that the user is fixating at a depth associated with a particular depth plane different from the adjusted depth plane, and storing information indicating that, upon detection of a blink or a saccade, the virtual content is to be presented at the particular depth plane.

Figure 1:
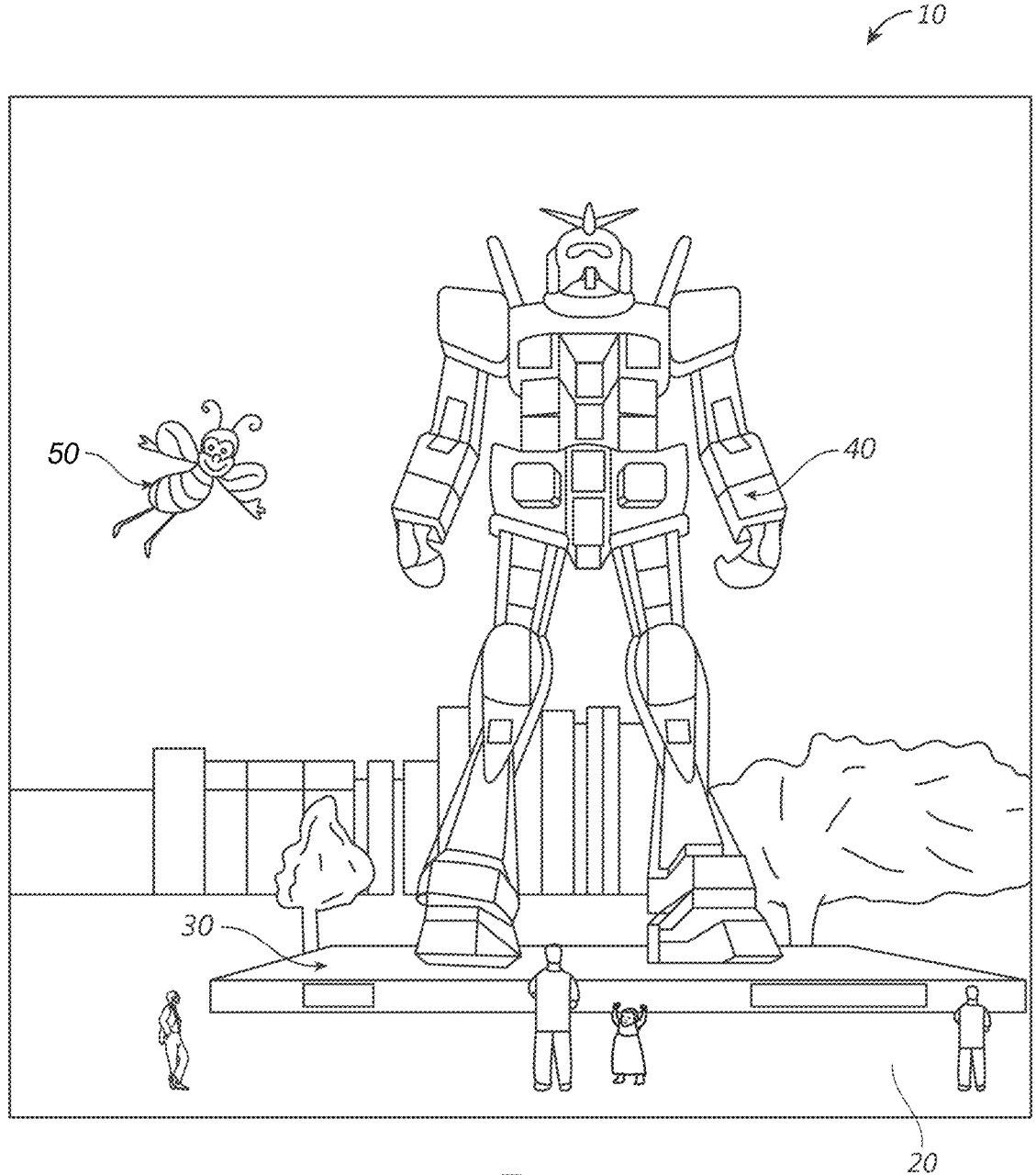
FIG. 1 illustrates a user's view of augmented reality (AR) through an AR device.

The drawings are provided to illustrate example embodiments and are not intended to limit the scope of the disclosure.

DETAILED DESCRIPTION

Virtual and augmented display systems may provide a variety of image content, the richness of which may increase with the user's ability to wear the systems for an extended duration. For example, augmented display systems offer the potential to replace conventional displays (e.g. computer monitors, smart phone displays, etc.) with a single device, which may also augment the user's perceptions of the world by providing content not otherwise available. These display systems, however, may be bulky and/or heavy and certain image content displayed on the systems may undermine long-term user comfort. For example, some display systems, as discussed herein, may utilize a stack of waveguides to project image information to the user across a large number of depth planes, and thereby provide a 3-dimensional viewing experience. Such a stack of waveguides may be heavy, which is undesirable for long-term use of display systems incorporating such a stack.

Advantageously, in some embodiments, systems and methods are provided which may facilitate long-term wearer comfort. In some embodiments, a credible and comfortable 3-dimensional viewing experience is provided using a reduced waveguide stack configured to project image information to the user at only one, or only two depth planes. In some embodiments, the number of depth planes may be greater, including three or four depth planes.

As described herein, it will be appreciated that a display system may utilize both vergence cues and accommodation cues to present displayed content with a sense of depth. The vergence cues may be generated by presenting slightly different views of a virtual object to each eye of the user. The accommodation cues may be derived from the wavefront divergence of the light that forms those slightly different views. The vergence cues cause the eyes to rotate to assume a particular vergence state in which, e.g., the eyes converge on the virtual object. The accommodation cues may cause the lenses of the eyes to assume a particular shape that provides a focused image of the virtual object on the retinas of the eyes. Thus, particular vergence cues may cause the eyes to assume particular vergence states and particular accommodation cues may cause the eyes to assume particular accommodative states. It will be appreciated that real objects in space provide vergence and accommodation cues that vary based on their distance along an optical or z-axis from a viewer, such that particular vergence cues may be correlated with particular vergence distances, and particular accommodation cues may likewise be correlated with particular accommodation distances away from the viewer. Conventionally, it has been thought that the vergence and accommodation cues should closely match one another in order to prevent viewer discomfort; that is, it has been thought that the vergence and accommodation distances for a virtual object should be the same, to avoid an accommodation-vergence mismatch. Accommodation-vergence mismatch when displaying a virtual object may be defined as the difference in diopters between the vergence and accommodation distances for the virtual object.

It has been found, however, that the human visual system tolerates some levels of the accommodation-vergence mismatches. As a result, within a mismatch tolerance, accommodation cues may remain the same, while vergence cues may vary, thereby varying the perceived depth of a virtual object. Thus, in some embodiments, the vergence cues may vary continuously, while the accommodation cues vary in discrete steps, with the mismatch between accommodation and vergence maintained below a mismatch tolerance level. Examples of accommodation-vergence mismatch tolerances include 0.5 dpt or less, 0.33 dpt or less, or 0.25 dpt or less. In some embodiments, a farthest depth plane may be within an accommodation-vergence mismatch tolerance of optical infinity, and a next farthest depth plane may be within an accommodation-vergence mismatch tolerance of a volume made out by the accommodation-vergence mismatch tolerance of the farthest depth plane, and so on.

It will be appreciated that particular amounts of wavefront divergence are associated with particular depth planes; that is, the wavefront divergence of light outputted by the display system corresponds to the wavefront divergence of light coming from a real object at a particular depth along the z-axis. As a result, changing wavefront divergence and accommodation cues may be understood to involve switching the depth plane on which the display system presents a virtual object. In some embodiments, the depth plane may be switched in order to maintain the accommodation-vergence mismatch below an acceptable tolerance level. Each depth plane may have a nominal focal depth, having a corresponding wavefront divergence for light appearing to come from that depth plane. However, due to the accommodation-vergence mismatch tolerance, content may be displayed "on" that depth plane (i.e., with wavefront divergence corresponding to that depth plane) even as vergence cues may be utilized to provide the perception that a virtual object is closer or farther away from the viewer than the depth plane. The outer bounds of the distances where a particular depth plane may be utilized is determined by the accommodation-vergence mismatch, which may be measured in units of diopters as disclosed herein.

Some display systems, referred to herein as vari-focal display systems, may present virtual content at discrete depth planes, with all virtual content being presented at the same depth plane at a given time (e.g., only one depth plane is active, or outputting image information, at a time). Displaying content on one depth plane at a time may have the advantage of conserving computational resources in the display system. To determine the depth plane at which to present virtual content, the vari-focal display system may determine the depth at which the user's eyes are fixated (also referred to as the fixation depth herein), e.g., by determining the distance to the target upon which the user's eyes are fixating. Once the fixation depth is determined, the display system may present content on a depth plane that matches or corresponds to the depth of fixation. What qualifies as a match may be a fixation depth that matches the depth plane and/or that is in an accommodation-vergence mismatch tolerance of that depth plane. As used herein, the depth of an object is the distance of that object from the user, as measured along the optic or z-axis.

As an example of determining a fixation depth, the display system may determine the fixation point of the user's eyes. For example, the display system may monitor the orientations of the user's eyes, and estimate the gaze vectors associated with the user's eyes to determine a three-dimensional location at which respective determined gazes of the eyes intersect. The display system may determine that the user's eyes are fixated at a particular three-dimensional location, and the display system may present virtual content at a depth plane corresponding to the three-dimensional location. In this way, the display system may ensure that the content displayed to a viewer is appropriate for that depth plane.

Consequently, in some embodiments, the display system may be configured to track the user's eyes and to provide content on a depth plane corresponding to the depth at which the user's eyes are fixating. As the fixation point of the user's eyes changes, the display system may be configured to switch to a different depth plane, which may cause an instantaneous jump in the retinal blur caused by an image of a virtual object. To a typical user, this will appear as a flicker in the display, followed by a brief (e.g., 100-300 ms) period of blurriness while the eyes accommodate to the wavefront divergence provided by the new depth plane.

Where the depth plane on which to provide image content is tied to the fixation depth of the user's eyes, errors in determining the fixation depth may cause errors in switching between depth planes. Possible sources of error include, for example, error associated with monitoring a user's eyes (e.g., orientation); gaze tracking; electrical, computational and/or optical limitations of the monitoring hardware; and so on. Due to these sources of error, successive determinations of the location of the fixation point may provide different values for that location. Where the fixation depth is near a boundary between two depth planes, any vacillation in the determined location of the fixation point may cause vacillations in switching between the depth planes. Undesirably, the display system may then alternate between presenting virtual content on a first depth plane and a second depth plane, with each alternation being perceived by a user as flickering. Without being constrained by theory, this flickering can be expected to cause discomfort to the user as well as decrease the user's sense of immersion in a viewing experience.

Figure 16:
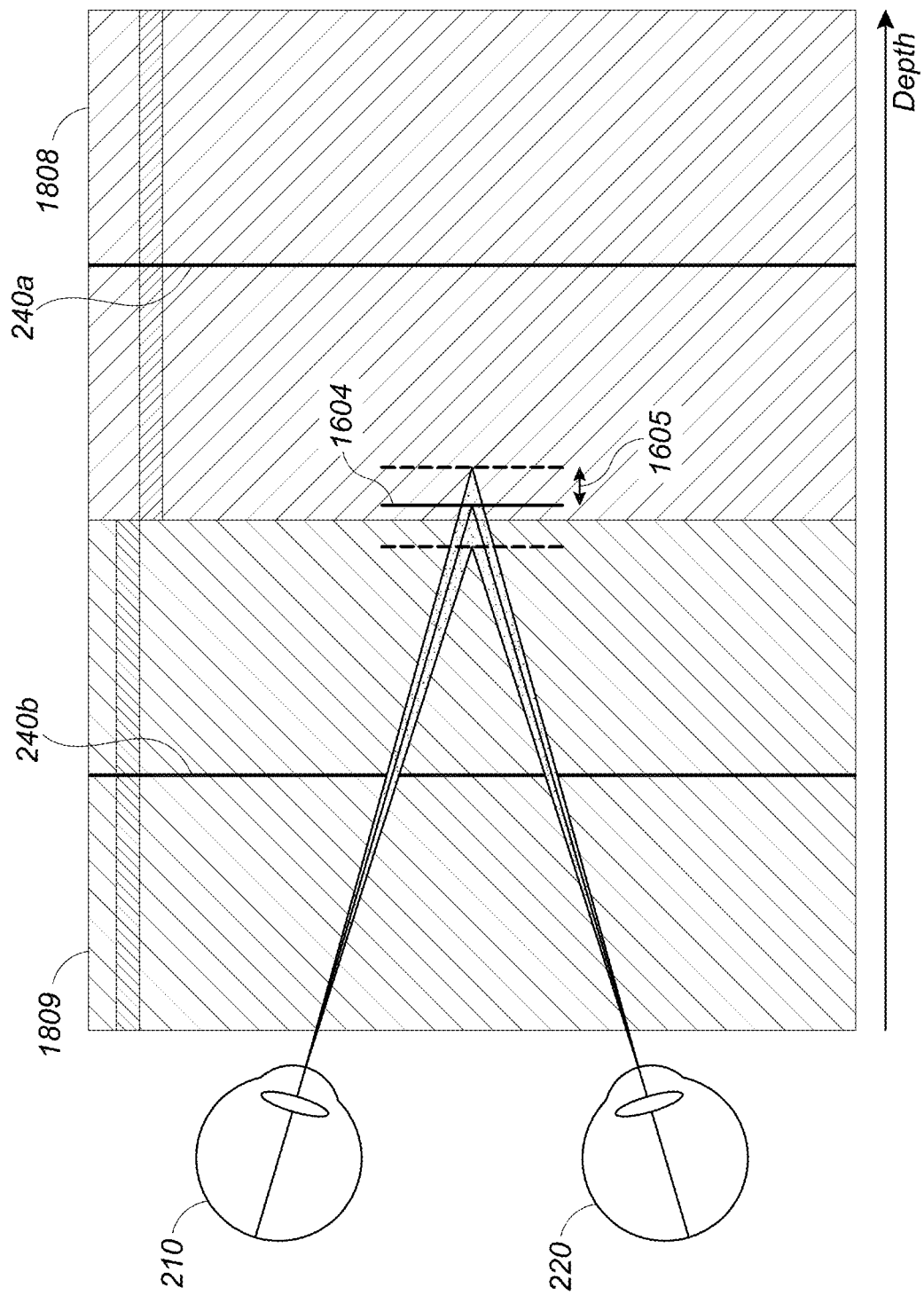
FIG. 16 illustrates an example of a user fixating at a fixation point.
Figure 17:
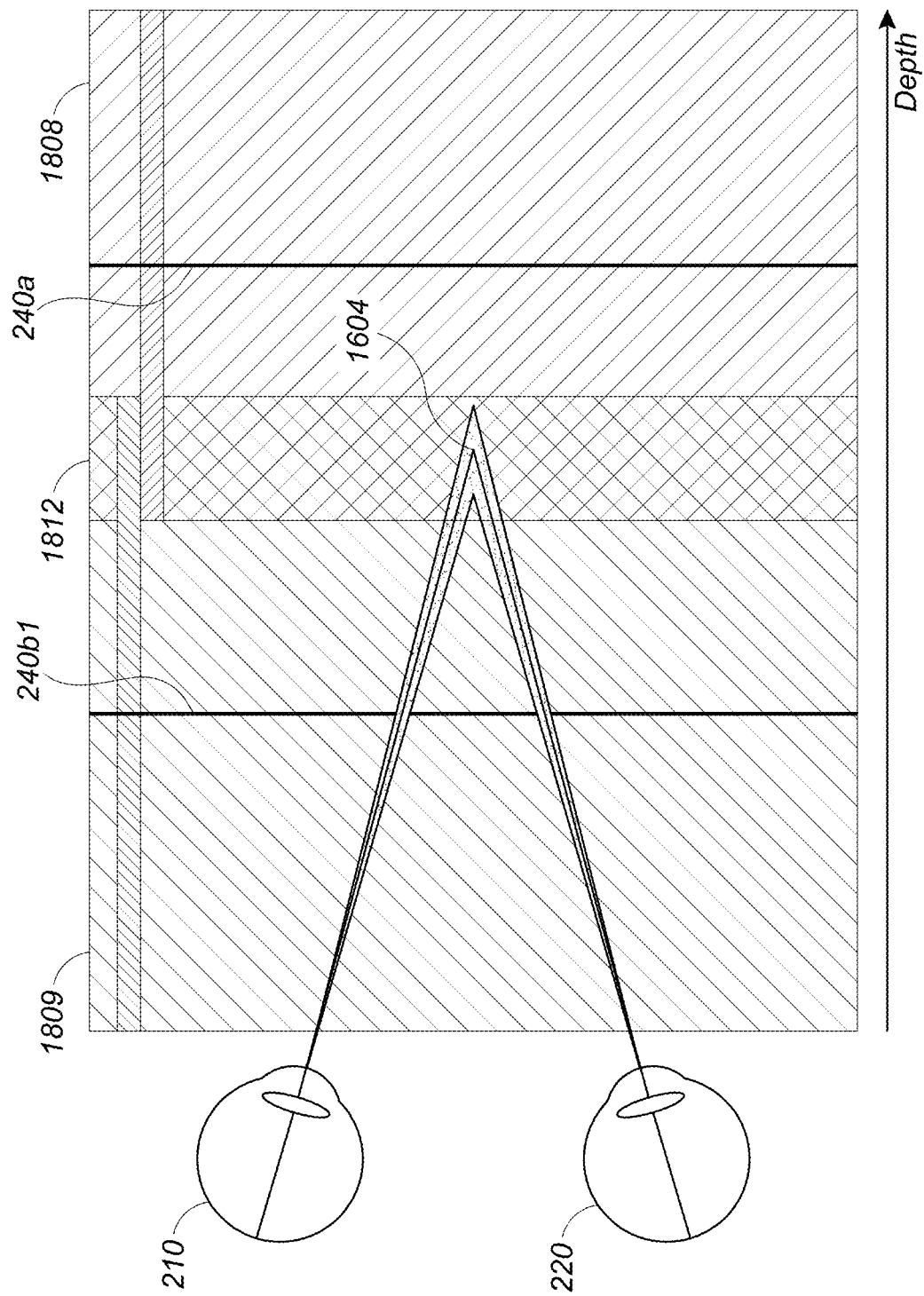
FIG. 17 illustrates a depth overlap between adjacent depth planes.

In some embodiments, techniques are provided for limiting the extent to which undesired switching between depth planes occurs. As will be described below, a depth overlap may be utilized such that a portion of a depth plane range covered or encompassed by a first depth plane may overlap with a portion of a depth plane range covered or encompassed by a second depth plane. A depth range encompassed by a depth plane, for example as described below regarding FIGS. 16-18, represents distances from a user that when fixated upon, cause the display system to select that depth plane for presenting virtual content. In this way, if the user's fixation points vary in depth, but are located within the depth overlap, the display system may not change the depth plane on which virtual content is presented. Thus, a display system may be prevented from unnecessarily switching between different depth planes.

In some embodiments, a depth plane may have an associated depth plane range encompassing depths that extend forwards and backwards, on the z-axis, from the depth plane by a particular value. For example, each depth plane range may extend a particular distance further from a nominal focal depth associated with a depth plane to a particular distance closer from the nominal focal depth. As an example, the particular distance may be 0.2, 0.33, or 0.5 diopters. With respect to the example of 0.33 diopters, for an example depth plane associated with a nominal focal depth of 1 diopter, the display system may present virtual content at the example depth plane if a user is fixating on a three-dimensional location with a depth from the user's eyes (e.g., the exit pupil of the user's eyes) of 0.66 to 1.33 diopters. In some embodiments, the particular distance further from the nominal focal depth may represent an accommodation-vergence mismatch tolerance level (e.g., a maximum mismatch).

As described above, portions of adjacent depth plane ranges may overlap to both encompass a set of depths along the z-axis. In some embodiments, the extent of the depth overlap may be based on the error associated with determining fixation points. For embodiments in which each depth plane encompasses a fixed depth plane range (e.g., based on an accommodation-vergence mismatch tolerance), a depth overlap may cause a shifting of nominal focal depths associated with one or more depth planes, as compared to a depth plane layout without an overlap region. For example, a distal boundary of a particular depth plane may be adjusted to extend beyond a proximal boundary of a further, adjacent, depth plane. Since the distal boundary of the particular depth plane is adjusted to be further in depth from a user, to maintain the fixed depth plane range, the proximal boundary of the particular depth plane may be similarly adjusted to be further in depth. To ensure that all depths encompassed by a depth plane range of the particular depth plane extend less than the accommodation-vergence mismatch tolerance from the nominal focal depth of the particular depth plane, the nominal focal depth therefore is similarly adjusted. Adjusting nominal focal depths of depth planes is described in more detail below, with respect to FIGS. 18A-18B.

The above-described adjusting of a nominal focal depth associated with a depth plane may, in some example display systems, reduce an overall depth plane range over which virtual content may be presented by a display system to a user. For example, as adjacent depth planes overlap or share portions of their depth plane ranges, the aggregate range of depths encompassed by all the depth planes may be less than if there was not overlap between the depth planes. However, since depth overlaps may reduce the occurrences of flickering caused by rapid switching due to errors in the determination of the fixation point of the eyes, the viewing experience of a user may nevertheless be improved, even if the usable range of depths available from the display system is less.

Additionally, if a user is fixating at a particular depth outside of the range of depths encompassed by any depth plane, the display system may optionally present a virtual object with vergence cues that correspond to the particular depth. Since the accommodation cues (e.g., nominal focal depth) associated with the presentation will be based on the closest depth plane to the particular depth, the accommodation-vergence mismatch will exceed the above-described mismatch tolerance levels. Since, as described above, exceeding the accommodation-vergence mismatch tolerance may cause discomfort in the user, the display system may limit the amount of time that virtual content may be presented while the mismatch exceeds the threshold (e.g., 10 seconds, 30 seconds, 3 minutes, and/or a user-selectable amount of time).

In some embodiments, the viewing comfort of the user may be improved by performing a depth plane switch during an event that masks or otherwise decreases the perceptibility of the switch. For example, the display system may determine that virtual content is to be presented at a particular depth plane different from a currently selected depth plane (e.g., due to a user fixating on a new fixation point). The depth plane switch, for example with respect to vari-focal display systems, may cause a perceptible flicker, as noted above. As a result, in some embodiments, the display system may delay the depth plane switch until an event occurs during which the visual system is, e.g., temporarily inactive, and mask the switch by performing the switch during such an event. Such an event may include (1) blinking or (2) performing a saccade. Upon the detection of such an event, the depth plane switch may be performed. As an example, the display system may determine that, based on monitoring a user's three-dimensional fixation points, a different depth plane is to be selected for presenting virtual content. The display system may then wait until (1) the user blinks or (2) the user performs a saccade before switching the presentation of the virtual content to the different depth plane. Preferably, the switch occurs during the blink or saccade and, as a result, the user may not notice the switch since the eyes may be closed or moving at the instant of switching.

Utilizing the techniques described herein, the perceived presentation quality of virtual content may be improved. For example, perceptible visual artifacts, such as flicker caused by switching content between different depth planes, may be reduced, particularly when the display system is operating in a vari-focal mode.

Various embodiments disclosed herein also provide additional systems and methods for providing a comfortable viewing experience to the user. For example, as discussed herein, the accommodation-vergence mismatch may exceed a range that the user may find to be tolerable. In some embodiments, to reduce user discomfort caused by large mismatches in accommodation-vergence, the display system may be configured to actively monitor image content to determine whether the content will cause a large accommodation-vergence mismatch. Upon detecting such a large mismatch, the image content may be modified in such a way as to reduce or eliminate the mismatch before being displayed. For example, the display system may be configured to fade or not display image content that results in a large mismatch.

In some other embodiments, the system may be configured to actively monitor for user eyestrain. Upon detecting eyestrain the system may be configured to modify image content so as to reduce eyestrain.

In some embodiments, physical discomfort with the weight and/or balance of the display system may be addressed using a support structure, which may extend over and/or towards the back of the user's head. The support structure may be, for example, a band that provides a force that pulls the display up (e.g. to reduce the pressure on a nosepad of the device) and/or that counterbalances the weight of the display on both front and back sides of the user's head.

It will be appreciated that the display system may be part of an augmented reality display system, or a virtual reality display system. As one example, the display system may be transmissive and may allow the user a view of the real world, while providing virtual content in the form of images, video, interactivity, and so on, to the user. As another example, the display system may block the user's view of the real world, and virtual reality images, video, interactivity, and so on, may be presented to the user.

Reference will now be made to the figures in which like reference numerals refer to like parts throughout.

Example Display Systems

Figure 2:
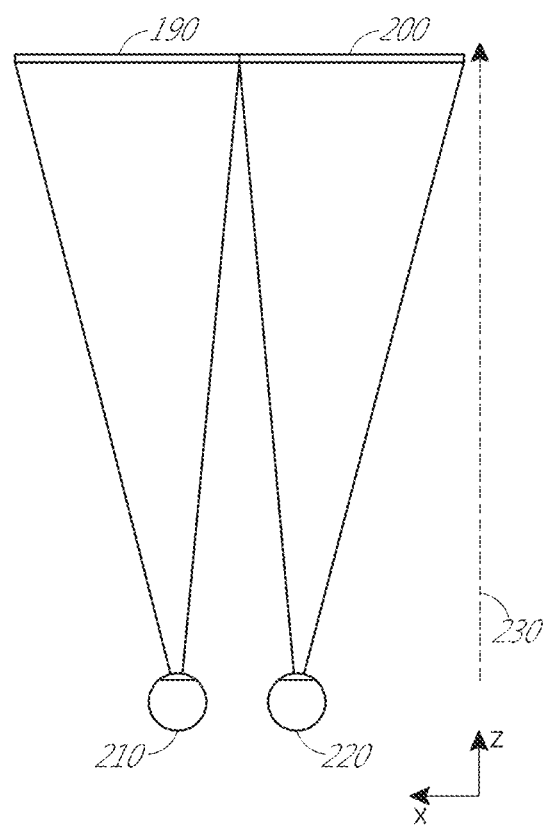
FIG. 2 illustrates a conventional display system for simulating three-dimensional imagery for a user.

FIG. 2 illustrates a conventional display system for simulating three-dimensional imagery for a user. It will be appreciated that a user's eyes are spaced apart and that, when looking at a real object in space, each eye will have a slightly different view of the object and may form an image of the object at different locations on the retina of each eye. This may be referred to as binocular disparity and may be utilized by the human visual system to provide a perception of depth. Conventional display systems simulate binocular disparity by presenting two distinct images 190, 200 with slightly different views of the same virtual object—one for each eye 210, 220—corresponding to the views of the virtual object that would be seen by each eye were the virtual object a real object at a desired depth. These images provide binocular cues that the user's visual system may interpret to derive a perception of depth.

With continued reference to FIG. 2, the images 190, 200 are spaced from the eyes 210, 220 by a distance 230 on a z-axis. The z-axis is parallel to the optical axis of the viewer with their eyes fixated on an object at optical infinity directly ahead of the viewer. The images 190, 200 are flat and at a fixed distance from the eyes 210, 220. Based on the slightly different views of a virtual object in the images presented to the eyes 210, 220, respectively, the eyes may naturally rotate such that an image of the object falls on corresponding points on the retinas of each of the eyes, to maintain single binocular vision. This rotation may cause the lines of sight of each of the eyes 210, 220 to converge onto a point in space at which the virtual object is perceived to be present. As a result, providing three-dimensional imagery conventionally involves providing binocular cues that may manipulate the vergence of the user's eyes 210, 220, and that the human visual system interprets to provide a perception of depth.

Figure 3A:
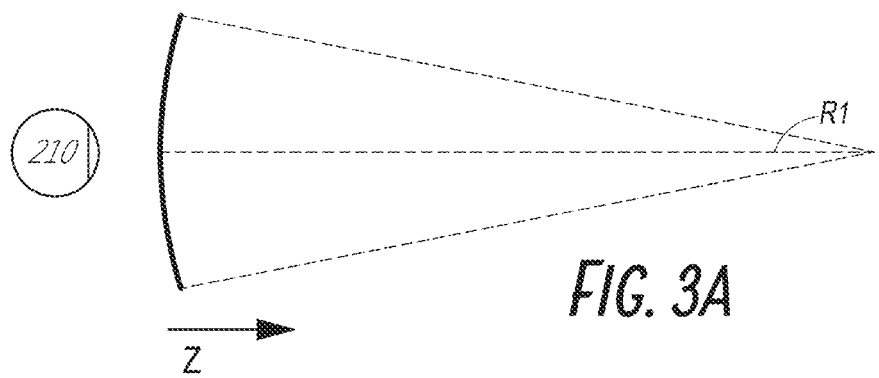
FIGS. 3A-3C illustrate relationships between radius of curvature and focal radius.
Figure 3B:
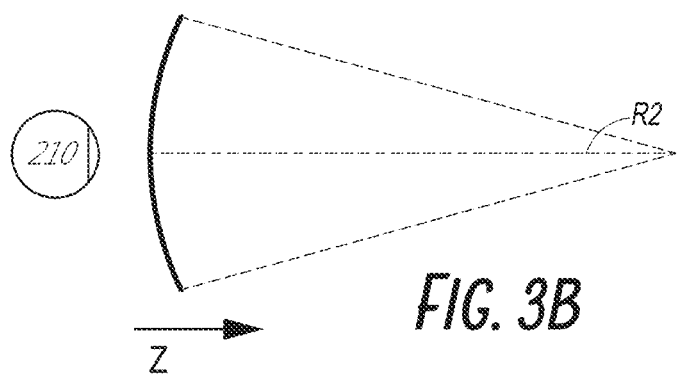
Figure 3C:
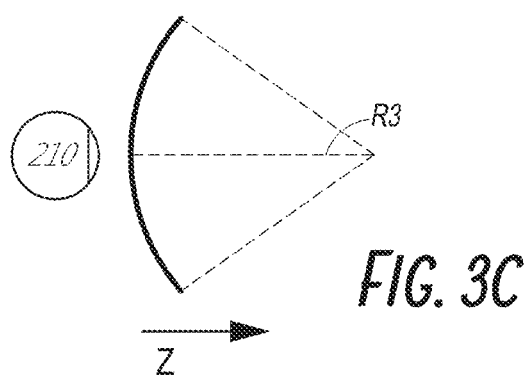

Generating a realistic and comfortable perception of depth is challenging, however. It will be appreciated that light from objects at different distances from the eyes have wavefronts with different amounts of divergence. FIGS. 3A-3C illustrate relationships between distance and the divergence of light rays. The distance between the object and the eye 210 is represented by, in order of decreasing distance, R1, R2, and R3. As shown in FIGS. 3A-3C, the light rays become more divergent as distance to the object decreases. Conversely, as distance increases, the light rays become more collimated. Stated another way, it may be said that the light field produced by a point (the object or a part of the object) has a spherical wavefront curvature, which is a function of how far away the point is from the eye of the user. The curvature increases with decreasing distance between the object and the eye 210. While only a single eye 210 is illustrated for clarity of illustration in FIGS. 3A-3C and other figures herein, the discussions regarding eye 210 may be applied to both eyes 210 and 220 of a viewer.

With continued reference to FIGS. 3A-3C, light from an object that the viewer's eyes are fixated on may have different degrees of wavefront divergence. Due to the different amounts of wavefront divergence, the light may be focused differently by the lens of the eye, which in turn may require the lens to assume different shapes to form a focused image on the retina of the eye. Where a focused image is not formed on the retina, the resulting retinal blur acts as a cue to accommodation that causes a change in the shape of the lens of the eye until a focused image is formed on the retina. For example, the cue to accommodation may trigger the ciliary muscles surrounding the lens of the eye to relax or contract, thereby modulating the force applied to the suspensory ligaments holding the lens, thus causing the shape of the lens of the eye to change until retinal blur is eliminated or minimized, thereby forming a focused image of the object of fixation on the retina/fovea of the eye. The process by which the lens of the eye changes shape may be referred to as accommodation, and the shape of the lens of the eye required to form a focused image of the object of fixation on the retina/fovea of the eye may be referred to as an accommodative state.

Figure 4A:
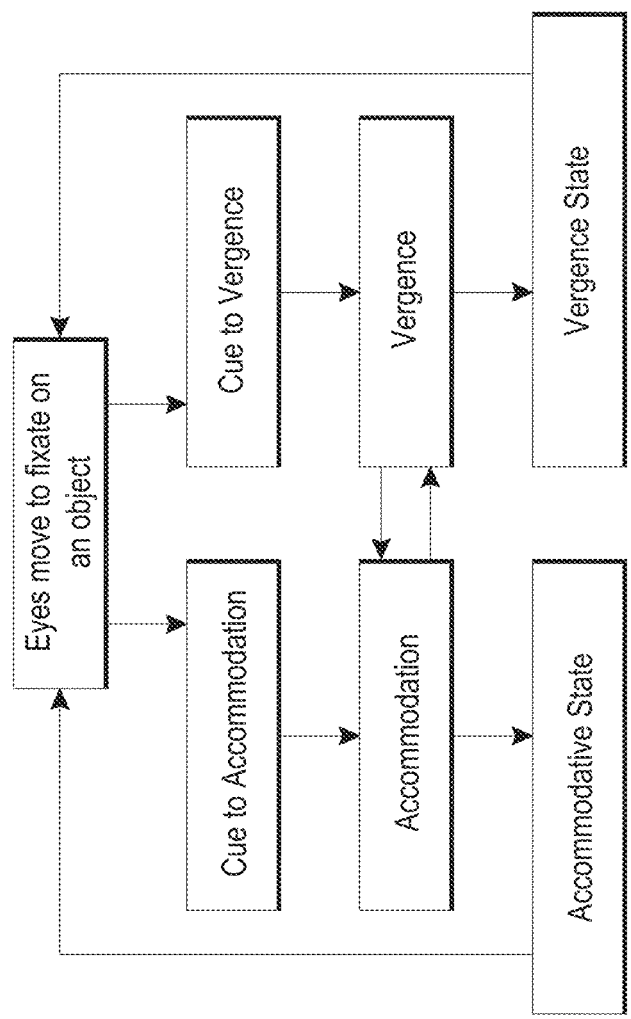
FIG. 4A illustrates a representation of the accommodation-vergence response of the human visual system.

With reference now to FIG. 4A, a representation of the accommodation-vergence response of the human visual system is illustrated. The movement of the eyes to fixate on an object causes the eyes to receive light from the object, with the light forming an image on each of the retinas of the eyes. The presence of retinal blur in the image formed on the retina may provide a cue to accommodation, and the relative locations of the image on the retinas may provide a cue to vergence. The cue to accommodation causes accommodation to occur, resulting in the lenses of the eyes each assuming a particular accommodative state that forms a focused image of the object on the retina/fovea of the eye. On the other hand, the cue to vergence causes vergence movements (rotation of the eyes) to occur such that the images formed on each retina of each eye are at corresponding retinal points that maintain single binocular vision. In these positions, the eyes may be said to have assumed a particular vergence state. With continued reference to FIG. 4A, accommodation may be understood to be the process by which the eye achieves a particular accommodative state, and vergence may be understood to be the process by which the eye achieves a particular vergence state. As indicated in FIG. 4A, the accommodative and vergence states of the eyes may change if the user fixates on another object. For example, the accommodated state may change if the user fixates on a new object at a different depth on the z-axis.

Without being limited by theory, it is believed that viewers of an object may perceive the object as being "three-dimensional" due to a combination of vergence and accommodation. As noted above, vergence movements (e.g., rotation of the eyes so that the pupils move toward or away from each other to converge the lines of sight of the eyes to fixate upon an object) of the two eyes relative to each other are closely associated with accommodation of the lenses of the eyes. Under normal conditions, changing the shapes of the lenses of the eyes to change focus from one object to another object at a different distance will automatically cause a matching change in vergence to the same distance, under a relationship known as the "accommodation-vergence reflex." Likewise, a change in vergence will trigger a matching change in lens shape under normal conditions.

Figure 4B:
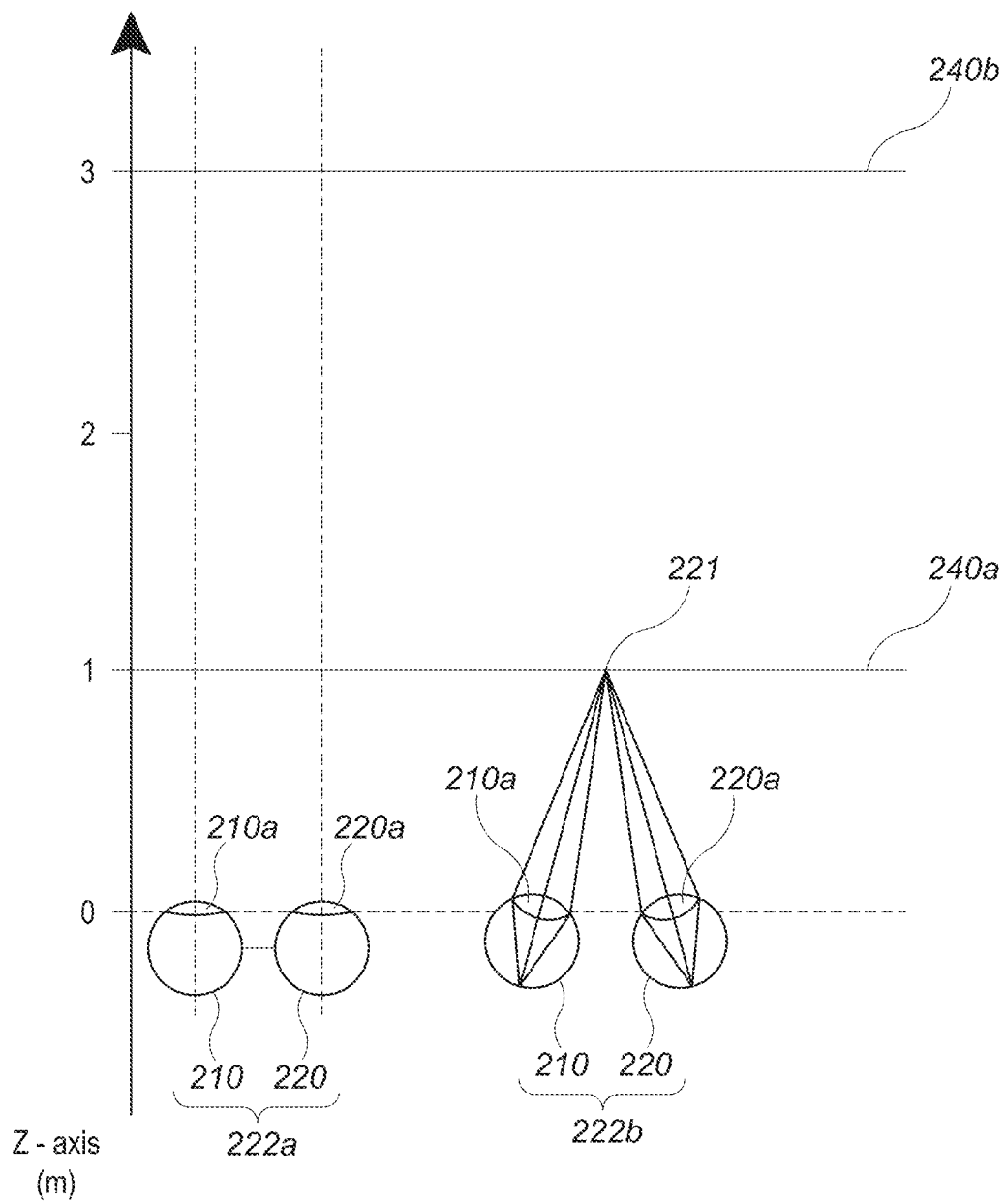
FIG. 4B illustrates examples of different accommodative states and vergence states of a pair of eyes of the user.

With reference now to FIG. 4B, examples of different accommodative and vergence states of the eyes are illustrated. The pair of eyes 222a are fixated on an object at optical infinity, while the pair eyes 222b are fixated on an object 221 at less than optical infinity. Notably, the vergence states of each pair of eyes is different, with the pair of eyes 222a directed straight ahead, while the pair of eyes 222 converge on the object 221. The accommodative states of the eyes forming each pair of eyes 222a and 222b are also different, as represented by the different shapes of the lenses 210a, 220a.

Undesirably, many users of conventional "3-D" display systems find such conventional systems to be uncomfortable or may not perceive a sense of depth at all due to a mismatch between accommodative and vergence states in these displays. As noted above, many stereoscopic or "3-D" display systems display a scene by providing slightly different images to each eye. Such systems are uncomfortable for many viewers, since they, among other things, simply provide different presentations of a scene and cause changes in the vergence states of the eyes, but without a corresponding change in the accommodative states of those eyes. Rather, the images are shown by a display at a fixed distance from the eyes, such that the eyes view all the image information at a single accommodative state. Such an arrangement works against the "accommodation-vergence reflex" by causing changes in the vergence state without a matching change in the accommodative state. This mismatch is believed to cause viewer discomfort. Display systems that provide a better match between accommodation and vergence may form more realistic and comfortable simulations of three-dimensional imagery.

Without being limited by theory, it is believed that the human eye typically may interpret a finite number of depth planes to provide depth perception. Consequently, a highly believable simulation of perceived depth may be achieved by providing, to the eye, different presentations of an image corresponding to each of these limited numbers of depth planes. In some embodiments, the different presentations may provide both cues to vergence and matching cues to accommodation, thereby providing physiologically correct accommodation-vergence matching.

With continued reference to FIG. 4B, two depth planes 240, corresponding to different distances in space from the eyes 210, 220, are illustrated. For a given depth plane 240, vergence cues may be provided by the displaying of images of appropriately different perspectives for each eye 210, 220. In addition, for a given depth plane 240, light forming the images provided to each eye 210, 220 may have a wavefront divergence corresponding to a light field produced by a point at the distance of that depth plane 240.

In the illustrated embodiment, the distance, along the z-axis, of the depth plane 240 containing the point 221 is 1 m. As used herein, distances or depths along the z-axis may be measured with a zero point located at the exit pupils of the user's eyes. Thus, a depth plane 240 located at a depth of 1 m corresponds to a distance of 1 m away from the exit pupils of the user's eyes, on the optical axis of those eyes. As an approximation, the depth or distance along the z-axis may be measured from the display in front of the user's eyes (e.g., from the surface of a waveguide), plus a value for the distance between the device and the exit pupils of the user's eyes. That value may be called the eye relief and corresponds to the distance between the exit pupil of the user's eye and the display worn by the user in front of the eye. In practice, the value for the eye relief may be a normalized value used generally for all viewers. For example, the eye relief may be assumed to be 20 mm and a depth plane that is at a depth of 1 m may be at a distance of 980 mm in front of the display.

Figure 5:
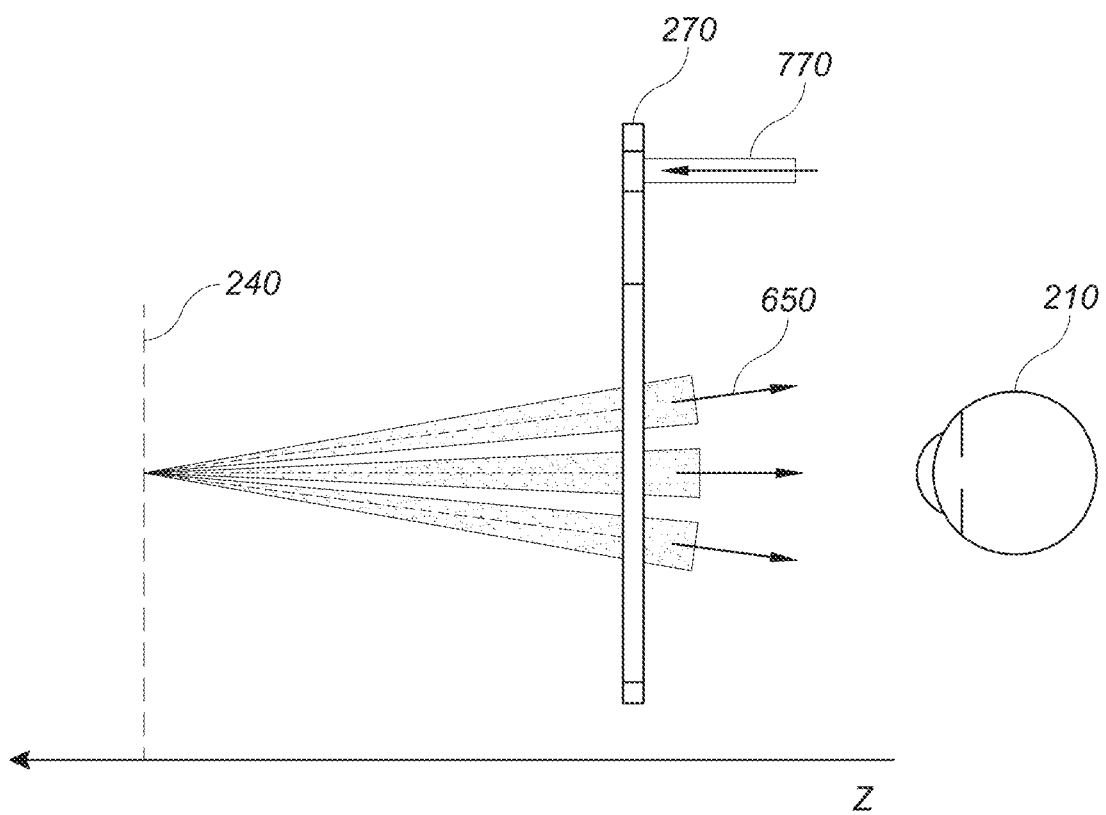
FIG. 5 illustrates aspects of an approach for simulating three-dimensional imagery by modifying wavefront divergence.

FIG. 5 illustrates aspects of an approach for simulating three-dimensional imagery by modifying wavefront divergence. The display system includes a waveguide 270 that is configured to receive light 770 that is encoded with image information, and to output that light to the user's eye 210. The waveguide 270 may output the light 650 with a defined amount of wavefront divergence corresponding to the wavefront divergence of a light field produced by a point on a desired depth plane 240. In some embodiments, the same amount of wavefront divergence is provided for all objects presented on that depth plane. In addition, it will be illustrated that the other eye of the user may be provided with image information from a similar waveguide.

In some embodiments, a single waveguide may be configured to output light with a set amount of wavefront divergence corresponding to a single or limited number of depth planes and/or the waveguide may be configured to output light of a limited range of wavelengths. Consequently, in some embodiments, a plurality or stack of waveguides may be utilized to provide different amounts of wavefront divergence for different depth planes and/or to output light of different ranges of wavelengths.

Figure 6:
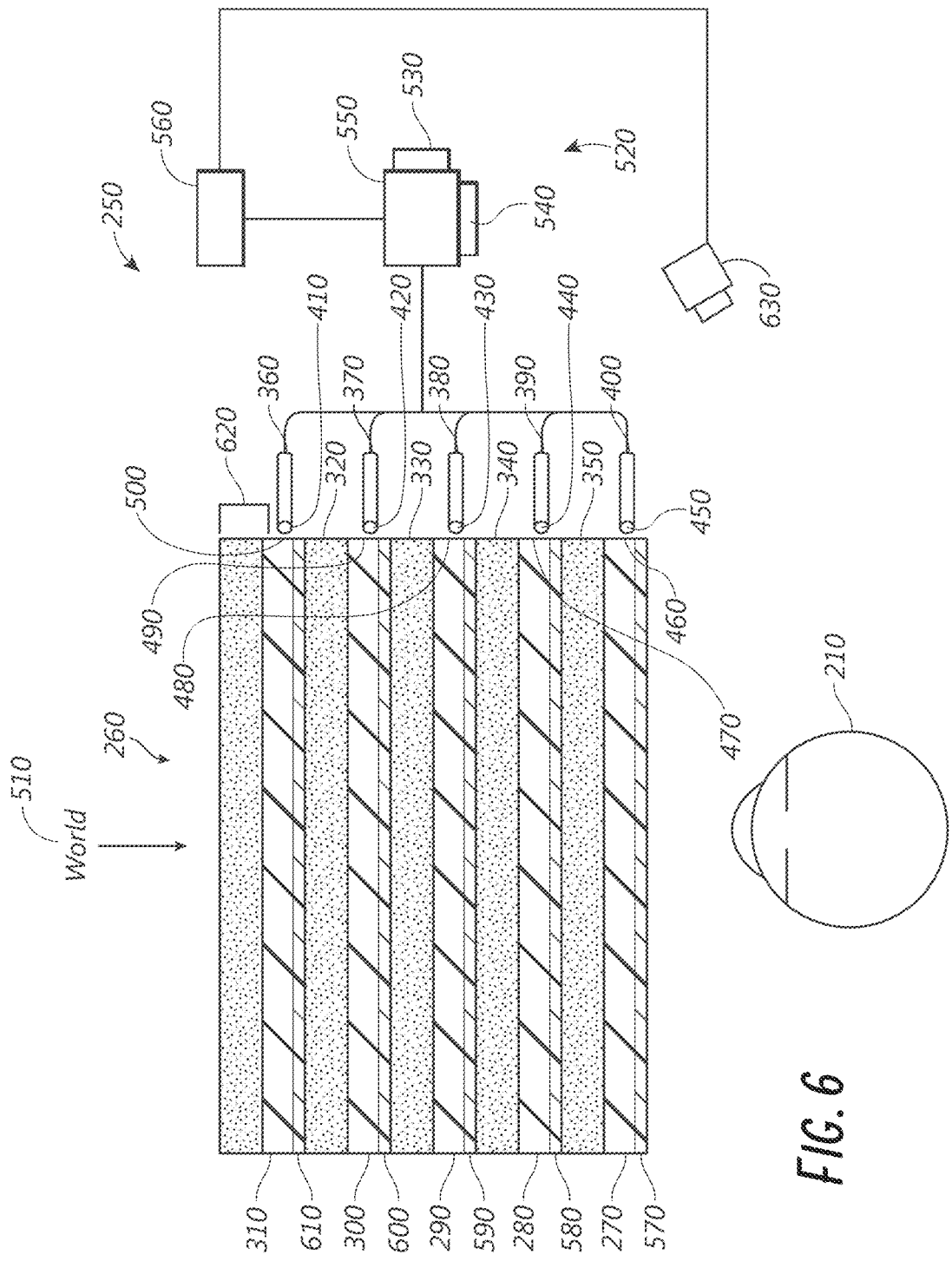
FIG. 6 illustrates an example of a waveguide stack for outputting image information to a user.

FIG. 6 illustrates an example of a waveguide stack for outputting image information to a user. A display system 250 includes a stack of waveguides, or stacked waveguide assembly, 260 that may be utilized to provide three-dimensional perception to the eye/brain using a plurality of waveguides 270, 280, 290, 300, 310. It will be appreciated that the display system 250 may be considered a light field display in some embodiments. In addition, the waveguide assembly 260 may also be referred to as an eyepiece.

In some embodiments, the display system 250 may be configured to provide substantially continuous cues to vergence and multiple discrete cues to accommodation. The cues to vergence may be provided by displaying different images to each of the eyes of the user, and the cues to accommodation may be provided by outputting the light that forms the images with discrete amounts of wavefront divergence. In some embodiments, each discrete level of wavefront divergence corresponds to a particular depth plane and may be provided by a particular one of the waveguides 270, 280, 290, 300, 310.

With continued reference to FIG. 6, the waveguide assembly 260 may also include a plurality of features 320, 330, 340, 350 between the waveguides. In some embodiments, the features 320, 330, 340, 350 may be one or more lenses. The waveguides 270, 280, 290, 300, 310 and/or the plurality of lenses 320, 330, 340, 350 may be configured to send image information to the eye with various levels of wavefront curvature or light ray divergence. Each waveguide level may be associated with a particular depth plane and may be configured to output image information corresponding to that depth plane. Image injection devices 360, 370, 380, 390, 400 may function as a source of light for the waveguides and may be utilized to inject image information into the waveguides 270, 280, 290, 300, 310, each of which may be configured, as described herein, to distribute incoming light across each respective waveguide, for output toward the eye 210. Light exits an output surface 410, 420, 430, 440, 450 of the image injection devices 360, 370, 380, 390, 400 and is injected into a corresponding input surface 460, 470, 480, 490, 500 of the waveguides 270, 280, 290, 300, 310. In some embodiments, each of the input surfaces 460, 470, 480, 490, 500 may be an edge of a corresponding waveguide, or may be part of a major surface of the corresponding waveguide (that is, one of the waveguide surfaces directly facing the world 510 or the viewer's eye 210). In some embodiments, a single beam of light (e.g. a collimated beam) may be injected into each waveguide to output an entire field of cloned collimated beams that are directed toward the eye 210 at particular angles (and amounts of divergence) corresponding to the depth plane associated with a particular waveguide. In some embodiments, a single one of the image injection devices 360, 370, 380, 390, 400 may be associated with and inject light into a plurality (e.g., three) of the waveguides 270, 280, 290, 300, 310.

In some embodiments, the image injection devices 360, 370, 380, 390, 400 are discrete displays that each produce image information for injection into a corresponding waveguide 270, 280, 290, 300, 310, respectively. In some other embodiments, the image injection devices 360, 370, 380, 390, 400 are the output ends of a single multiplexed display which may, e.g., pipe image information via one or more optical conduits (such as fiber optic cables) to each of the image injection devices 360, 370, 380, 390, 400. It will be appreciated that the image information provided by the image injection devices 360, 370, 380, 390, 400 may include light of different wavelengths, or colors (e.g., different component colors, as discussed herein).

In some embodiments, the light injected into the waveguides 270, 280, 290, 300, 310 is provided by a light projector system 520, which comprises a light module 530, which may include a light emitter, such as a light emitting diode (LED). The light from the light module 530 may be directed to and modified by a light modulator 540, e.g., a spatial light modulator, via a beam splitter 550. The light modulator 540 may be configured to change the perceived intensity of the light injected into the waveguides 270, 280, 290, 300, 310 to encode the light with image information. Examples of spatial light modulators include liquid crystal displays (LCD) including a liquid crystal on silicon (LCOS) displays. It will be appreciated that the image injection devices 360, 370, 380, 390, 400 are illustrated schematically and, in some embodiments, these image injection devices may represent different light paths and locations in a common projection system configured to output light into associated ones of the waveguides 270, 280, 290, 300, 310. In some embodiments, the waveguides of the waveguide assembly 260 may function as ideal lens while relaying light injected into the waveguides out to the user's eyes. In this conception, the object may be the spatial light modulator 540 and the image may be the image on the depth plane.

In some embodiments, the display system 250 may be a scanning fiber display comprising one or more scanning fibers configured to project light in various patterns (e.g., raster scan, spiral scan, Lissajous patterns, etc.) into one or more waveguides 270, 280, 290, 300, 310 and ultimately to the eye 210 of the viewer. In some embodiments, the illustrated image injection devices 360, 370, 380, 390, 400 may schematically represent a single scanning fiber or a bundle of scanning fibers configured to inject light into one or a plurality of the waveguides 270, 280, 290, 300, 310. In some other embodiments, the illustrated image injection devices 360, 370, 380, 390, 400 may schematically represent a plurality of scanning fibers or a plurality of bundles of scanning fibers, each of which are configured to inject light into an associated one of the waveguides 270, 280, 290, 300, 310. It will be appreciated that one or more optical fibers may be configured to transmit light from the light module 530 to the one or more waveguides 270, 280, 290, 300, 310. It will be appreciated that one or more intervening optical structures may be provided between the scanning fiber, or fibers, and the one or more waveguides 270, 280, 290, 300, 310 to, e.g., redirect light exiting the scanning fiber into the one or more waveguides 270, 280, 290, 300, 310.

A controller 560 controls the operation of one or more of the stacked waveguide assembly 260, including operation of the image injection devices 360, 370, 380, 390, 400, the light source 530, and the light modulator 540. In some embodiments, the controller 560 is part of the local data processing module 140. The controller 560 includes programming (e.g., instructions in a non-transitory medium) that regulates the timing and provision of image information to the waveguides 270, 280, 290, 300, 310 according to, e.g., any of the various schemes disclosed herein. In some embodiments, the controller may be a single integral device, or a distributed system connected by wired or wireless communication channels. The controller 560 may be part of the processing modules 140 or 150 (FIG. 9D) in some embodiments.

With continued reference to FIG. 6, the waveguides 270, 280, 290, 300, 310 may be configured to propagate light within each respective waveguide by total internal reflection (TIR). The waveguides 270, 280, 290, 300, 310 may each be planar or have another shape (e.g., curved), with major top and bottom surfaces and edges extending between those major top and bottom surfaces. In the illustrated configuration, the waveguides 270, 280, 290, 300, 310 may each include out-coupling optical elements 570, 580, 590, 600, 610 that are configured to extract light out of a waveguide by redirecting the light, propagating within each respective waveguide, out of the waveguide to output image information to the eye 210. Extracted light may also be referred to as out-coupled light and the out-coupling optical elements light may also be referred to light extracting optical elements. An extracted beam of light may be outputted by the waveguide at locations at which the light propagating in the waveguide strikes a light extracting optical element. The out-coupling optical elements 570, 580, 590, 600, 610 may, for example, be gratings, including diffractive optical features, as discussed further herein. While illustrated disposed at the bottom major surfaces of the waveguides 270, 280, 290, 300, 310, for ease of description and drawing clarity, in some embodiments, the out-coupling optical elements 570, 580, 590, 600, 610 may be disposed at the top and/or bottom major surfaces, and/or may be disposed directly in the volume of the waveguides 270, 280, 290, 300, 310, as discussed further herein. In some embodiments, the out-coupling optical elements 570, 580, 590, 600, 610 may be formed in a layer of material that is attached to a transparent substrate to form the waveguides 270, 280, 290, 300, 310. In some other embodiments, the waveguides 270, 280, 290, 300, 310 may be a monolithic piece of material and the out-coupling optical elements 570, 580, 590, 600, 610 may be formed on a surface and/or in the interior of that piece of material.

With continued reference to FIG. 6, as discussed herein, each waveguide 270, 280, 290, 300, 310 is configured to output light to form an image corresponding to a particular depth plane. For example, the waveguide 270 nearest the eye may be configured to deliver collimated light (which was injected into such waveguide 270), to the eye 210. The collimated light may be representative of the optical infinity focal plane. The next waveguide up 280 may be configured to send out collimated light which passes through the first lens 350 (e.g., a negative lens) before it may reach the eye 210; such first lens 350 may be configured to create a slight convex wavefront curvature so that the eye/brain interprets light coming from that next waveguide up 280 as coming from a first focal plane closer inward toward the eye 210 from optical infinity. Similarly, the third up waveguide 290 passes its output light through both the first 350 and second 340 lenses before reaching the eye 210; the combined optical power of the first 350 and second 340 lenses may be configured to create another incremental amount of wavefront curvature so that the eye/brain interprets light coming from the third waveguide 290 as coming from a second focal plane that is even closer inward toward the person from optical infinity than was light from the next waveguide up 280.

The other waveguide layers 300, 310 and lenses 330, 320 are similarly configured, with the highest waveguide 310 in the stack sending its output through all of the lenses between it and the eye for an aggregate focal power representative of the closest focal plane to the person. To compensate for the stack of lenses 320, 330, 340, 350 when viewing/interpreting light coming from the world 510 on the other side of the stacked waveguide assembly 260, a compensating lens layer 620 may be disposed at the top of the stack to compensate for the aggregate power of the lens stack 320, 330, 340, 350 below. Such a configuration provides as many perceived focal planes as there are available waveguide/lens pairings. Both the out-coupling optical elements of the waveguides and the focusing aspects of the lenses may be static (i.e., not dynamic or electro-active). In some alternative embodiments, either or both may be dynamic using electro-active features.

In some embodiments, two or more of the waveguides 270, 280, 290, 300, 310 may have the same associated depth plane. For example, multiple waveguides 270, 280, 290, 300, 310 may be configured to output images set to the same depth plane, or multiple subsets of the waveguides 270, 280, 290, 300, 310 may be configured to output images set to the same plurality of depth planes, with one set for each depth plane. This may provide advantages for forming a tiled image to provide an expanded field of view at those depth planes.

With continued reference to FIG. 6, the out-coupling optical elements 570, 580, 590, 600, 610 may be configured to both redirect light out of their respective waveguides and to output this light with the appropriate amount of divergence or collimation for a particular depth plane associated with the waveguide. As a result, waveguides having different associated depth planes may have different configurations of out-coupling optical elements 570, 580, 590, 600, 610, which output light with a different amount of divergence depending on the associated depth plane. In some embodiments, the light extracting optical elements 570, 580, 590, 600, 610 may be volumetric or surface features, which may be configured to output light at specific angles. For example, the light extracting optical elements 570, 580, 590, 600, 610 may be volume holograms, surface holograms, and/or diffraction gratings. In some embodiments, the features 320, 330, 340, 350 may not be lenses; rather, they may simply be spacers (e.g., cladding layers and/or structures for forming air gaps).

In some embodiments, the out-coupling optical elements 570, 580, 590, 600, 610 are diffractive features that form a diffraction pattern, or "diffractive optical element" (also referred to herein as a "DOE"). Preferably, the DOE's have a sufficiently low diffraction efficiency so that only a portion of the light of the beam is deflected away toward the eye 210 with each intersection of the DOE, while the rest continues to move through a waveguide via TIR. The light carrying the image information is thus divided into a number of related exit beams that exit the waveguide at a multiplicity of locations and the result is a fairly uniform pattern of exit emission toward the eye 210 for this particular collimated beam bouncing around within a waveguide.

In some embodiments, one or more DOEs may be switchable between "on" states in which they actively diffract, and "off" states in which they do not significantly diffract. For instance, a switchable DOE may comprise a layer of polymer dispersed liquid crystal, in which microdroplets comprise a diffraction pattern in a host medium, and the refractive index of the microdroplets may be switched to substantially match the refractive index of the host material (in which case the pattern does not appreciably diffract incident light) or the microdroplet may be switched to an index that does not match that of the host medium (in which case the pattern actively diffracts incident light).

In some embodiments, a camera assembly 630 (e.g., a digital camera, including visible light and infrared light cameras) may be provided to capture images of the eye 210 and/or tissue around the eye 210 to, e.g., detect user inputs and/or to monitor the physiological state of the user. As used herein, a camera may be any image capture device. In some embodiments, the camera assembly 630 may include an image capture device and a light source to project light (e.g., infrared light) to the eye, which may then be reflected by the eye and detected by the image capture device. In some embodiments, the camera assembly 630 may be attached to the frame 80 (FIG. 9D) and may be in electrical communication with the processing modules 140 and/or 150, which may process image information from the camera assembly 630. In some embodiments, one camera assembly 630 may be utilized for each eye, to separately monitor each eye.

Figure 7:
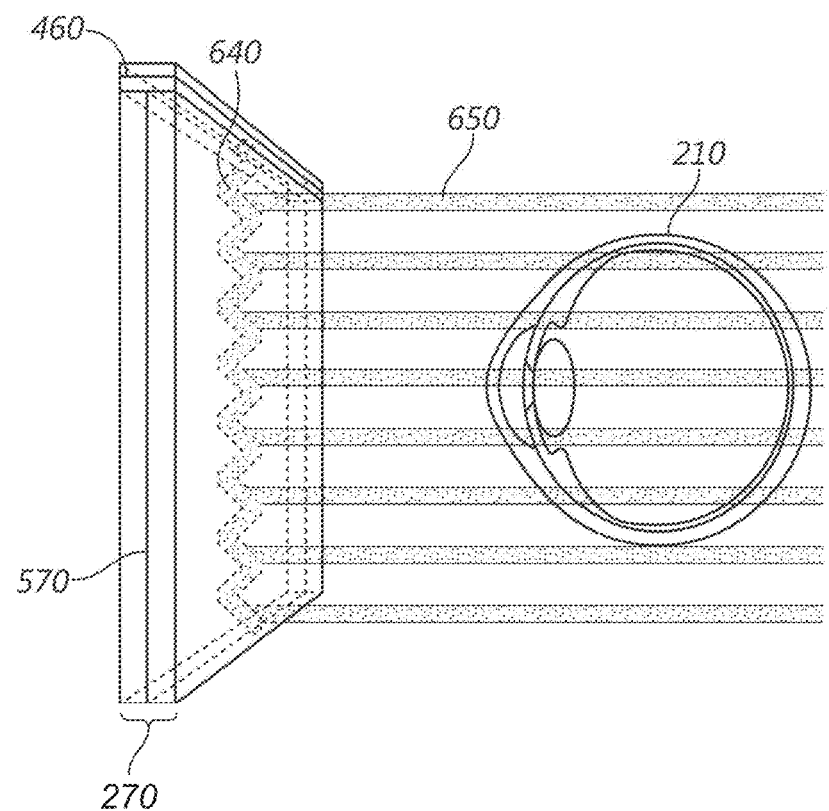
FIG. 7 illustrates an example of exit beams outputted by a waveguide.

With reference now to FIG. 7, an example of exit beams outputted by a waveguide is shown. One waveguide is illustrated, but it will be appreciated that other waveguides in the waveguide assembly 260 (FIG. 6) may function similarly, where the waveguide assembly 260 includes multiple waveguides. Light 640 is injected into the waveguide 270 at the input surface 460 of the waveguide 270 and propagates within the waveguide 270 by TIR. At points where the light 640 impinges on the DOE 570, a portion of the light exits the waveguide as exit beams 650. The exit beams 650 are illustrated as substantially parallel but, as discussed herein, they may also be redirected to propagate to the eye 210 at an angle (e.g., forming divergent exit beams), depending on the depth plane associated with the waveguide 270. It will be appreciated that substantially parallel exit beams may be indicative of a waveguide with out-coupling optical elements that out-couple light to form images that appear to be set on a depth plane at a large distance (e.g., optical infinity) from the eye 210. Other waveguides or other sets of out-coupling optical elements may output an exit beam pattern that is more divergent, which would require the eye 210 to accommodate to a closer distance to bring it into focus on the retina and would be interpreted by the brain as light from a distance closer to the eye 210 than optical infinity.

Figure 8:
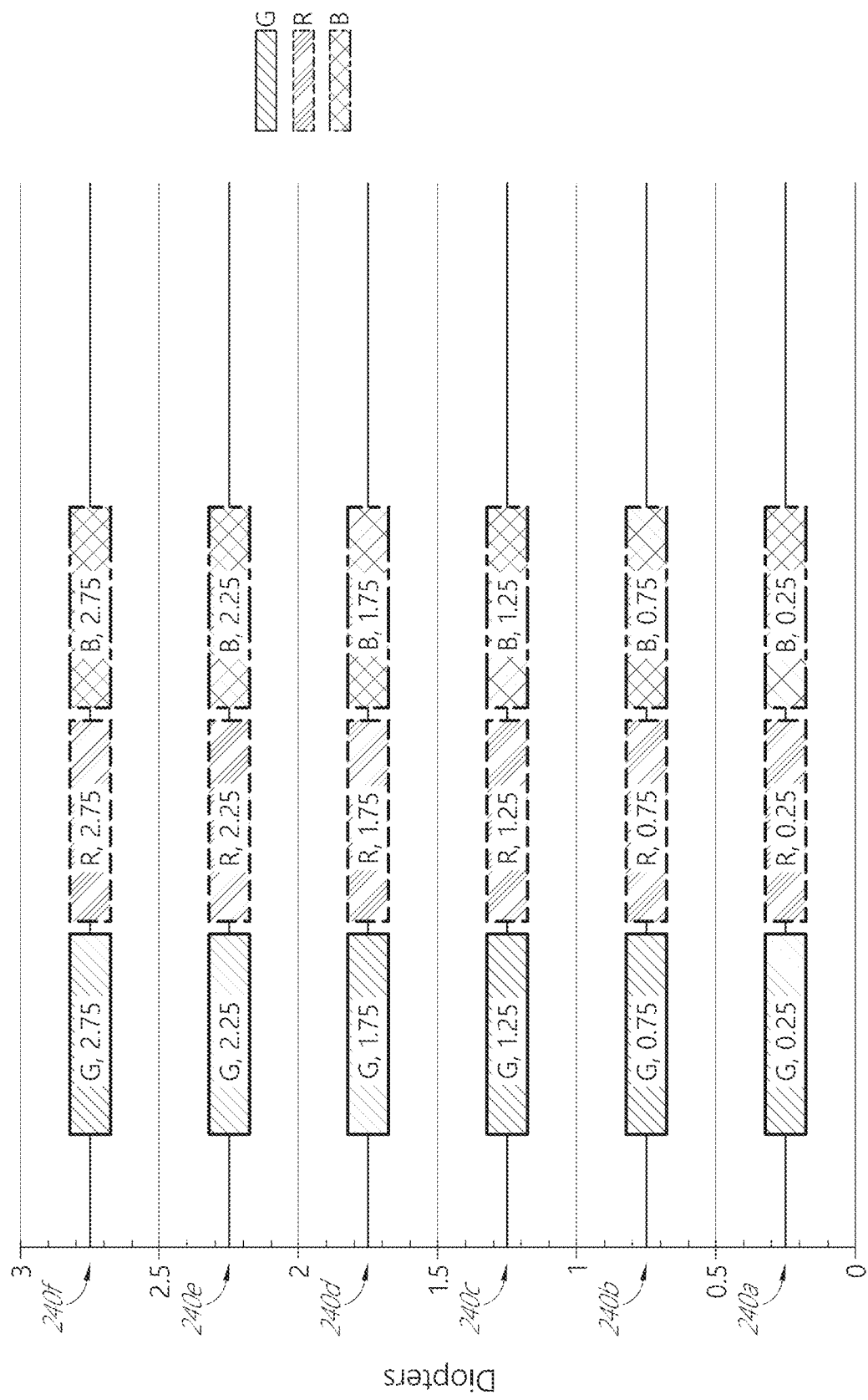
FIG. 8 illustrates an example of a stacked waveguide assembly in which each depth plane includes images formed using multiple different component colors.

In some embodiments, a full color image may be formed at each depth plane by overlaying images in each of the component colors, e.g., three or more component colors. FIG. 8 illustrates an example of a stacked waveguide assembly in which each depth plane includes images formed using multiple different component colors. The illustrated embodiment shows depth planes 240*a*-240*f*, although more or fewer depths are also contemplated. Each depth plane may have three or more component color images associated with it, including: a first image of a first color, G; a second image of a second color, R; and a third image of a third color, B. Different depth planes are indicated in the figure by different numbers for diopters (dpt) following the letters G, R, and B. Just as examples, the numbers following each of these letters indicate diopters (1/m), or inverse distance of the depth plane from a viewer, and each box in the figures represents an individual component color image. In some embodiments, to account for differences in the eye's focusing of light of different wavelengths, the exact placement of the depth planes for different component colors may vary. For example, different component color images for a given depth plane may be placed on depth planes corresponding to different distances from the user. Such an arrangement may increase visual acuity and user comfort and/or may decrease chromatic aberrations.

In some embodiments, light of each component color may be outputted by a single dedicated waveguide and, consequently, each depth plane may have multiple waveguides associated with it. In such embodiments, each box in the figures including the letters G, R, or B may be understood to represent an individual waveguide, and three waveguides may be provided per depth plane where three component color images are provided per depth plane. While the waveguides associated with each depth plane are shown adjacent to one another in this drawing for ease of description, it will be appreciated that, in a physical device, the waveguides may all be arranged in a stack with one waveguide per level. In some other embodiments, multiple component colors may be outputted by the same waveguide, such that, e.g., only a single waveguide may be provided per depth plane.

With continued reference to FIG. 8, in some embodiments, G is the color green, R is the color red, and B is the color blue. In some other embodiments, other colors associated with other wavelengths of light, including magenta and cyan, may be used in addition to or may replace one or more of red, green, or blue.

It will be appreciated that references to a given color of light throughout this disclosure will be understood to encompass light of one or more wavelengths within a range of wavelengths of light that are perceived by a viewer as being of that given color. For example, red light may include light of one or more wavelengths in the range of about 620-780 nm, green light may include light of one or more wavelengths in the range of about 492-577 nm, and blue light may include light of one or more wavelengths in the range of about 435-493 nm.

In some embodiments, the light source 530 (FIG. 6) may be configured to emit light of one or more wavelengths outside the visual perception range of the viewer, for example, infrared and/or ultraviolet wavelengths. In addition, the in-coupling, out-coupling, and other light redirecting structures of the waveguides of the display 250 may be configured to direct and emit this light out of the display towards the user's eye 210, e.g., for imaging and/or user stimulation applications.

Figure 9A:
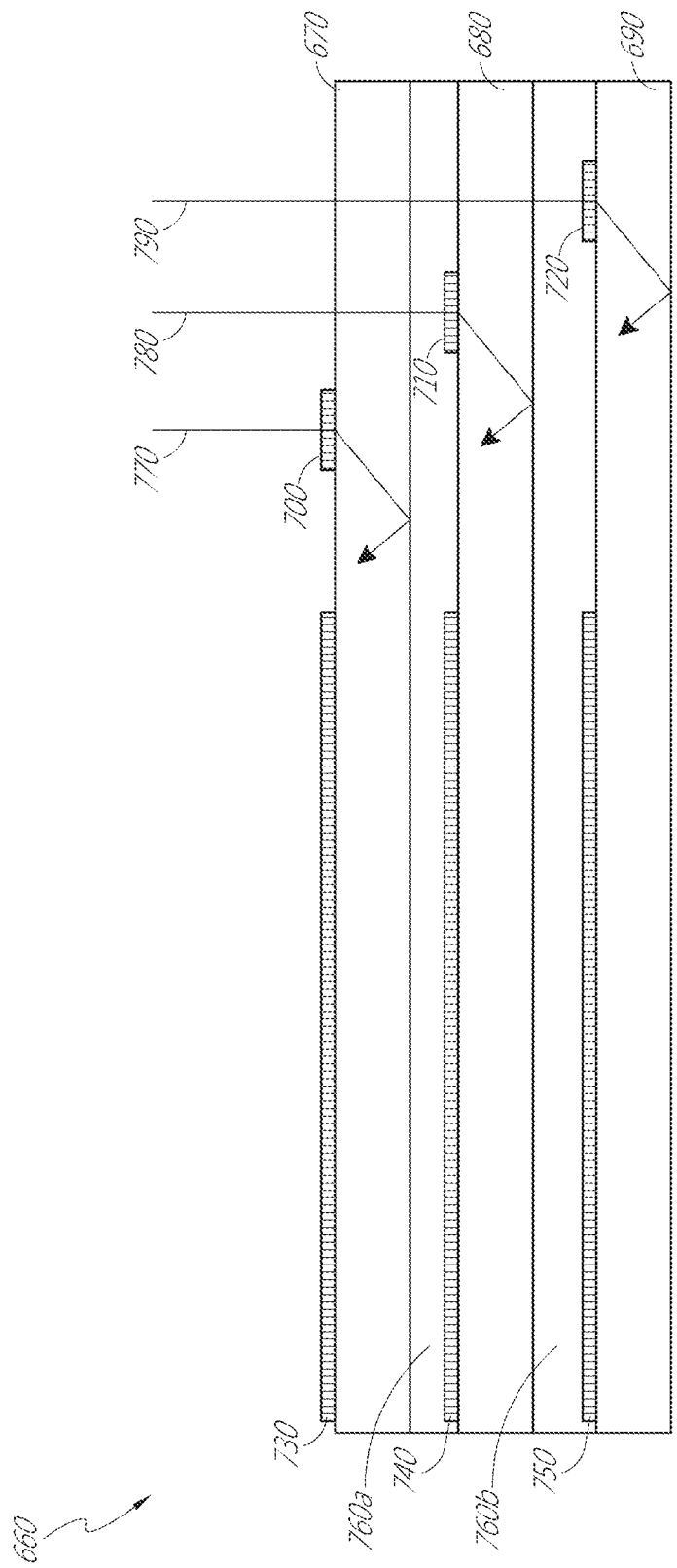
FIG. 9A illustrates a cross-sectional side view of an example of a set of stacked waveguides that each includes an incoupling optical element.

With reference now to FIG. 9A, in some embodiments, light impinging on a waveguide may need to be redirected to in-couple that light into the waveguide. An in-coupling optical element may be used to redirect and in-couple the light into its corresponding waveguide. FIG. 9A illustrates a cross-sectional side view of an example of a plurality or set 660 of stacked waveguides that each includes an in-coupling optical element. The waveguides may each be configured to output light of one or more different wavelengths, or one or more different ranges of wavelengths. It will be appreciated that the stack 660 may correspond to the stack 260 (FIG. 6) and the illustrated waveguides of the stack 660 may correspond to part of the plurality of waveguides 270, 280, 290, 300, 310, except that light from one or more of the image injection devices 360, 370, 380, 390, 400 is injected into the waveguides from a position that requires light to be redirected for in-coupling.

The illustrated set 660 of stacked waveguides includes waveguides 670, 680, and 690. Each waveguide includes an associated in-coupling optical element (which may also be referred to as a light input area on the waveguide), with, e.g., in-coupling optical element 700 disposed on a major surface (e.g., an upper major surface) of waveguide 670, in-coupling optical element 710 disposed on a major surface (e.g., an upper major surface) of waveguide 680, and in-coupling optical element 720 disposed on a major surface (e.g., an upper major surface) of waveguide 690. In some embodiments, one or more of the in-coupling optical elements 700, 710, 720 may be disposed on the bottom major surface of the respective waveguide 670, 680, 690 (particularly where the one or more in-coupling optical elements are reflective, deflecting optical elements). As illustrated, the in-coupling optical elements 700, 710, 720 may be disposed on the upper major surface of their respective waveguide 670, 680, 690 (or the top of the next lower waveguide), particularly where those in-coupling optical elements are transmissive, deflecting optical elements. In some embodiments, the in-coupling optical elements 700, 710, 720 may be disposed in the body of the respective waveguide 670, 680, 690. In some embodiments, as discussed herein, the in-coupling optical elements 700, 710, 720 are wavelength selective, such that they selectively redirect one or more wavelengths of light, while transmitting other wavelengths of light. While illustrated on one side or corner of their respective waveguide 670, 680, 690, it will be appreciated that the in-coupling optical elements 700, 710, 720 may be disposed in other areas of their respective waveguide 670, 680, 690 in some embodiments.

As illustrated, the in-coupling optical elements 700, 710, 720 may be laterally offset from one another. In some embodiments, each in-coupling optical element may be offset such that it receives light without that light passing through another in-coupling optical element. For example, each in-coupling optical element 700, 710, 720 may be configured to receive light from a different image injection device 360, 370, 380, 390, and 400 as shown in FIG. 6, and may be separated (e.g., laterally spaced apart) from other in-coupling optical elements 700, 710, 720 such that it substantially does not receive light from the other ones of the in-coupling optical elements 700, 710, 720.

Each waveguide also includes associated light distributing elements, with, e.g., light distributing elements 730 disposed on a major surface (e.g., a top major surface) of waveguide 670, light distributing elements 740 disposed on a major surface (e.g., a top major surface) of waveguide 680, and light distributing elements 750 disposed on a major surface (e.g., a top major surface) of waveguide 690. In some other embodiments, the light distributing elements 730, 740, 750, may be disposed on a bottom major surface of associated waveguides 670, 680, 690, respectively. In some other embodiments, the light distributing elements 730, 740, 750, may be disposed on both top and bottom major surface of associated waveguides 670, 680, 690, respectively; or the light distributing elements 730, 740, 750, may be disposed on different ones of the top and bottom major surfaces in different associated waveguides 670, 680, 690, respectively.

The waveguides 670, 680, 690 may be spaced apart and separated by, e.g., gas, liquid, and/or solid layers of material. For example, as illustrated, layer 760a may separate waveguides 670 and 680; and layer 760b may separate waveguides 680 and 690. In some embodiments, the layers 760a and 760b are formed of low refractive index materials (that is, materials having a lower refractive index than the material forming the immediately adjacent one of waveguides 670, 680, 690). Preferably, the refractive index of the material forming the layers 760a, 760b is 0.05 or more, or 0.10 or less than the refractive index of the material forming the waveguides 670, 680, 690. Advantageously, the lower refractive index layers 760a, 760b may function as cladding layers that facilitate total internal reflection (TIR) of light through the waveguides 670, 680, 690 (e.g., TIR between the top and bottom major surfaces of each waveguide). In some embodiments, the layers 760a, 760b are formed of air. While not illustrated, it will be appreciated that the top and bottom of the illustrated set 660 of waveguides may include immediately neighboring cladding layers.

Preferably, for ease of manufacturing and other considerations, the material forming the waveguides 670, 680, 690 are similar or the same, and the material forming the layers 760a, 760b are similar or the same. In some embodiments, the material forming the waveguides 670, 680, 690 may be different between one or more waveguides, and/or the material forming the layers 760a, 760b may be different, while still holding to the various refractive index relationships noted above.

With continued reference to FIG. 9A, light rays 770, 780, 790 are incident on the set 660 of waveguides. It will be appreciated that the light rays 770, 780, 790 may be injected into the waveguides 670, 680, 690 by one or more image injection devices 360, 370, 380, 390, 400 (FIG. 6).

In some embodiments, the light rays 770, 780, 790 have different properties, e.g., different wavelengths or different ranges of wavelengths, which may correspond to different colors. The in-coupling optical elements 700, 710, 720 each deflect the incident light such that the light propagates through a respective one of the waveguides 670, 680, 690 by TIR. In some embodiments, the incoupling optical elements 700, 710, 720 each selectively deflect one or more particular wavelengths of light, while transmitting other wavelengths to an underlying waveguide and associated incoupling optical element.

For example, in-coupling optical element 700 may be configured to deflect ray 770, which has a first wavelength or range of wavelengths, while transmitting rays 780 and 790, which have different second and third wavelengths or ranges of wavelengths, respectively. The transmitted ray 780 impinges on and is deflected by the in-coupling optical element 710, which is configured to deflect light of a second wavelength or range of wavelengths. The ray 790 is deflected by the in-coupling optical element 720, which is configured to selectively deflect light of third wavelength or range of wavelengths.

With continued reference to FIG. 9A, the deflected light rays 770, 780, 790 are deflected so that they propagate through a corresponding waveguide 670, 680, 690; that is, the in-coupling optical elements 700, 710, 720 of each waveguide deflects light into that corresponding waveguide 670, 680, 690 to in-couple light into that corresponding waveguide. The light rays 770, 780, 790 are deflected at angles that cause the light to propagate through the respective waveguide 670, 680, 690 by TIR. The light rays 770, 780, 790 propagate through the respective waveguide 670, 680, 690 by TIR until impinging on the waveguide's corresponding light distributing elements 730, 740, 750.

Figure 9B:
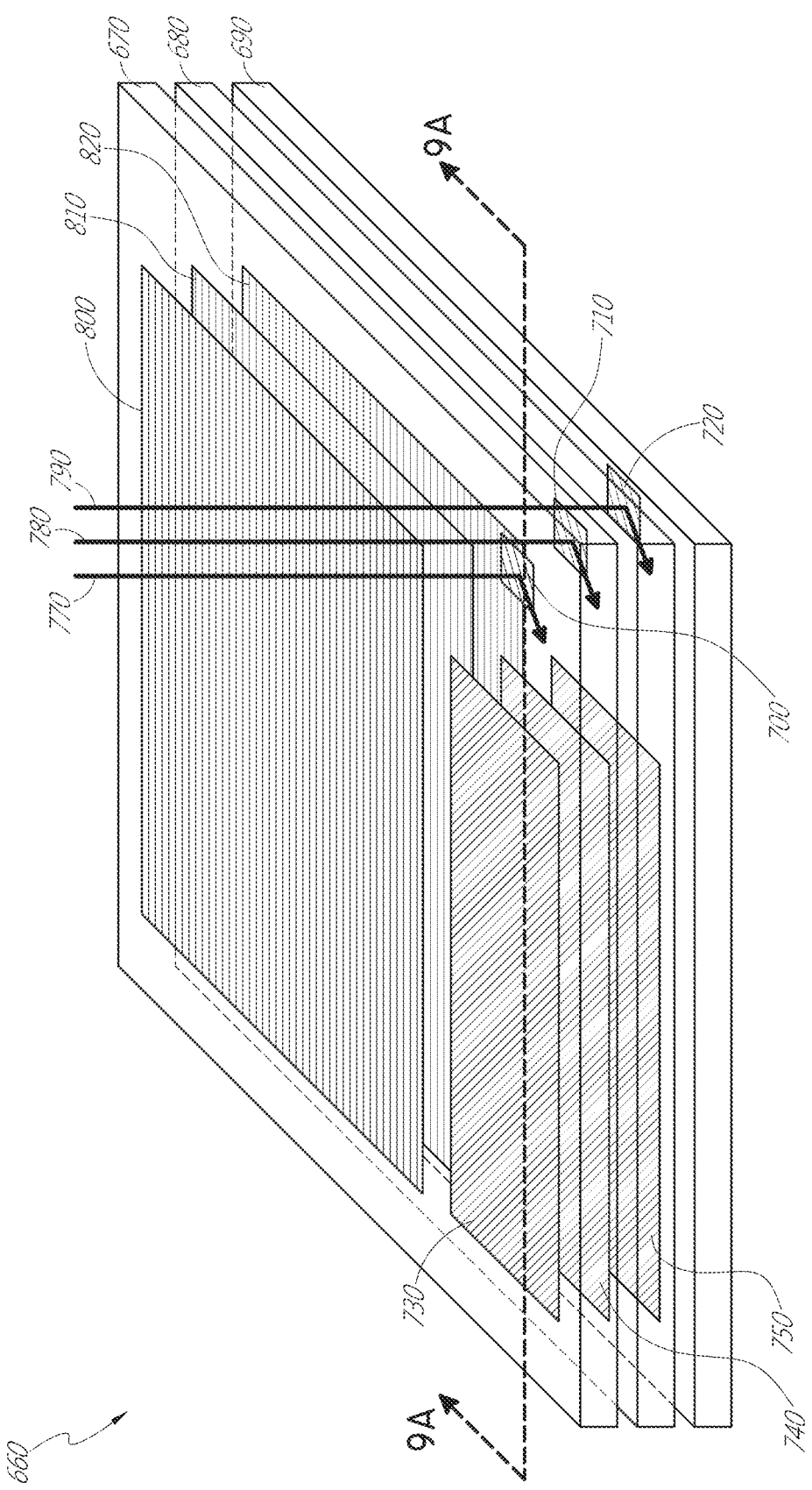
FIG. 9B illustrates a perspective view of an example of the plurality of stacked waveguides of FIG. 9A.

With reference now to FIG. 9B, a perspective view of an example of the plurality of stacked waveguides of FIG. 9A is illustrated. As noted above, the in-coupled light rays 770, 780, 790, are deflected by the in-coupling optical elements 700, 710, 720, respectively, and then propagate by TIR within the waveguides 670, 680, 690, respectively. The light rays 770, 780, 790 then impinge on the light distributing elements 730, 740, 750, respectively. The light distributing elements 730, 740, 750 deflect the light rays 770, 780, 790 so that they propagate towards the out-coupling optical elements 800, 810, 820, respectively.

In some embodiments, the light distributing elements 730, 740, 750 are orthogonal pupil expanders (OPE's). In some embodiments, the OPE's deflect or distribute light to the out-coupling optical elements 800, 810, 820 and, in some embodiments, may also increase the beam or spot size of this light as it propagates to the out-coupling optical elements. In some embodiments, the light distributing elements 730, 740, 750 may be omitted and the in-coupling optical elements 700, 710, 720 may be configured to deflect light directly to the out-coupling optical elements 800, 810, 820. For example, with reference to FIG. 9A, the light distributing elements 730, 740, 750 may be replaced with out-coupling optical elements 800, 810, 820, respectively. In some embodiments, the out-coupling optical elements 800, 810, 820 are exit pupils (EP's) or exit pupil expanders (EPE's) that direct light in a viewer's eye 210 (FIG. 7). It will be appreciated that the OPE's may be configured to increase the dimensions of the eye box in at least one axis and the EPE's may be to increase the eye box in an axis crossing, e.g., orthogonal to, the axis of the OPEs. For example, each OPE may be configured to redirect a portion of the light striking the OPE to an EPE of the same waveguide, while allowing the remaining portion of the light to continue to propagate down the waveguide. Upon impinging on the OPE again, another portion of the remaining light is redirected to the EPE, and the remaining portion of that portion continues to propagate further down the waveguide, and so on. Similarly, upon striking the EPE, a portion of the impinging light is directed out of the waveguide towards the user, and a remaining portion of that light continues to propagate through the waveguide until it strikes the EP again, at which time another portion of the impinging light is directed out of the waveguide, and so on. Consequently, a single beam of incoupled light may be "replicated" each time a portion of that light is redirected by an OPE or EPE, thereby forming a field of cloned beams of light, as shown in FIG. 6. In some embodiments, the OPE and/or EPE may be configured to modify a size of the beams of light.

Accordingly, with reference to FIGS. 9A and 9B, in some embodiments, the set 660 of waveguides includes waveguides 670, 680, 690; in-coupling optical elements 700, 710, 720; light distributing elements (e.g., OPE's) 730, 740, 750; and out-coupling optical elements (e.g., EP's) 800, 810, 820 for each component color. The waveguides 670, 680, 690 may be stacked with an air gap/cladding layer between each one. The in-coupling optical elements 700, 710, 720 redirect or deflect incident light (with different in-coupling optical elements receiving light of different wavelengths) into its waveguide. The light then propagates at an angle which will result in TIR within the respective waveguide 670, 680, 690. In the example shown, light ray 770 (e.g., blue light) is deflected by the first in-coupling optical element 700, and then continues to bounce down the waveguide, interacting with the light distributing element (e.g., OPE's) 730 and then the out-coupling optical element (e.g., EPs) 800, in a manner described earlier. The light rays 780 and 790 (e.g., green and red light, respectively) will pass through the waveguide 670, with light ray 780 impinging on and being deflected by in-coupling optical element 710. The light ray 780 then bounces down the waveguide 680 via TIR, proceeding on to its light distributing element (e.g., OPEs) 740 and then the out-coupling optical element (e.g., EP's) 810. Finally, light ray 790 (e.g., red light) passes through the waveguide 690 to impinge on the light in-coupling optical elements 720 of the waveguide 690. The light in-coupling optical elements 720 deflect the light ray 790 such that the light ray propagates to light distributing element (e.g., OPEs) 750 by TIR, and then to the out-coupling optical element (e.g., EPs) 820 by TIR. The out-coupling optical element 820 then finally out-couples the light ray 790 to the viewer, who also receives the out-coupled light from the other waveguides 670, 680.

Figure 9C:
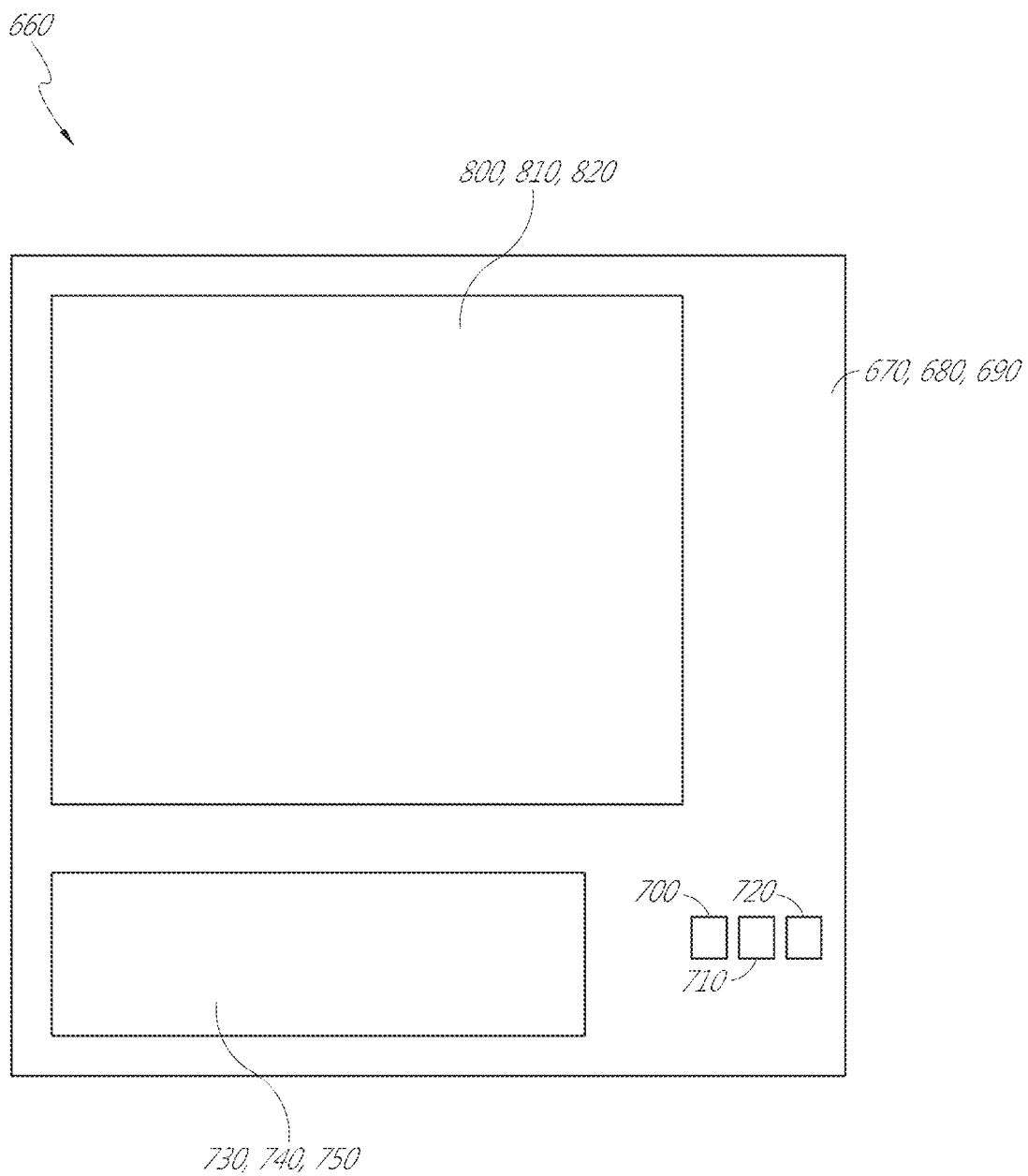
FIG. 9C illustrates a top-down plan view of an example of the plurality of stacked waveguides of FIGS. 9A and 9B.

FIG. 9C illustrates a top-down plan view of an example of the plurality of stacked waveguides of FIGS. 9A and 9B. As illustrated, the waveguides 670, 680, 690, along with each waveguide's associated light distributing element 730, 740, 750 and associated out-coupling optical element 800, 810, 820, may be vertically aligned. However, as discussed herein, the in-coupling optical elements 700, 710, 720 are not vertically aligned; rather, the in-coupling optical elements are preferably non-overlapping (e.g., laterally spaced apart as seen in the top-down view). As discussed further herein, this nonoverlapping spatial arrangement facilitates the injection of light from different resources into different waveguides on a one-to-one basis, thereby allowing a specific light source to be uniquely coupled to a specific waveguide. In some embodiments, arrangements including nonoverlapping spatially-separated in-coupling optical elements may be referred to as a shifted pupil system, and the in-coupling optical elements within these arrangements may correspond to sub pupils.

Figure 9D:
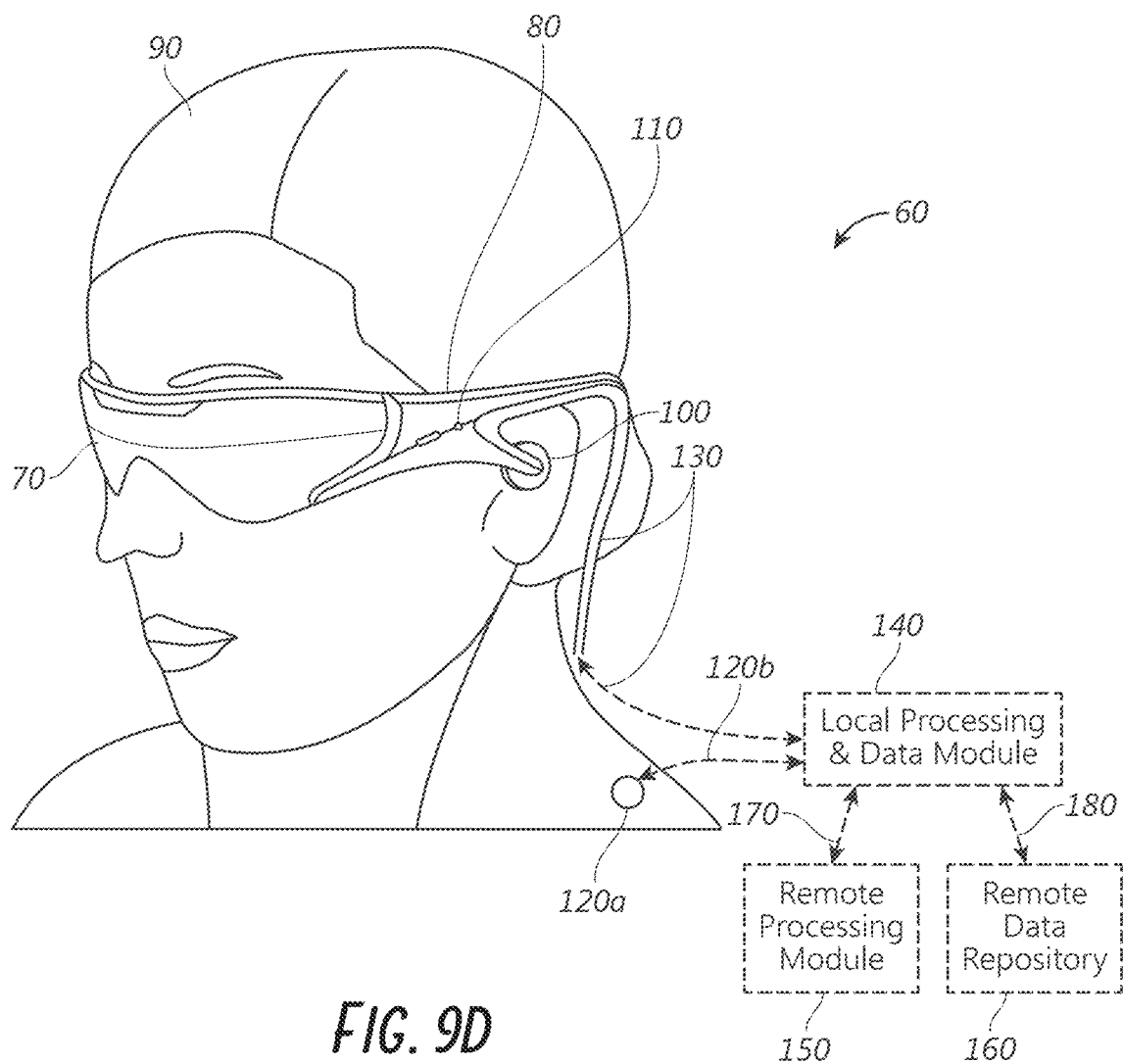
FIG. 9D illustrates an example of wearable display system.

FIG. 9D illustrates an example of wearable display system 60 into which the various waveguides and related systems disclosed herein may be integrated. In some embodiments, the display system 60 is the system 250 of FIG. 6, with FIG. 6 schematically showing some parts of that system 60 in greater detail. For example, the waveguide assembly 260 of FIG. 6 may be part of the display 70.

With continued reference to FIG. 9D, the display system 60 includes a display 70, and various mechanical and electronic modules and systems to support the functioning of that display 70. The display 70 may be coupled to a frame 80, which is wearable by a display system user or viewer 90 and which is configured to position the display 70 in front of the eyes of the user 90. The display 70 may be considered eyewear in some embodiments. In some embodiments, a speaker 100 is coupled to the frame 80 and configured to be positioned adjacent the ear canal of the user 90 (in some embodiments, another speaker, not shown, may optionally be positioned adjacent the other ear canal of the user to provide stereo/shapeable sound control). The display system may also include one or more microphones 110 or other devices to detect sound. In some embodiments, the microphone is configured to allow the user to provide inputs or commands to the system 60 (e.g., the selection of voice menu commands, natural language questions, etc.), and/or may allow audio communication with other persons (e.g., with other users of similar display systems. The microphone may further be configured as a peripheral sensor to collect audio data (e.g., sounds from the user and/or environment). In some embodiments, the display system may also include a peripheral sensor 120a, which may be separate from the frame 80 and attached to the body of the user 90 (e.g., on the head, torso, an extremity, etc. of the user 90). The peripheral sensor 120a may be configured to acquire data characterizing a physiological state of the user 90 in some embodiments. For example, the sensor 120a may be an electrode.

With continued reference to FIG. 9D, the display 70 is operatively coupled by communications link 130, such as by a wired lead or wireless connectivity, to a local data processing module 140 which may be mounted in a variety of configurations, such as fixedly attached to the frame 80, fixedly attached to a helmet or hat worn by the user, embedded in headphones, or otherwise removably attached to the user 90 (e.g., in a backpack-style configuration, in a belt-coupling style configuration). Similarly, the sensor 120a may be operatively coupled by communications link 120b, e.g., a wired lead or wireless connectivity, to the local processor and data module 140. The local processing and data module 140 may comprise a hardware processor, as well as digital memory, such as non-volatile memory (e.g., flash memory or hard disk drives), both of which may be utilized to assist in the processing, caching, and storage of data. Optionally, the local processor and data module 140 may include one or more central processing units (CPUs), graphics processing units (GPUs), dedicated processing hardware, and so on. The data may include data a) captured from sensors (which may be, e.g., operatively coupled to the frame 80 or otherwise attached to the user 90), such as image capture devices (such as cameras), microphones, inertial measurement units, accelerometers, compasses, GPS units, radio devices, gyros, and/or other sensors disclosed herein; and/or b) acquired and/or processed using remote processing module 150 and/or remote data repository 160 (including data relating to virtual content), possibly for passage to the display 70 after such processing or retrieval. The local processing and data module 140 may be operatively coupled by communication links 170, 180, such as via a wired or wireless communication links, to the remote processing module 150 and remote data repository 160 such that these remote modules 150, 160 are operatively coupled to each other and available as resources to the local processing and data module 140. In some embodiments, the local processing and data module 140 may include one or more of the image capture devices, microphones, inertial measurement units, accelerometers, compasses, GPS units, radio devices, and/or gyros. In some other embodiments, one or more of these sensors may be attached to the frame 80, or may be standalone structures that communicate with the local processing and data module 140 by wired or wireless communication pathways.

With continued reference to FIG. 9D, in some embodiments, the remote processing module 150 may comprise one or more processors configured to analyze and process data and/or image information, for instance including one or more central processing units (CPUs), graphics processing units (GPUs), dedicated processing hardware, and so on. In some embodiments, the remote data repository 160 may comprise a digital data storage facility, which may be available through the internet or other networking configuration in a "cloud" resource configuration. In some embodiments, the remote data repository 160 may include one or more remote servers, which provide information, e.g., information for generating augmented reality content, to the local processing and data module 140 and/or the remote processing module 150. In some embodiments, all data is stored and all computations are performed in the local processing and data module, allowing fully autonomous use from a remote module. Optionally, an outside system (e.g., a system of one or more processors, one or more computers) that includes CPUs, GPUs, and so on, may perform at least a portion of processing (e.g., generating image information, processing data) and provide information to, and receive information from, modules 140, 150, 160, for instance via wireless or wired connections.

Depth Plane Configurations

Figure 10A:
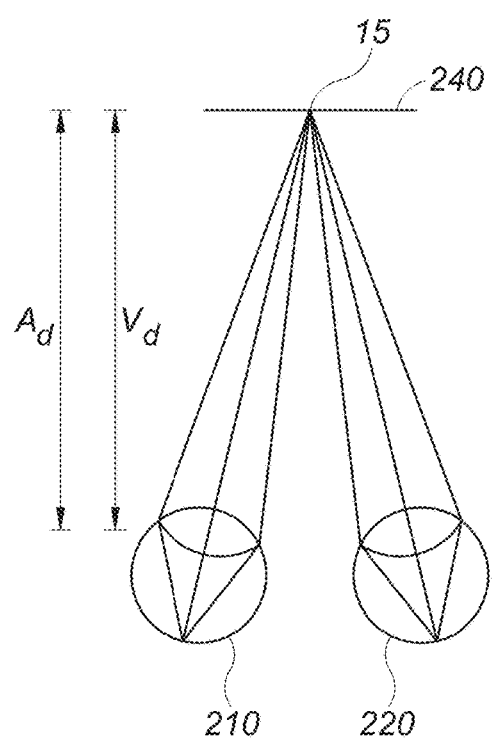
FIGS. 10A and 10B illustrate examples of matched accommodation-vergence distances and mismatched accommodation-vergence distances, respectively.
Figure 10B:
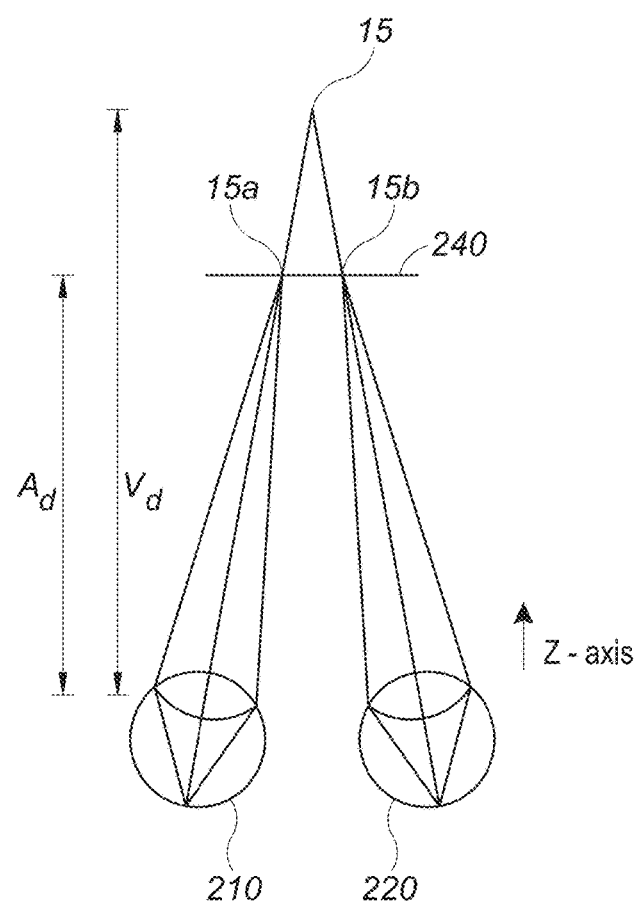

With reference now to FIGS. 10A and 10B, examples of matched accommodation-vergence distances and mismatched accommodation-vergence distances are illustrated, respectively. As illustrated in FIG. 10A, the display system may provide images of a virtual object to each eye 210, 220. The images may cause the eyes 210, 220 to assume a vergence state in which the eyes converge on a point 15 on a depth plane 240. In addition, the images may be formed by a light having a wavefront curvature corresponding to real objects at that depth plane 240. As a result, the eyes 210, 220 assume an accommodative state in which the images are in focus on the retinas of those eyes. Thus, the user may perceive the virtual object as being at the point 15 on the depth plane 240.

It will be appreciated that each of the accommodative and vergence states of the eyes 210, 220 are associated with a particular distance on the z-axis. For example, an object at a particular distance from the eyes 210, 220 causes those eyes to assume particular accommodative states based upon the distances of the object. The distance associated with a particular accommodative state may be referred to as the accommodation distance, $A_d$. Similarly, there are particular vergence distances, $V_d$, associated with the eyes in particular vergence states, or positions relative to one another. Where the accommodation distance and the vergence distance match, the relationship between accommodation and vergence may be said to be physiologically correct. This is considered to be the most comfortable scenario for a viewer.

In stereoscopic displays, however, the accommodation distance and the vergence distance may not always match. For example, as illustrated in FIG. 10B, images displayed to the eyes 210, 220 may be displayed with wavefront divergence corresponding to depth plane 240, and the eyes 210, 220 may assume a particular accommodative state in which the points 15a, 15b on that depth plane are in focus. However, the images displayed to the eyes 210, 220 may provide cues for vergence that cause the eyes 210, 220 to converge on a point 15 that is not located on the depth plane 240. As a result, the accommodation distance corresponds to the distance from the exit pupils of the eyes 210, 220 to the depth plane 240, while the vergence distance corresponds to the larger distance from the exit pupils of the eyes 210, 220 to the point 15, in some embodiments. The accommodation distance is different from the vergence distance. Consequently, there is an accommodation-vergence mismatch. Such a mismatch is considered undesirable and may cause discomfort in the user. It will be appreciated that the mismatch corresponds to distance (e.g., $V_d$-$A_d$) and may be characterized using diopters.

In some embodiments, it will be appreciated that a reference point other than exit pupils of the eyes 210, 220 may be utilized for determining distance, so long as the same reference point is utilized for the accommodation distance and the vergence distance. For example, the distances could be measured from the cornea to the depth plane, from the retina to the depth plane, from the eyepiece (e.g., a waveguide of the display device) to the depth plane, and so on.

Due to the potential for accommodation-vergence mismatches, the perception that such mismatches are generally undesirable, and the ability of display systems to provide a nearly infinite number of possible vergence cues, it has been considered desirable to provide a display system capable of providing virtual content on a large number of depth planes in order to provide a large number of possible accommodation cues, in order to match as closely as possible the large number possible vergence cues. As noted herein, however, a large number of depth planes may require a large number of associated waveguides. This may undesirably result in large and heavy devices, which may be uncomfortable, and which also may be challenging to manufacture, in addition to possibly causing optical aberrations (both for image content projected by the display and for light received from the outside world) due to the large number of optically active features in the stack through which light must propagate to reach the viewer.

Advantageously, it has been found that a credible 3-dimensional experience may be achieved using a display system that provides virtual content on a relatively small number of depth planes. For example, in some embodiments, the total number of depth planes provided by the display system may be two. In other embodiments, the total number of depth planes provided the display system may be one. In addition, display systems having more than two depth planes are contemplated. For example, the total number of depth planes may be four or less, or three or less in some embodiments. As discussed herein, the total number of depth planes may be tailored to a particular application based upon how closely to the user the display system is anticipated to display virtual objects. For example, the number of depth planes may increase with decreasing distance of virtual objects to the user.

Without being limited by theory, it is believed that users may still perceive accommodation-vergence mismatches of 0.25 diopter, 0.33 diopter, and up to about 0.5 diopter as being physiologically correct, without the mismatch itself causing significant discomfort. Consequently, in view of the viewer's tolerance for mismatches within a particular range, it is possible to provide physiologically correct accommodation-vergence mismatches with a limited number of depth planes. Depending on the content being displayed, the number of depth planes may be one or two. In some other embodiments, greater than two depth planes may also be implemented, as discussed herein.

Figure 11:
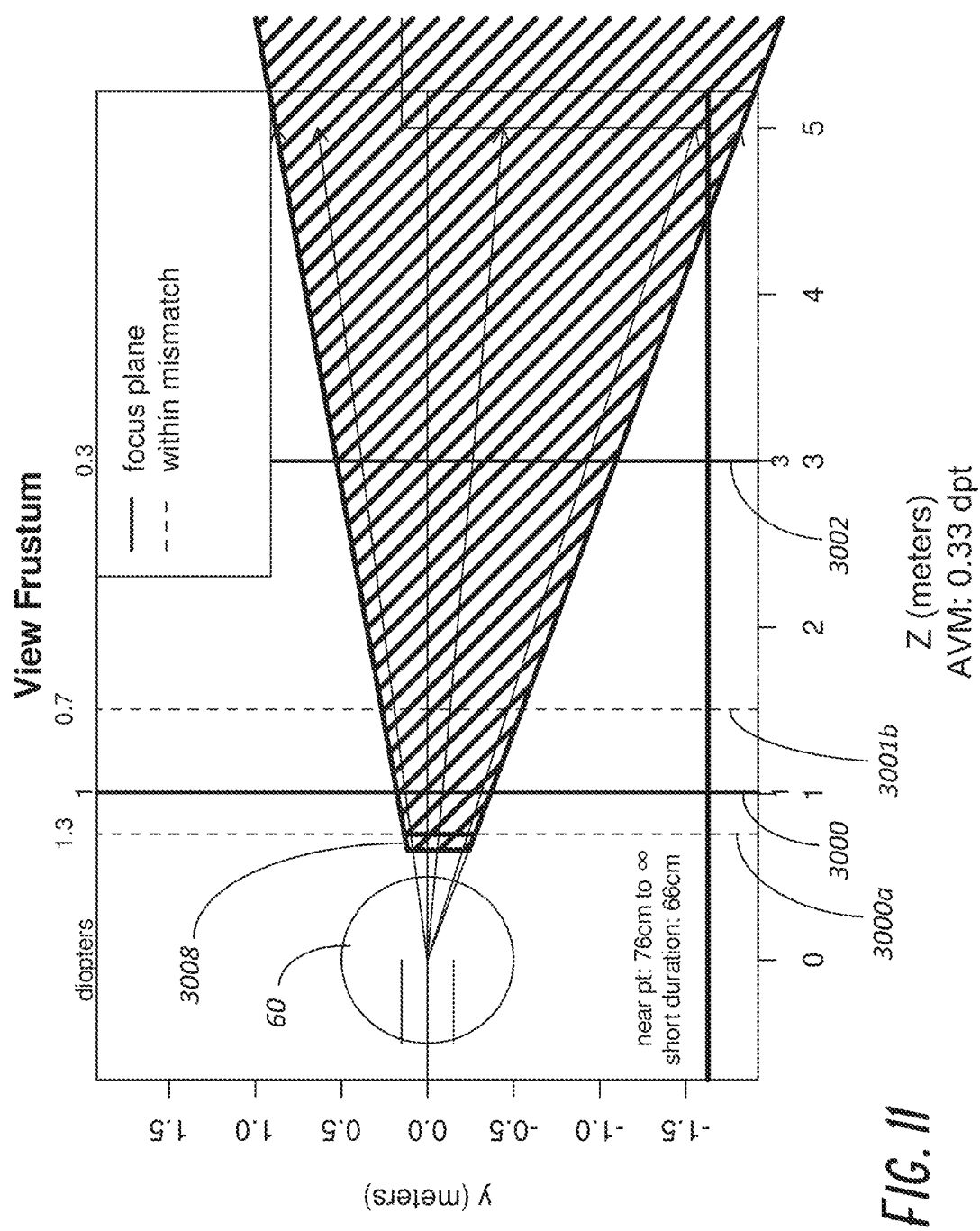
FIG. 11 illustrates an example of depth plane placement taking into account accommodation-vergence mismatch thresholds.

In some embodiments, the placement of the depth planes on the z-axis is selected with reference to optical infinity. FIG. 11 illustrates an example of depth plane placement taking into account acceptable accommodation-vergence mismatches. The farthest depth plane on the z-axis may be selected to be at a distance that is within a physiologically acceptable accommodation-vergence mismatch of optical infinity. The mismatch is preferably about 0.5 diopters or less, more preferably about 0.33 diopters or less, or about 0.25 diopters or less. In some embodiments, a mismatch of about 0.55 diopters is contemplated. It will be appreciated that this depth plane may be considered to be the furthest depth plane provided by the display, and is at less than optical infinity.

An additional depth plane may also be provided closer to the viewer 60. Preferably, this additional depth plane is spaced from the further depth plane by 2× or less of the acceptable accommodation-vergence mismatch. For example, the spacing between the two depth planes is preferably about 1.0 diopters or less, more preferably about 0.66 diopters or less (e.g., 0.667 diopters or less), or about 0.5 diopters or less.

With continued reference to FIG. 11, in the illustrated example, a two depth plane configuration is shown. A relatively close depth plane 3000 (closeness determined relative to the viewer 60) is provided at 1.0 dpt and a farthest depth plane 3002 is provided at 0.3 dpt (including about 0.33 dpt). The depth planes 3000 and 3002 are separated by less than 1.0 dpt. As illustrated, the depth plane 3000 has a zone of acceptable accommodation-vergence mismatches defined by 3000a and 3000b, assuming an acceptable mismatch range of ±0.3 dpt. Advantageously, without being limited by theory, it is believed that image content depicting virtual objects, at distances away from the user within the acceptable mismatch range, may be displayed on depth plane 3000 without causing an accommodation-vergence mismatch that is uncomfortable and detectable by the user.

It will be appreciated that the lower bound 3000a still leaves a gap between it and the viewer 60. Because the mismatch was selected to be 0.3 dpt, there is still a space 3008 that falls within 0.5 dpt. Consequently, some content may still be displayed at this distance. Preferably, because this is at the outer range of acceptable mismatches, the duration and/or spatial frequency of the content may be limited, as discussed herein.

Figure 12:
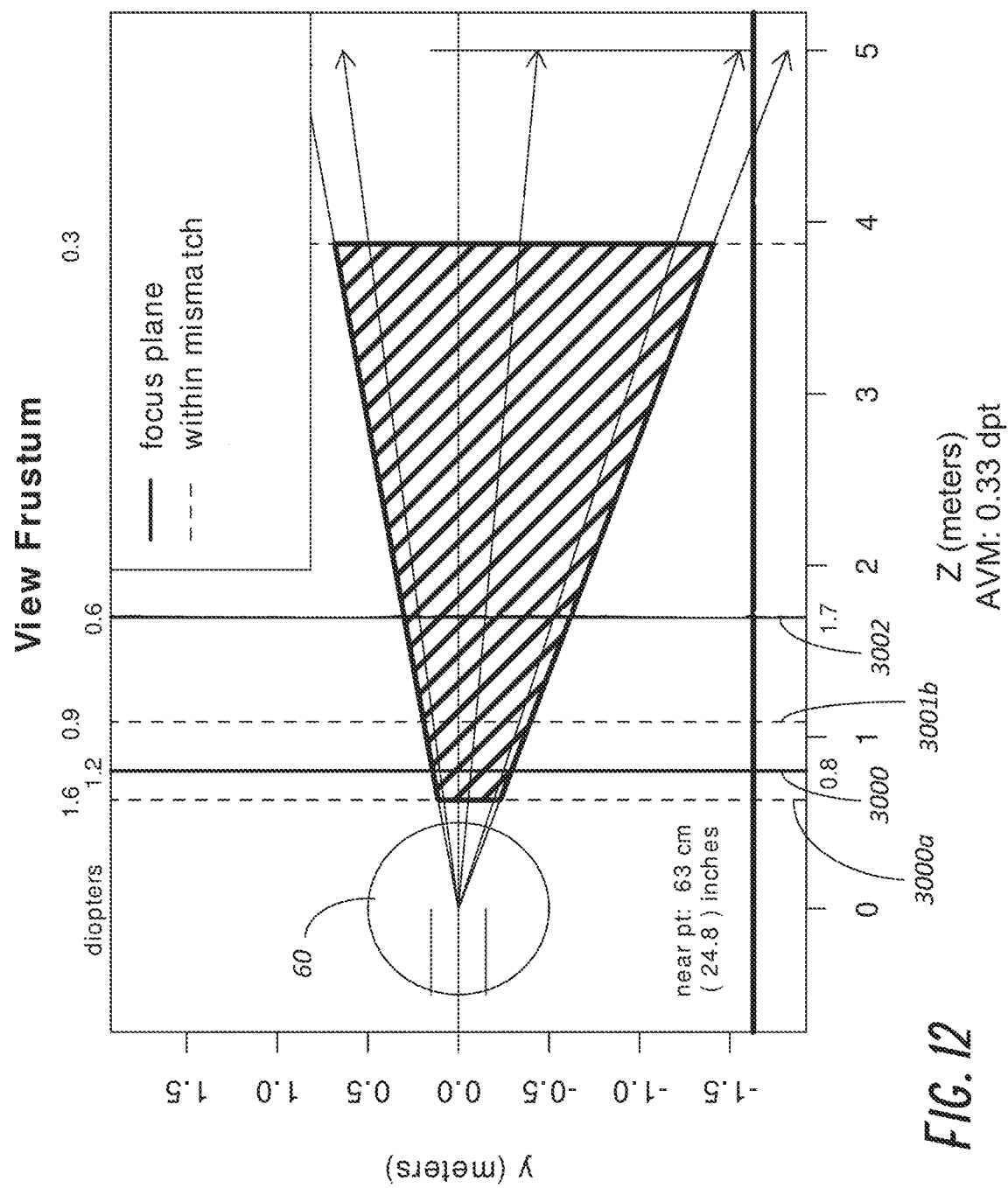
FIG. 12 illustrates another example of depth plane placement taking into account accommodation-vergence mismatch thresholds.

FIG. 12 illustrates another example of depth plane placement taking into account acceptable accommodation-vergence mismatch. In this example, rather than placing the farthest depth plane 3002 within an acceptable mismatch of optical infinity, the farthest depth plane 3002 may be placed at a depth along the z-axis at greater than the acceptable accommodation-vergence mismatch with optical infinity. In such a configuration, placing content optical infinity based on vergence cues may provide an uncomfortable mismatch with the accommodation cues provided by a waveguide outputting light with wavefront divergence corresponding to the depth plane 3002 at 0.6 dpt. Nevertheless, such a configuration allows content to be displayed closer to the user 60 than the configuration of FIG. 11. For example, the nearest depth that the arrangement of FIG. 12 may provide content while maintaining proper accommodation-vergence matching is at 63 cm. On the other hand, the nearest depth for the arrangement of FIG. 11 is 76 cm.

Figure 13:
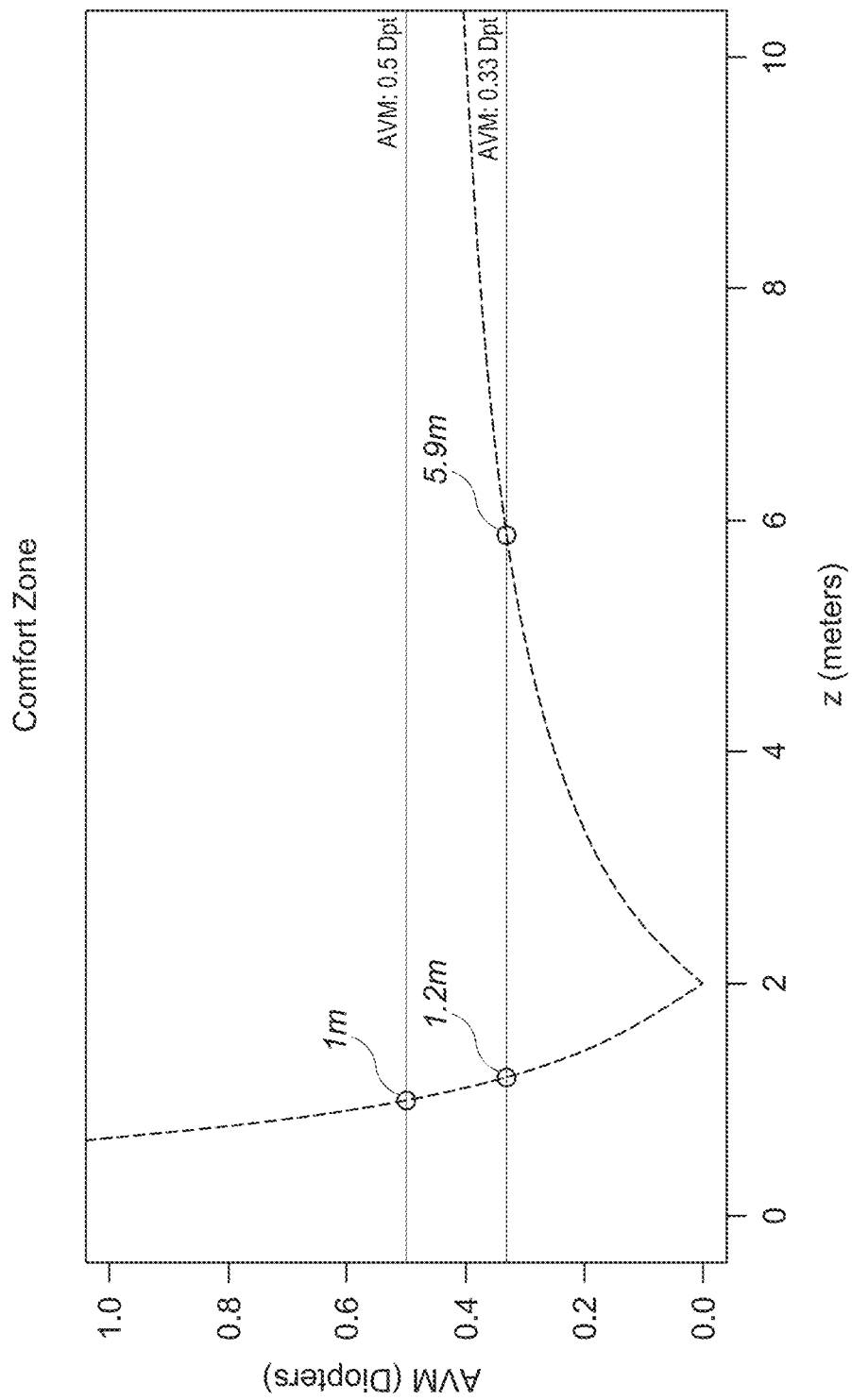
FIG. 13 illustrates an example of a plot of accommodation-vergence mismatch for a single depth plane display system.

FIG. 13 illustrates an example of a plot of accommodation-vergence mismatch for a single depth plane display system. The dotted line shows the accommodation-vergence mismatch at different (virtual) distances from the viewer. The horizontal axis corresponds to distance from the viewer, and a vertical axis corresponds to accommodation-vergence mismatch, which is also referred to as AVM. The single depth plane is positioned at 2 m, which corresponds with a mismatch of zero. Advantageously, at distances greater than 2 m (e.g. from z=2 m to z=optical infinity) the accommodation-vergence mismatch always remains below 0.5 dpt. At closer distances, the mismatch increases and at a distance from the viewer of less than 1 m, the mismatch may exceed what is believed to be physiologically correct. At distances less than 1 m viewer discomfort may be expected simply from viewing the image content at that distance.

Figure 14:
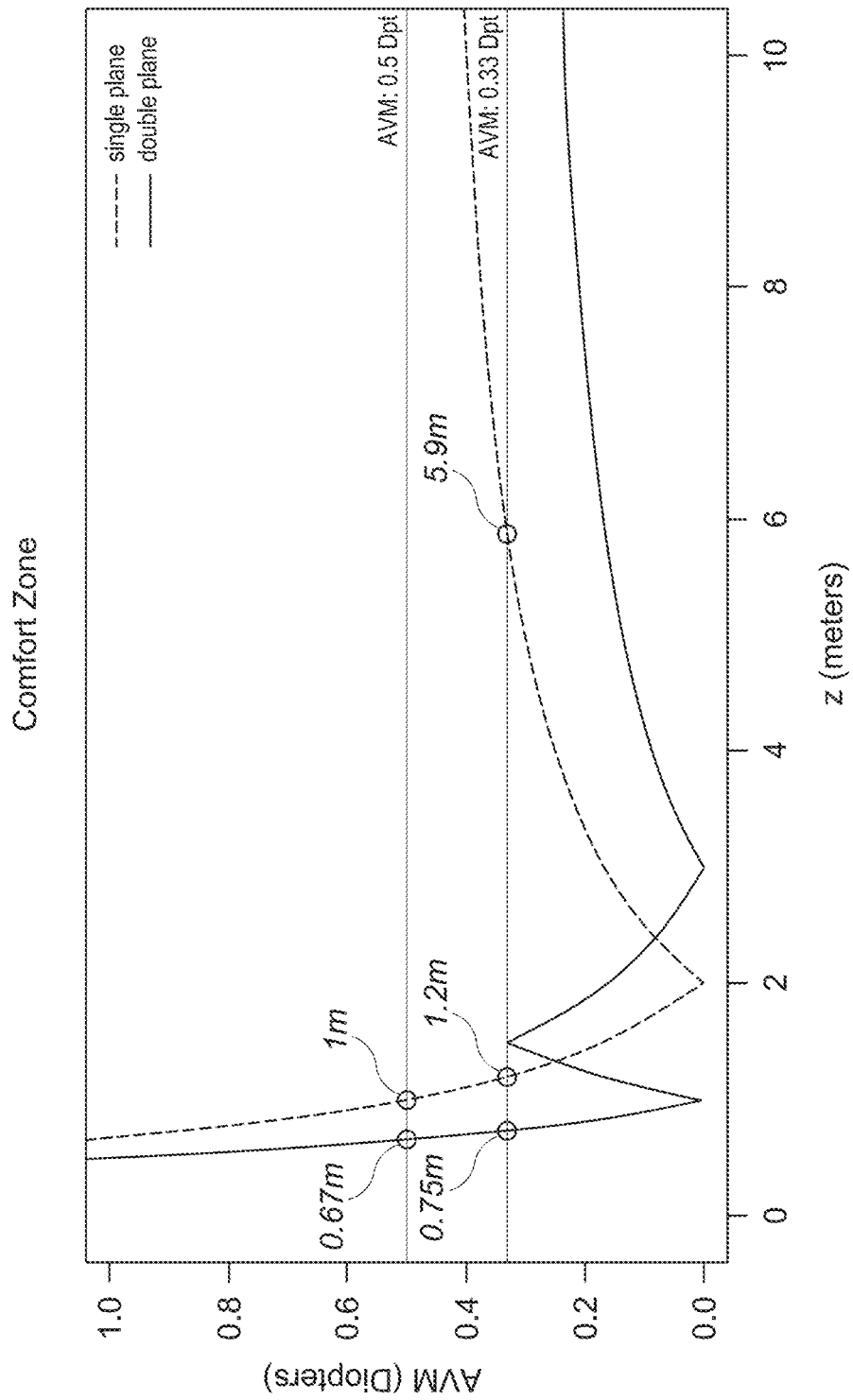
FIG. 14 illustrates an example of a plot of accommodation-vergence mismatch for a two depth plane display system and a one depth plane display system.

FIG. 14 illustrates an example of a plot of accommodation-vergence mismatch for a two depth plane display system and a one depth plane display system. The solid line shows the two depth planes system and the dotted line shows the single depth plane system. It will be appreciated that the accommodation-vergence mismatch at large distances from the viewer is less for the two depth plane system, and that the two depth plane system allows content to be displayed at closer distances to the viewer while still maintaining an acceptable mismatch value. In some embodiments, the farthest depth plane may be within an acceptable mismatch value of optical infinity. As discussed herein, the acceptable mismatch may be about 0.5 dpt or less, about 0.33 dpt or less, or about 0.25 dpt or less. As illustrated, the acceptable mismatch may be 0.33 dpt. In some embodiments, the farthest depth plane may be set at 0.33 dpt (corresponding of 3 m from the user) and a closer, second depth plane may be set inward from the furthest depth plane by a value equal to two times the acceptable mismatch, e.g., 0.33 dpt×2, or 0.66 dpt. Consequently, the closer, second depth plane may be set at 1 dpt in some embodiments.

With continued reference to FIG. 14, proceeding along the plot of the solid line from right to left (with decreasing distance from the user's eyes), the accommodation-vergence mismatch rises until the mismatch value of 0.33 dpt is observed. Consequently, given the illustrated placement of the farthest depth plane at 0.33 dpt, image content for virtual objects at distances of 1.2 m to infinity may be displayed on the same depth plane (set at 0.33 dpt or 3 m from the user's eyes) without appreciable discomfort, since all the image content within this range is within the acceptable mismatch. For virtual objects at distances closer than 1.2 m, as illustrated, a second depth plane may be provided. As noted above, the second depth plane may be at 1 dpt.

It will be appreciated that the distance represented by the acceptable mismatch of 0.33 dpt becomes smaller the closer a depth plane is placed to the user. In some other embodiments, it may be desirable to display virtual objects at closer than the minimum distance provided by a separation of 0.33 dpt from the 1 dpt depth plane. As illustrated, at distances of 0.75 m or less, the acceptable mismatch value increases above 0.33 dpt. Consequently, one or more additional depth planes may be provided for displaying image content at closer distances. For example, a third depth plane may be formed to display image content at distances closer than 0.75 m. It will be appreciated that each of the depth planes are separated from the nearest neighboring depth plane by twice the acceptable mismatch or less.

Figure 15:
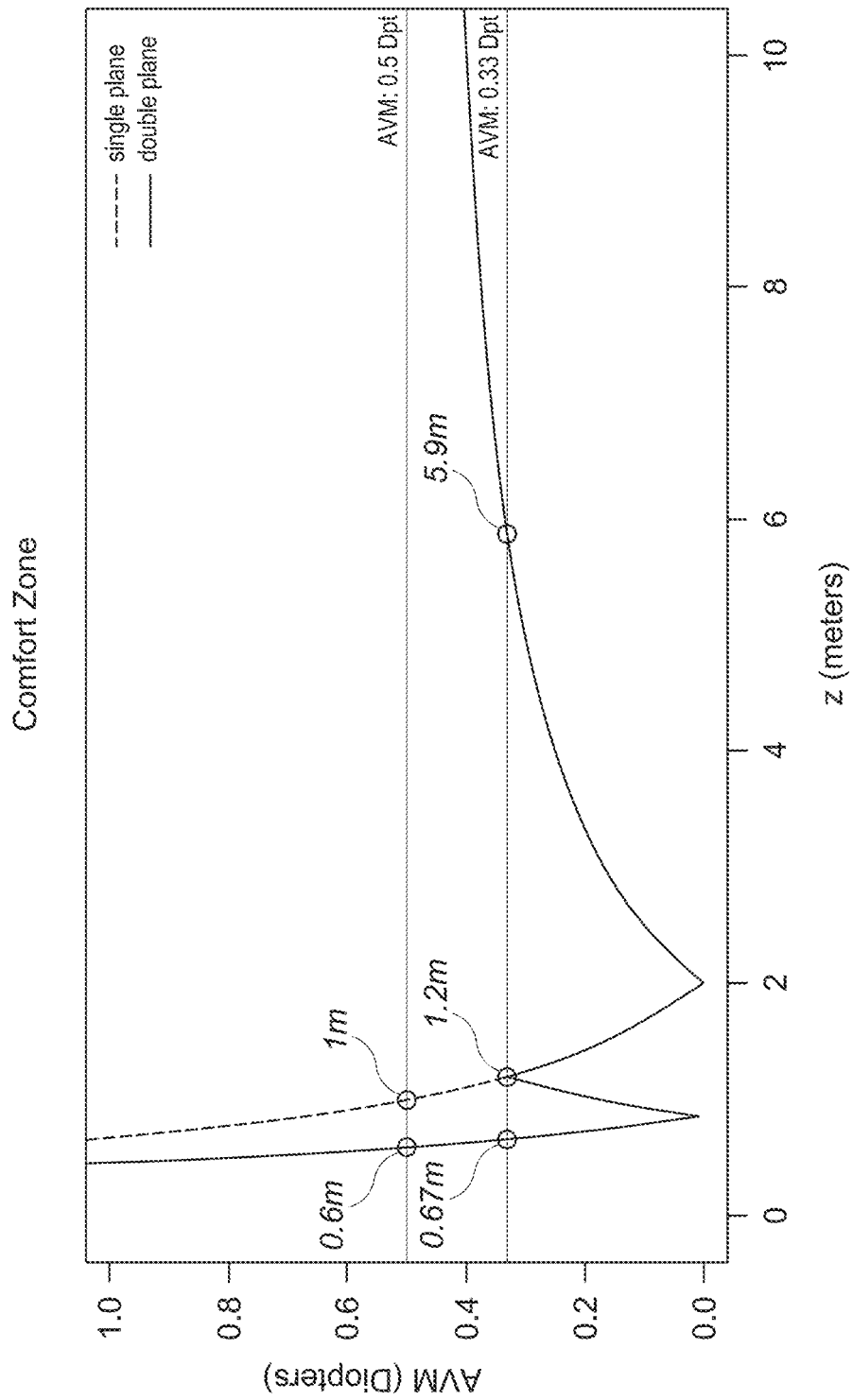
FIG. 15 illustrates another example of a plot of accommodation-vergence mismatch for a two depth plane display system and a one depth plane display system.

FIG. 15 illustrates another example of a plot of accommodation-vergence mismatch for a two depth plane display system and a one depth plane display system. In this example, the farthest depth plane of the two plane system is positioned at the same distance (2 m or 0.5 dpt) as the single depth plane system. Notably, the mismatches at distances farther than the single depth plane are equivalent. In this example, a principal advantage of the two plane system is the ability to provide content at closer distances to the viewer than the single plane system, while maintaining an acceptable mismatch value.

As seen in FIGS. 11-15, for some types of image content, a display system with a single depth plane may be sufficient to achieve a physiologically correct accommodation-vergence match, while allowing a credible 3-D experience over a relatively large span of distances. Preferably, the farthest depth plane, whether in a one or a multi depth plane display system, is at less than optical infinity, and is within an acceptable mismatch range of optical infinity. In some other embodiments, the farthest depth plane may be set within an acceptable mismatch of optical infinity. It will be appreciated that, in some embodiments, a single depth plane system may have the position of the depth plane set depending on the type of image content to be displayed by that system. For example, the depth plane may be set closer to the viewer than illustrated, particularly in applications where the image content is expected to be relatively close to the viewer. Thus, with reference to FIGS. 11-15, the display system may be configured to provide accommodation cues in discrete steps, while nearly an infinite number of different vergence cues may be provided.

Depth Plane Switching

As described herein, display systems (e.g., augmented reality display systems such as the display system 60, FIG. 9D) according to various embodiments may utilize overlapping depth planes. In a vari-focal mode, a display system may determine the depth at which a user is fixating, and may select a depth plane for presenting virtual content based on the fixation depth. For example, the display system may determine a three-dimensional fixation point at which the user is fixating, and utilize the determined depth of the fixation point to select the depth plane. Errors associated with determining a fixation depth may introduce uncertainty with respect to the location of the fixation depth. Given these errors, successive measurements of the fixation point may provide different results. Where these different results occur at the boundary between two depth planes, the changing results may cause the display system to rapidly switch back and forth between the two depth planes as successive measurements of the fixation point provide results that have the fixation point moving back and forth between the depth planes. As a result, while presenting virtual content to the user, flickering, or other visual artifacts, may be introduced as the display system switches back and forth between the depth plane for presenting virtual content.

Depth overlaps may be utilized to mitigate the above-described visual artifacts. As described herein, adjacent depth planes may have associated depth plane ranges that partially overlap along the z-axis (e.g., adjacent depth planes may overlap at a particular range of depths along the z-axis). An example representation of such overlap is illustrated in FIG. 17, and described further below. In some embodiments, the size of the depth overlap may be based on an estimated uncertainty associated with determining fixation points (e.g., determining depths at which a user is fixating). Utilizing a depth overlap, the display system may select a particular depth plane at which to present virtual content based on identifying that a user is fixating (1) solely within a depth plane range associated with the particular depth plane and/or (2) within a depth overlap associated with the particular depth plane. If the user changes his/her fixation point such that the fixation point falls within a depth plane range solely associated with a different depth plane, the display system may switch to the different depth plane. For example, the display system may continue to present virtual content on a particular depth plane while the user's determined fixation point is at any one of the depths encompassed by the particular depth plane (e.g., depths solely encompassed by the particular depth plane, or depths included in a depth overlap encompassed by the particular depth plane and an adjacent depth plane). If the user then fixates at depths not encompassed by the particular depth plane, the display system may switch to a different depth plane.

In some embodiments, the fixation point may be located in space along (1) an x-axis (e.g., a lateral axis), (2) a y-axis (e.g., a vertical axis), and (3) a z-axis (e.g., a depth of the point, for example a depth from the exit pupils of the eyes of the user to the fixation point). In some embodiments, the display system may utilize sensors such as cameras (e.g. sensor 630 of FIG. 6) to monitor the user's eyes (e.g., a pupil and/or cornea, and so on, of each eye), to determine a gaze direction of each eye. The gaze direction of each eye may be understood to be parallel to a vector extending from the fovea through the center of the lens of the eye. The display system may be configured to extrapolate where the vectors associated with the eyes intersect, and this intersection point may be understood to be the fixation point of the eyes. Stated another way, the fixation point may be a location in three-dimensional space on which the user's eyes are verging. In some embodiments, the display system may filter small movements of the user's eyes for example during rapid movements (e.g., saccades, microsaccades), and may update the fixation point upon determining that the eyes are fixating on a location in three-dimensional space. For example, the display system may be configured to ignore movements of the eye that fixate on a point for less than a threshold duration and/or ignore involuntary eye movements (e.g., blinks).

FIG. 16 illustrates an example of a user fixating at a fixation point 1604. For example, the user may be utilizing a display system (e.g., a vari-focal display system as described above), which may include two depth planes 240b, 240a. Each depth plane 240b, 240a can encompass a particular depth range (e.g., Depth Plane Region 1809, Depth Plane Region 1808, respectively). As illustrated, Depth Plane Region 1809 is distinct from and directly adjacent to Depth Plane 1808. In this way, if the fixation point 1604 is within, for example, Depth Plane Region 1809, the display system can select Depth Plane 240b at which to present virtual content. Virtual content can then be presented at Depth Plane 240b, such that the virtual content will be output with cues to accommodation associated with Depth Plane 240b. As an example, the display system may include two waveguides configured to output light with respective cues to accommodation (e.g., wavefront divergences), and with each waveguide corresponding to a depth plane.

While the example of FIG. 16 indicates that two depth planes are included, it should be understood that any number of depth planes (and their associated depth plane ranges) may be included in a display system utilizing the techniques described herein. As illustrated, the display system has determined that the eyes 210, 220 of the user are fixating (e.g., verging) at a particular fixation point 1604. In some scenarios, the determined fixation point 1604 is located at a depth that is proximate a border between Depth Plane Region 1809 and Depth Plane Region 1808.

An estimated determination error 1605 associated with the fixation point 1604 is illustrated. As described above, errors may be introduced when the display system determines fixation points. For example, the display system may be unable to precisely determine a gaze of each of the user's eyes 210, 220. For example, an optical axis of the eye determined based on the geometry of the eye may be different from a visual axis of the eye that falls on the eye's fovea. Since the display system is monitoring the user's eyes 210, 220, and thus the optical axis, the display system's determination of a fixation point may deviate from the correct location, which would be given by an analysis of the visual axis. While the display system may have access to training information for the user, for example during initial use of the display system the user may calibrate the system such that the visual axis may be better determined, errors may still exist. As another example, the user's eyes may have unique medical issues or may focus uniquely, such that estimations of fixation points may be off from an actual fixation point. In addition, sensors utilized to image or track the eye may also have errors or limits in resolution that result in errors in the determined fixation point. As a result, the fixation point determined by the display system may have a range of uncertainty. The determination error 1605 therefore represents the uncertainty with respect to an accurate three-dimensional fixation point. For example, the determination error 1605 may indicate an uncertainty with respect to depth of the fixation point 1604, such as 0.1 diopters, 0.2 diopters, 0.3 diopters, 0.58 diopters, and so on. Since the actual depth at which the user is fixating may be either in front of, or behind of, the determined fixation point 1604, the actual three-dimensional location at which the user may be fixating is included in a range of depths that is twice the determination error 1605.

Since the determination error 1605 extends into Depth Plane Region 1809 and Depth Plane Region 1808, the display system may determine a fixation point 1604 as being at a depth encompassed by either of the depth planes 240B, 240A. For example, the display system may present virtual content at Depth Plane 240A for one or more successive frames, switch presentation to be at Depth Plane 240B, and so on. This switching between the presentation of images at different depth planes may occur rapidly, and may introduce undesirable visual artifacts to the user. As an example, flicker may be evident to the user. As another example, when switching to a different depth plane, accommodation cues will be adjusted (e.g., the wavefront divergence of light being output will be different for each of the depth planes), such that the user will be required to adjust his/her focus.

To minimize the occurrence of undesired switching between depth planes due to errors in determining the fixation point, a depth overlap encompassing a portion of Depth Plane Region 1808 and a portion of Depth Plane Region 1809 may be utilized. As will be described, the display system may continue to present content at a particular depth plane if the determined fixation point (1) is solely within a depth plane range of the particular depth plane or (2) is within the depth overlap between Depth Plane Region 1808 and Depth Plane Region 1809. On the other hand, if the user's fixation point is located at a depth solely encompassed by a different depth plane, the display system may then switch to that depth plane and present virtual content at the different depth plane.

FIG. 17 illustrates a depth overlap 1812 between adjacent depth plane regions 1808, 1809, of depth planes 240A, 240B. As described above, determining three-dimensional fixation points may include sources of error, such that uncertainty exists with respect to the precise three-dimensional location at which the user is fixating. For example, the determination error 1605 illustrated in FIG. 16 may cause an uncertainty with respect to a depth at which the user is fixating. In some embodiments, the depth overlap 1812 may therefore be utilized by the display system to represent this determination error 1605. In some other embodiments, the depth overlap 1812 may have an arbitrarily set size.

As illustrated, the depth overlap 1812 is within both Depth Plane Region 1808 and Depth Plane Region 1809. Specifically, in the example of FIG. 17, Depth Plane Region 1808 has been adjusted such that a distal end has been shifted further from the user's eyes 210, 220. In this way, a depth plane range that was previously solely within Depth Plane Region 1809 is now also encompassed by Adjusted Depth Plane 240B1. In the example of FIG. 17, the depth overlap 1812 encompasses a depth range that may be twice the size of the determination error 1605 illustrated in FIG. 16. In some embodiments, if the display system can reliably determine a user's fixation point to within a particular range of depths (e.g., 0.1 diopters, 0.2 diopters, and so on), the depth overlap may extend into adjacent depth planes by the particular range of depths.

When presenting virtual content, the display system may present at either Adjusted Depth Plane 240B1 or Depth Plane 240A. To select a particular depth plane at which to present virtual content, the depth overlap may be considered as an extension of either depth plane. For example, the display system may maintain the presentation of virtual content at Depth Plane 240A if the user is fixating at fixation points within Depth Plane Region 1808, including fixation points included in the depth overlap 1812. However, if the user fixates at a fixation point solely within Depth Plane Region 1809, that is, the fixation point is not included in the depth overlap 1812, then the system selects Adjusted Depth Plane 240B1 to present virtual content. Similarly, presentation of virtual content at Adjusted Depth Plane 240B1 may be maintained if the user fixates at fixation points within Depth Plane Region 1809, including fixation points within the depth overlap 1812. However, as soon as the fixation point moves outside of Depth Plane Range 1809 or Depth Overlap 1812, then Depth Plane 240A is selected to present virtual content.

Figure 18A:
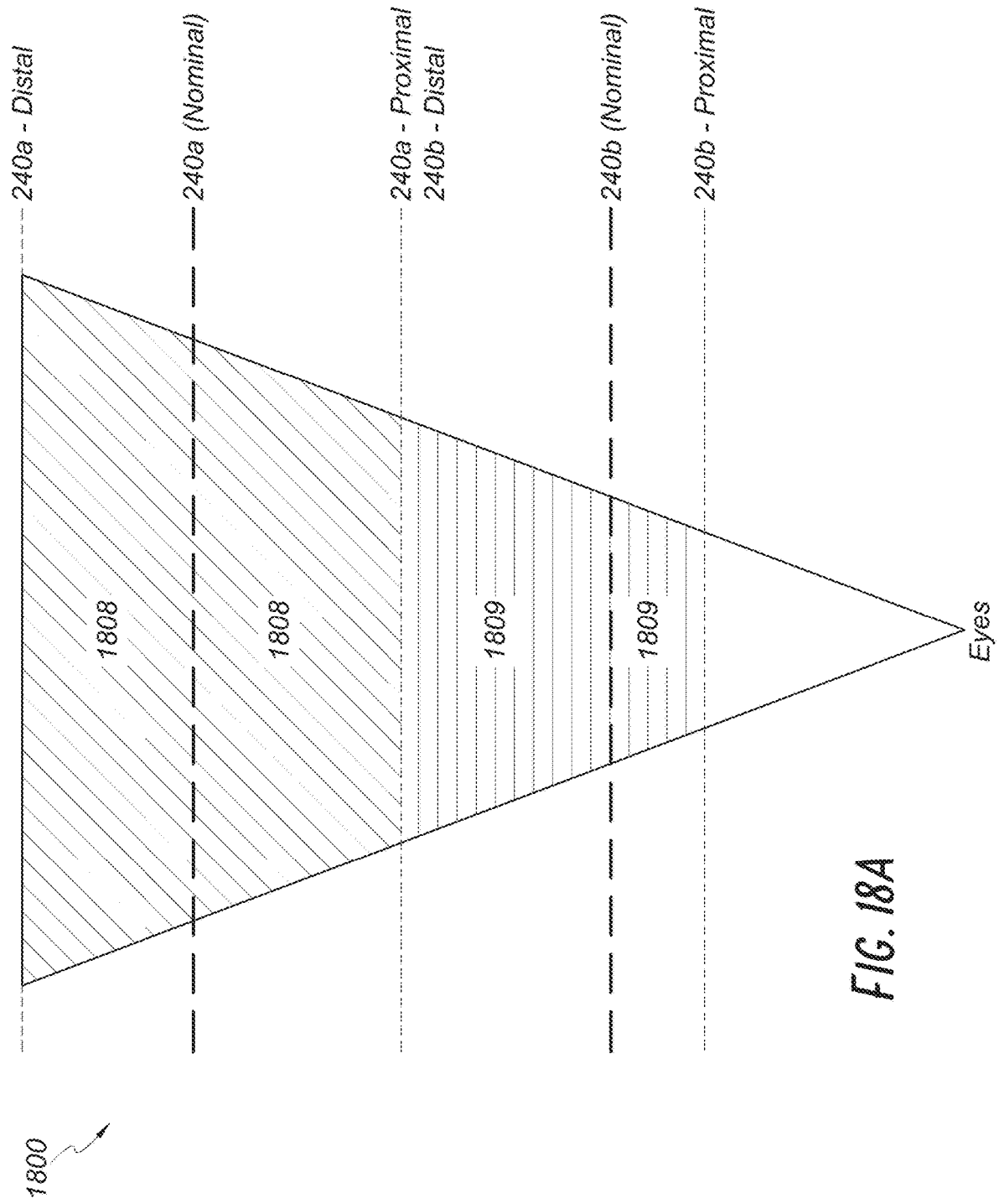
FIGS. 18A-18B illustrate a representation of a field of view of a user of a display system.
Figure 18B:
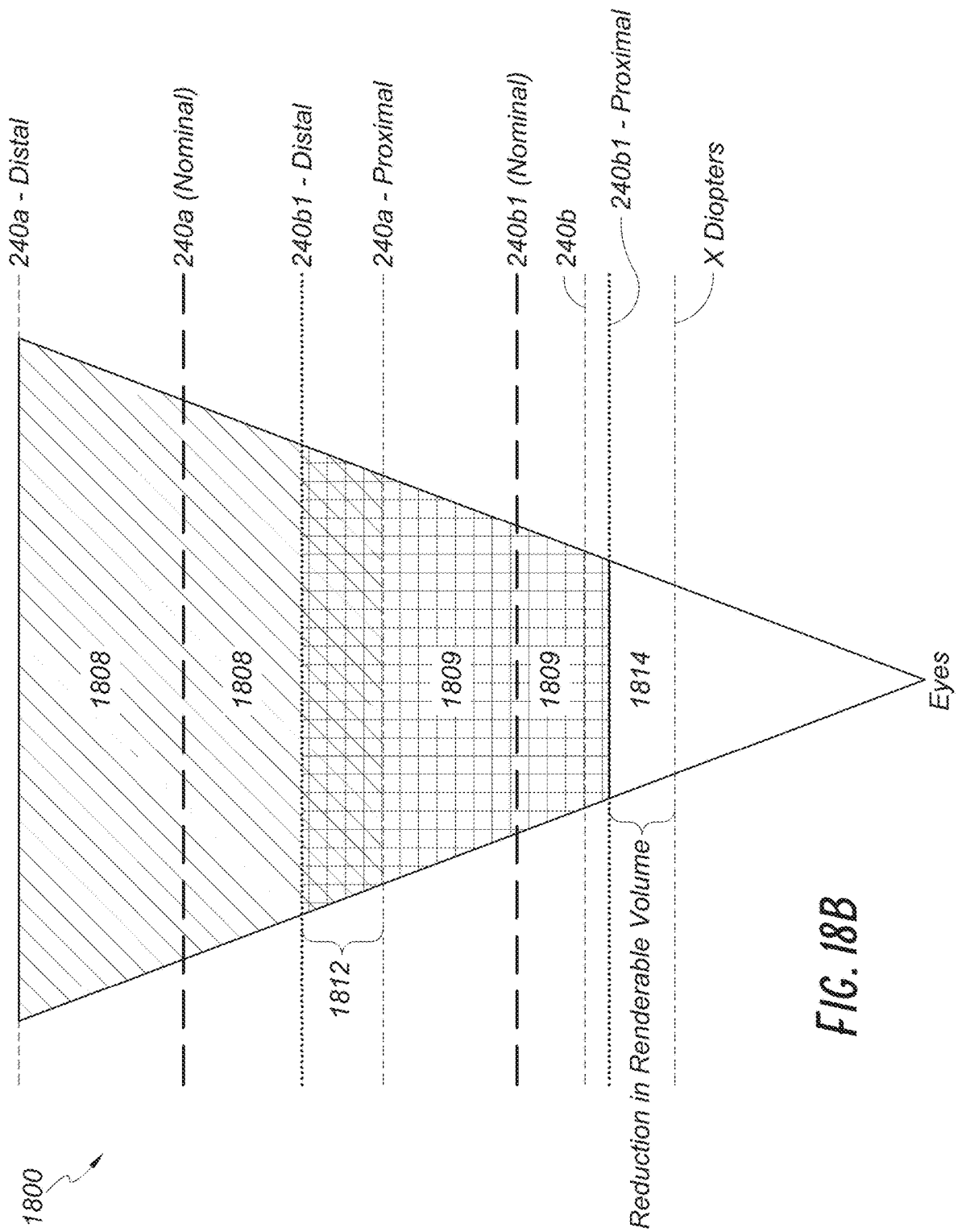

FIGS. 18A-18B illustrate a representation of a field of view 1800 of a user of a display system, to further illustrate utilization of one or more depth plane range overlaps. The field of view 1800 includes representations of a first depth plane 240A and a second depth plane 240B. As illustrated, a depth plane range may define a volume of real-world space associated with each depth plane (e.g., volumes 1808, 1809). For example, the depth plane range of depth plane 2 240B extends from depth 240B—proximal to depth 240B—distal. A virtual object that is to be presented at a depth within range 240B—proximal to 240B—distal may be presented with wavefront divergence corresponding to depth plane 2 (also identified as reference numeral 240B). As an example, light containing image information for the virtual object may be output via a waveguide associated with depth plane 2. Additionally, a wavefront divergence of any virtual object to be presented at a depth within range 240B—proximal to 240B—distal may be the same, and therefore be associated with depth plane 2. It will be appreciated that the sizes and shapes of the depth planes may be different than that illustrated in FIG. 18A. For example, the volumes defining the depth planes may have curved or other arbitrary shapes in some embodiments.

As described above, the display system may determine a fixation point upon which the user's eyes are fixated. If the fixation point falls within range 240B—proximal to 240B—distal, the display system may present virtual content with a wavefront divergence associated with depth plane 2 240B. If the user then fixates on a location that falls within a depth plane range encompassed by depth plane 1 240A, the display system may present content with a wavefront divergence associated with depth plane 1 240A. As described above, the display system may be a vari-focal display system, such that for any frame being presented to the user, a single depth plane is utilized. For example, one waveguide may be utilized to output all virtual content for each frame.

As illustrated, depth plane 1 240A and depth plane 2 240B are each indicated as being located at a particular nominal focal depth from the eyes of the user. For example, depth plane 2 240B is indicated as being set at a perceived nominal depth from the user, such that if depth plane 2 240B is selected to present virtual content, the virtual content would provide a cue to accommodation associated with the nominal depth. In this way, the perceived depth of the virtual content, only considering accommodation, will be the nominal depth. In some embodiments, each depth plane range may be of a same size (e.g., in diopters), and for example, encompass the same range of depths. As an example, depth plane 2 240B may be set at a nominal depth of 1 diopters, and encompass a depth plane range from 0.66 diopters to 1.33 diopters. Similarly, and as an example, depth plane 1 240A may be set at a nominal depth of 0.33 diopters, and encompass a depth plane range from 0 diopters to 0.66 diopters. In this way, the display system may encompass an overall depth plane range from 0 diopters to 1.33 diopters. While the example of FIG. 18A illustrates two depth planes, additional depth planes may be utilized that further break up the overall depth plane range and/or increase how close (e.g., proximal to the user) a user may fixate upon virtual content without exceeding the allowable accommodation-vergence mismatch (e.g., a proximal depth of the overall depth plane range may be set at 1.66 diopters, 2 diopters, and so on).

The depth plane range encompassed by each depth plane may optionally be based on an accommodation-vergence mismatch tolerance, such that the accommodation cues associated with presentation of virtual content at a depth plane will not be overly mismatched to vergence cues so as to cause viewer discomfort. With respect to the example of the depth plane range encompassed by depth plane 1 240A being from 0 diopters to 0.66 diopters, accommodation cues of virtual content being presented at depth plane 1 240A may correspond to 0.33 diopters. In this example, the threshold vergence-accommodation mismatch may be 0.33 diopters, in other examples the mismatch may be 0.2 diopters, 0.5 diopters, or any other suitable value to avoid viewer discomfort. As described above, the accommodation-vergence mismatch tolerance indicates a maximum difference in perceived depth of virtual content associated with vergence cues and accommodation cues. As the difference between the vergence cues and the accommodation cues increases, for example if the depth plane range of each depth plane is extended too far, the user may experience negative physiological responses. Therefore, the accommodation-vergence mismatch tolerance may be utilized to define the depth plane ranges encompassed by each depth plane.

In the example of FIG. 18A, the proximal range of depth plane 1 240A corresponds to the distal range of depth plane 2 240B. As described above, with respect to FIG. 16, a fixation point located near this boundary may be determined to either be encompassed by depth plane 1 240A or depth plane 2 240B due to uncertainty in precise location.

FIG. 18B illustrates a representation of the field of view 1800, with a depth overlap 1812 included. As illustrated, the distal boundary of depth plane 2 240B has been extended further in depth, such that adjusted depth plane 2 240B1 encompasses a range of depths previously covered solely by depth plane 1 240A. To ensure that adjusted depth plane 2 240B1 covers a same range of depths as in FIG. 18A, the proximal boundary of depth plane 2 240B1 has similarly been extended further in depth. For example, as described above the range of depths encompassed by a depth plane may be based on an accommodation-vergence mismatch tolerance. In some embodiments, the accommodation-vergence mismatch tolerance may depend on depths being encompassed. For example, the accommodation-vergence mismatch tolerance may be greater for a depth plane range further in depth from a user than a depth plane range closer in depth. For example, depth plane 1 240A may be configured to encompass a depth plane range that is larger in size than depth plane 2 240B1. Similarly, a nominal focal depth of a depth plane may be set at a location not in the middle of a distal boundary and a proximal boundary of depths encompassed by the depth plane. For example, a range of depths encompassed from a distal boundary to a nominal focal depth of a depth plane may be larger than a range of depths encompassed from the nominal focal depth to a proximal boundary of the depth plane, or vice-versa.

Since the proximal boundary—240B1 and distal boundary—240B1 of depth plane 2 has been shifted further in depth, a nominal focal depth of depth plane 2 240B1 has been similarly adjusted. For example, the nominal focal depth of depth plane 2 240B1 may be placed in the middle between the proximal boundary—240B1 and distal boundary—240B1. In this way, when depth plane 2 240B1 is selected to present virtual content, light being output from a waveguide associated with depth plane 2 240B1 will present the light with a wavefront divergence corresponding to the adjusted nominal focal depth. Furthermore, due to the shifting in depth of depth plane 2 240B1, a reduction in renderable volume 1814 may be caused. For example, a range of depths previously encompassed by depth plane 2 240B1, may now not be encompassed.

An example of determining a depth overlap 1812 follows. In the following example, an example accommodation-vergence mismatch tolerance is 0.33 diopters, and an example display system includes two depth planes with a first depth plane set at a nominal focal depth of 0.33 diopters and a second depth plane set at a nominal focal depth of 1 diopter.

To determine the nominal focal depth of the second depth plane, an indication of a fixation point determination error may be obtained. The nominal focal depth may then be determined based on the fixation point determination error.

For example, in some embodiments, the nominal focal depth may be equivalent to:

3*(accommodation-vergence mismatch tolerance)−2*(fixation point determination error)

With respect to an example fixation point determination error of 0.1 diopters, the nominal focal depth of depth plane 2 in the above example would be 0.79 diopters. Since the accommodation vergence mismatch is 0.33 diopters, the depth plane range of depth plane 2 would be 0.46 to 1.12 diopters.

Thus, the depth overlap would be 0.46 diopters to 0.66 diopters. For example, the distal end of depth plane 2 is determined to be 0.46 diopters and the proximal end of depth plane 1 would be 0.66 diopters.

As another example, with fixation point determination error of 0.25 diopters, the nominal focal depth of depth plane 2 would be 0.49, and the depth plane range of depth plane 2 would be 0.11 to 0.82 diopters.

The adjustment to the nominal focal depth, for example from 1 diopter to 0.49 diopters, may be a modification of the hardware included in a display system. For example, an adjustment of a waveguide representing depth plane 2 may be performed, such that wavefront divergence of light being output via the waveguide corresponds to a perceived depth of 0.49 diopters. Optionally, the waveguide may be adjustable via instructions being executed by the display system. As an example, in some embodiments, the out-coupling optical elements 570, 580, 590, 600, 610 described above with respect to FIG. 6 may be diffraction gratings adjustable via applied electric fields. In this way, as improvements are made with respect to the fixation point determination error, the resulting depth overlap may be correspondingly reduced. As will be described below, with respect to FIG. 19, the depth plane range encompassed by each depth plane, including the depth overlap, may be maintained as information accessible by the display system. When rendering content for presentation to the user, the display system may utilize this maintained information to select a depth plane at which to present virtual content.

Figure 19:
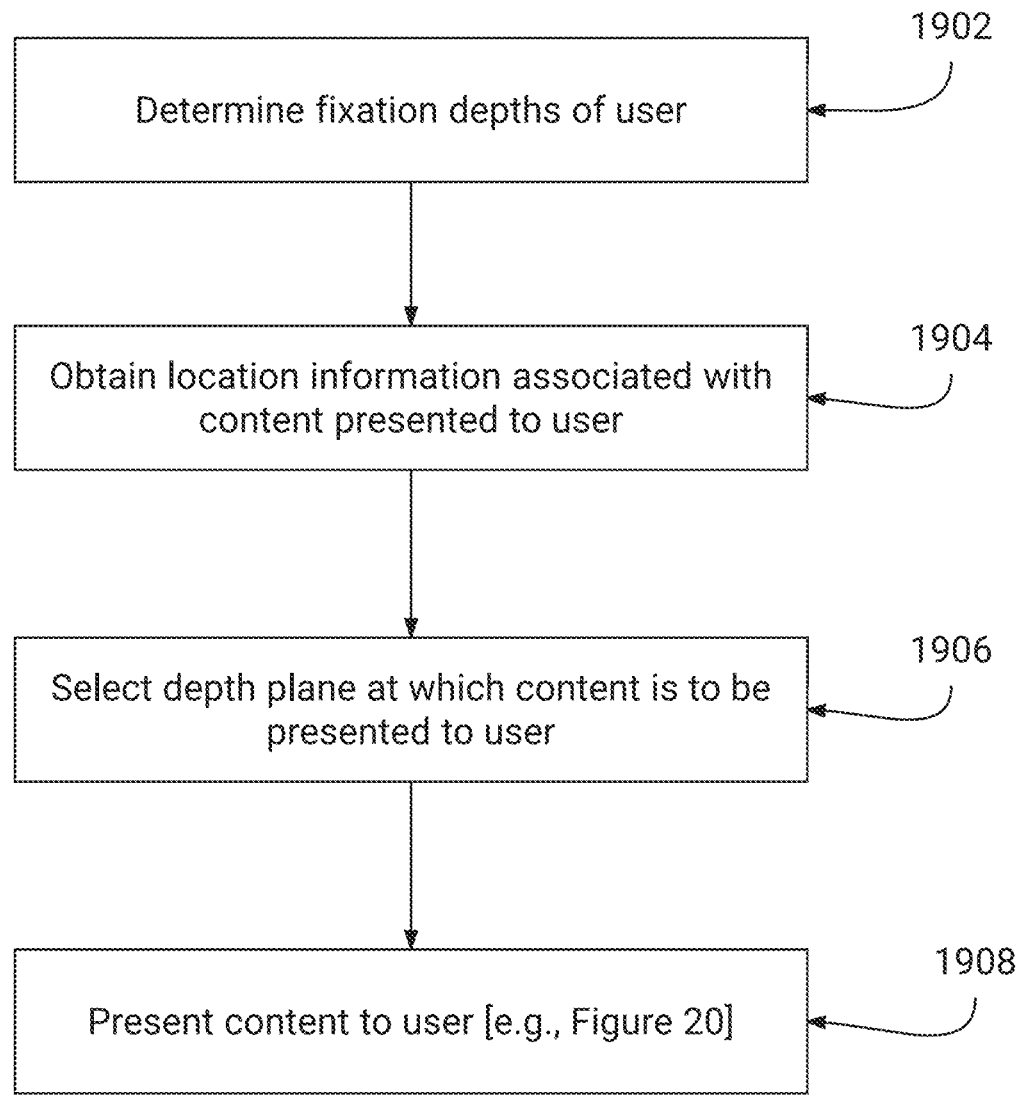
FIG. 19 is a flowchart of an example process for presenting virtual content.

FIG. 19 is a flowchart of an example process 1900 for presenting virtual content. For convenience, the process 1900 may be described as being performed by a display system (e.g., the wearable display system 60 (FIG. 9D), which may include processing hardware and software, and optionally may provide information to an outside system of one or more computers or other processing, for instance to offload processing to the outside system, and receive information from the outside system).

At block 1902, the display system determines fixation depths at which a user's eyes are fixating. For example, the display system may determine a three-dimensional fixation point of the user's eyes for each frame being rendered and presented to the user, or the display system may determine a threshold number of fixation points for each frame being rendered. As an example, a display rate of frames being presented to the user may be a particular rate (e.g., 30 Hz, 60 Hz, 120 Hz, and so on), and the display system may determine three-dimensional fixation points at a higher rate (e.g., 60 Hz, 120 Hz, 240 Hz, and so on). In this way, the display system may utilize the determined three-dimensional fixation points to determine an accurate location at which the user is fixating. For example, saccades, temporary eye movements, such as the user temporarily looking at something else, and so on, may be removed. As described above, the display system may include sensors to monitor information associated with the user's eyes (e.g., the orientation of the eyes). A non-exhaustive list of sensors includes infrared sensors, ultraviolet sensors, and visible wavelength light sensors. The sensors may optionally output infrared, ultraviolet, visible light, and/or polarized light onto the user's eyes, and determine reflections of the outputted light from the user's eyes. As an example, infrared light may be output by an infrared light emitter, and an infrared light sensor may be used to image the eye. It will be appreciated that the sensor, which may include a light emitter, may correspond to the imaging device 630 of FIG. 6.

The display system may utilize the sensors to track the user's fixation by determining a gaze associated with each eye (e.g., a vector extending from the user's eye, such as extending from the fovea through the lens of the eye), and an intersection of the gaze from each eye. For example, the display system may output infrared light on the user's eyes, and reflections from the eye (e.g., corneal reflections) may be monitored. A vector between a pupil center of an eye (e.g., the display system may determine a centroid of the pupil, for instance through infrared imaging) and the reflections from the eye may be used to determine the gaze of the eye. The intersection of the gazes may therefore be assigned as the three-dimensional fixation point. Optionally, the display system may utilize orientation information associated with the display system (e.g., information describing an orientation of the display system in three-dimensional space) when determining the fixation point.

As another example, the display system may utilize one or more imaging devices (e.g., cameras), along with a threshold number of lights, for example LEDs, per eye (e.g., 4 LEDs). The threshold number of LEDs may emit light that shines on each eye, and the one or more imaging devices may capture one or more images of each eye. A center (e.g., centroid) of a pupil of each eye may be determined based on the location of light from each LED as identified from images of the eye (e.g., 4 glints from the LEDS may be visible on the pupil of each eye in each image). The optical axis of each eye may then be determined based on the center of the pupil. As described above, prior to use of the display system, the display system may be calibrated for an individual user, and optionally the display system may maintain calibration (e.g., training) information for one or more users. For example, users may have user accounts associated with display systems, and optionally the display system may access calibration information being stored by an outside system in communication with the display system via a network (e.g., the internet). As an example of calibration, a user may be required to correlate a real-location of an object in space with eye gaze, such that a determination of a difference between the optical axis of their eyes and the visual axis of their eyes may be made. For instance, a target object may be moved to a threshold number of real-world positions (e.g., 5 positions, 9 positions, 12 positions), and a polynomial map may be determined that specifies coefficients to be utilized when determining gaze vectors. Utilizing the polynomial map, the user's visual axis may be more accurately determined. Optionally, instead of determining gaze vectors, the user's interpupillary distance between pupils of the user's eyes may be utilized (e.g., a distance between a center of the pupils of the two eyes). As an example, objects that are closer (e.g., proximal) to the user, may have a smaller interpupillary distance, and these interpupillary distances may be correlated to different depths along the z-axis.

In some embodiments, the display system may be configured to monitor determined fixation points to track objects that the user is viewing. For example, the display system may determine that the user is viewing a first virtual object based on a determined three-dimensional fixation point corresponding to a three-dimensional location at which the first virtual object is presented. Additionally, the display system may determine that the user is fixating at a location not corresponding to a virtual object, and may determine that a real-world object is likely located at the fixation point.

With continued reference to FIG. 19, at block 1904 the display system obtains location information associated with virtual objects for presentation to the user. Prior to rendering the virtual objects for presentation to the user (e.g., via outputs of waveguides, as described above), the display system may obtain three-dimensional location information associated with the virtual objects. For instance, as described above, the virtual objects may be presented to the user such that the content appears to be located in the real-world (e.g., the content may be located at different perceived depths within the user's field of view). It will be appreciated that the display system may include, or may have access to, a three-dimensional map of the ambient environment, including the intended locations of any virtual content in this ambient environment. With reference to this map, the display system may access and provide information specifying three-dimensional locations of virtual content within the user's field of view (e.g., locations within a display frustum, as illustrated in FIGS. 18A-18B).

As described above, location information for a virtual object may include a three-dimensional location. Based on the three-dimensional location, the virtual object may be associated with a particular perceived depth, such that if the user fixates on the virtual object, a particular depth plane may be selected to present all virtual content. For example, accommodation cues associated with a fixated upon virtual object will correspond to the particular perceived depth, as determined from the vergence cues.

At block 1906, a depth plane at which to present virtual objects is selected. As described above, with respect to FIGS. 17-18, the display frustum may include one or more depth overlaps that adjacent depth plane ranges may both encompass. To select a depth plane, the display system may identify whether the determined fixation depth (e.g., described above with respect to block 1902) falls within a depth plane range solely encompassed by a depth plane or falls within a depth plane range encompassed by a depth overlap. Stated another way, if the display system is presenting virtual objects at a particular depth plane, the display system may maintain presentation of the virtual object at that particular depth plane if the fixation depth is encompassed by the particular depth plane (e.g., within a depth plane range solely encompassed by the particular depth plane, or within a depth plane range included in a depth overlap encompassed by the particular depth plane and an adjacent depth plane).

With respect to the fixation depth falling within a depth plane range solely encompassed by a depth plane, the display system may select the depth plane to present the virtual objects. With respect to the fixation depth falling within a depth plane range encompassed by a depth overlap, for example including a range of depths encompassed by a first depth plane and a second depth plane, the display system may identify in some embodiments a most recent depth plane in which a determined fixation depth solely fell. For example, if prior to the current fixation depth one or more fixation depths were determined to fall within the depth overlap, the display system may identify a most recent fixation depth that fell either solely in the first depth plane or the second depth plane. The depth plane in which the identified fixation depth solely fell may then be selected to present the virtual objects. As described above, the depth overlap may represent an extension of the depth plane range encompassed by the first depth plane and the second depth plane. Thus, and as an example, if a fixation depth falls within the second depth plane, and if a fixation depth then falls within the depth overlap, the display system may retain selection of the second depth plane for presenting virtual content to the user.

Optionally, if the fixation depth falls within a particular depth overlap, and a most recent prior fixation depth fell within a depth plane range that does not encompass the particular depth overlap, the display system may select a depth plane that has a nominal focal depth closest to the fixation depth. For example, the user may fixate upon a virtual object positioned distally from the user, and may then rapidly fixate upon a virtual object positioned proximate to the user. In this example, a first depth plane may be selected while the user is fixating upon the distal object, and when the user fixates upon the proximate object, the user's fixation may fall within a particular depth overlap between a second depth plane and a third depth plane. Since the fixation depth is within the particular depth overlap, the display system may select either the second depth plane or the third depth plane based on whether a nominal focal depth of either depth plane is closer to the determined fixation depth. Optionally, the display system may select randomly from the among the depth planes.

In some embodiments, a confidence level may optionally be determined with respect to the fixation depth. For example, the display system may determine a confidence that the determined fixation depth accurately represents the user's actual fixation. For example, poor lighting conditions may increase a difficulty associated with determining the user's fixation depth and the confidence may be reduced. Furthermore, rapid eye movements may increase the difficulty of determining the fixation depth and the confidence may be reduced. Optionally, the display system may utilize the determined confidence to inform the selection of the depth plane at which to present virtual objects. For example, if the fixation depth falls within the depth overlap, the display system may select a depth plane that encompasses the depth overlap that has a nominal focal depth closer to the fixation depth. The display system may utilize the determined confidence along with a closeness of the fixation depth to an edge of the depth overlap. For example, if the fixation depth falls within the depth overlap, but is within a threshold depth to an edge of the depth overlap, the display system may select the depth plane that has a nominal focal depth closest to the edge. This threshold depth may be based on the confidence, such that as the display system's determined confidence increases, the threshold depth may be decreased. Furthermore, a size of the depth overlap may be adjusted based on the confidence. For example, as the confidence increases, there is less uncertainty with respect to the fixation depth and the depth overlap may be reduced such that there is less overlap between adjacent depth planes.

At block 1908, the display system presents the virtual objects to the user. For example, the display system may cause presentation at the selected depth plane such that accommodation cues of the presented virtual objects correspond to the selected depth plane. As described above, upon a switching from a first depth plane to a second depth plane, a perceptible flicker may be evident to the user. Similarly, the user will be required to accommodate to the light output being provided via the display system (e.g., change the shape of the lens of the eye based on the accommodation cues).

In some embodiments, as will be described below with respect to FIG. 20, the display system may monitor the user's eyes and delay switching depth planes until an event (e.g., a perception limiting event) occurs which decreases the user's perception of switching. In some embodiments, such an event may be the occurrence of (1) a blink or (2) a saccade. For example, upon identifying that a switching of depth planes is to occur, the display system may store information (e.g., a flag) indicating that upon detection of a blink or a saccade by the user, the display system is to perform the switch to the selected depth plane (e.g., as described in block 1906). Prior to performing the switch, the display system may render and present the virtual objects at the prior depth plane, and after a blink or saccade, may render and present the virtual objects at the selected depth plane. In this way, the display system may use the blink and/or saccade to mask the switching of the depth plane.

Additionally, in some embodiments, the display system may update presentation at a different (e.g., switched to) depth plane without determining that a blink or a saccade has been made by the user. For example, if the user does not perform a blink or a saccade within a threshold amount of time (e.g., 10 seconds, 30 seconds, 60 seconds), the display system may switch to presenting the virtual content at the different depth plane. Furthermore, if the different depth plane is at a nominal focal depth greater than a threshold depth from a nominal focal depth of a present depth plane, the display system may update presentation without waiting for a blink or a saccade. As an example, if a presently selected depth plane is at a nominal focal depth of 0.2 diopters, and a depth plane to be switched to is at a nominal focal depth of 1 diopters, the display system may update presentation without waiting for a blink or a saccade, due, e.g., to the potential for large accommodation-vergence mismatches if switching does not occur. Additionally, the threshold amount of time to wait for the user to perform the blink or saccade may be based on the difference in accommodation cues that are to be made to presented virtual objects. For example, as the difference in nominal focal depth between the two depth planes increases, the threshold amount of time may decrease.

Figure 20:
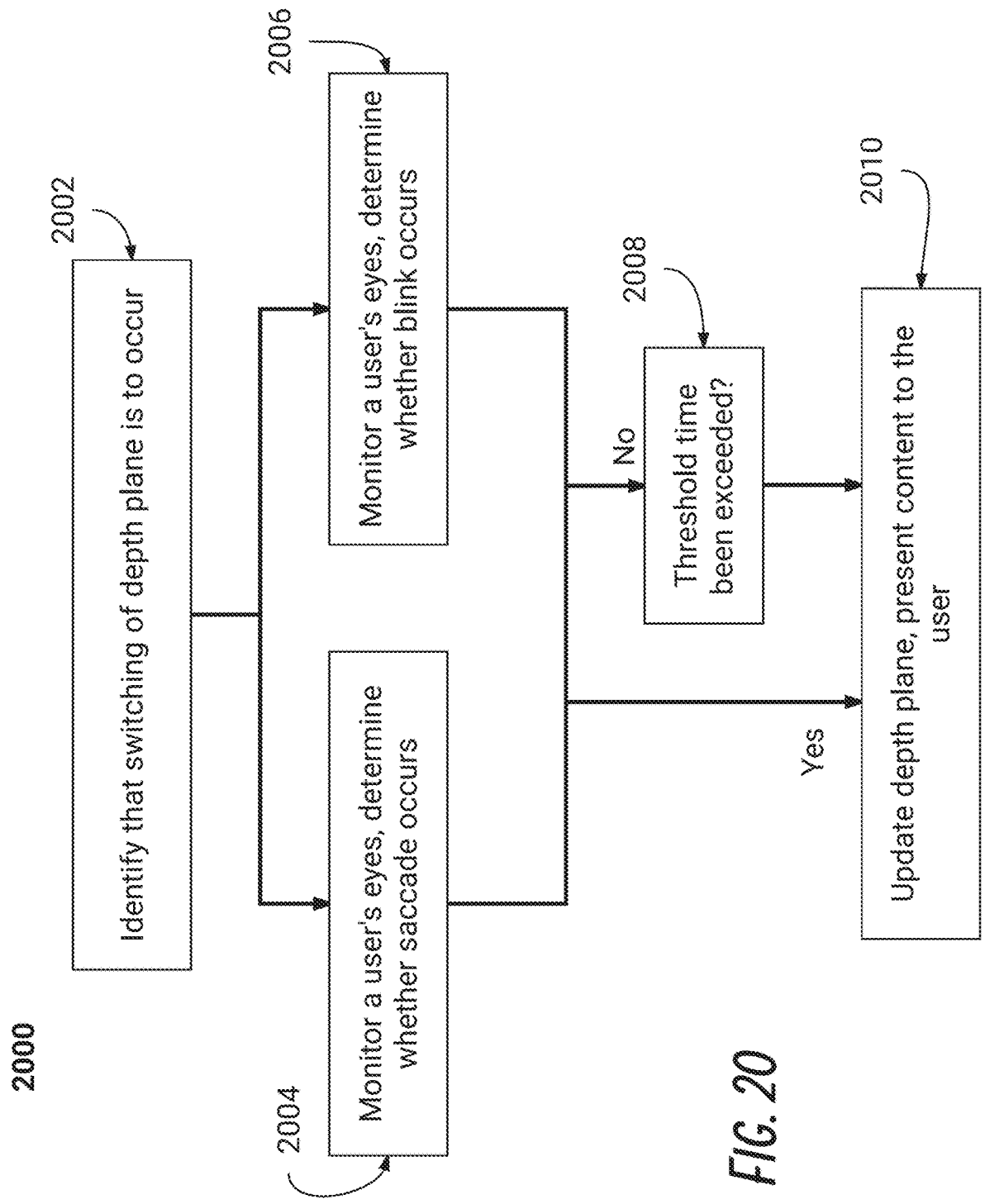
FIG. 20 is a flowchart of an example process for adjusting presentation of content to a user while the user's perception is limited.

FIG. 20 is a flowchart of an example process 2000 for switching depth planes to adjust the presentation of content to a user while the user's perception is limited. For convenience, the process 2000 may be described as being performed by a display system (e.g., the wearable display system 60, which may include processing hardware and software, and optionally may provide information to an outside system of one or more computers or other processing, for instance to offload processing to the outside system, and receive information from the outside system).

At block 2002, the display system obtains information indicating switching of a depth plane at which to present virtual objects is to occur. As described above, with respect to FIG. 19, the display system may determine fixation depths at which the user is fixating (e.g., monitor three-dimensional fixation points), and may further determine that the depth plane on which content is provided should be switched based on the determined fixation depths. For example, the user may be fixating at a depth encompassed by a first depth plane, and subsequently may fixate at a depth encompassed by a second depth plane. Upon determining that virtual objects should be presented on the second depth plane, the display system may store information indicating that the switch should be performed.

Next, the display system may determine whether an event that decreases the user's perception of the switch is occurring. Such an event may be the blinking of the user's eyelids and/or a saccade. For example, at block 2004, the display system determines whether the user has performed a blink. As an example, the display system may monitor the user's eyes, such as obtaining images of the user's eyes using the camera 630 (FIG. 6), and if pupils are no longer detected in the obtained images (e.g., as described above with respect to FIG. 19), the display system may determine that the user is blinking. As another example, an example eye tracking algorithm may be utilized (e.g., a starburst algorithm), and if the eye tracking algorithm fails to detect the user's pupil, or reflections of light from eyes, the display system may determine that the user is blinking.

Simultaneously with or alternatively to performing block 2004, the display system may perform block 2006. At block 2006, the display system determines whether the user has performed a saccade. A saccade represents a quick movement of the eyes during which the user's perception is limited. The display system may monitor for a saccade using, for example, images that are obtained of the user's eyes at greater than a threshold frequency (e.g., 500 Hz, 750 Hz, 1200 Hz, and so on). Since a duration of a saccade may be substantially shorter than a duration of a blink, a higher frequency imaging device may be utilized to detect the saccade, or the same sensor operated at a higher frequency could be used.

As an example of determining a saccade, the display system may determine a rotational velocity of pupils of the eyes, and utilize the rotational velocity, at least in part, to differentiate between a saccade and a smooth pursuit being performed by the eyes. The display system may obtain information indicating a head pose of the user, for example utilizing gyros, and if a measured rotational velocity of the pupils exceeds a threshold velocity associated with smooth pursuits, and the user's head is not moving greater than a threshold velocity, the display system may determine that a saccade is being performed.

At block 2010, the display system updates selection of a depth plane and presents virtual objects to the user. Upon detection of a blink or a saccade, the display system may perform the adjustment of the depth plane. Alternatively, at block 2008, if no blink or saccade is determined for greater than the threshold amount of time, the display system may perform the adjustment of the depth plane. Example threshold amounts of time may be 20 seconds, 30 seconds, 120 seconds, a user-selectable amount of time, and so on.

Additionally, as the display system waits for the user to perform a blink or a saccade, the user may fixate at a depth encompassed by a different depth plane than the adjusted depth plane. For example, with respect to block 2002, the user may fixate upon a depth such that an adjustment of a depth plane is to occur. While waiting for the user to perform a blink or a saccade to update selection of the depth plane to the adjusted depth plane, the user may fixate at a new fixation depth. The display system may then optionally update selection of the depth plane to a depth plane that encompasses the new fixation depth. Therefore, if the user then performs a saccade or a blink, the display system may select the depth plane that encompasses the new fixation depth.

Adjustments for the Viewer Eyestrain

As evident from FIGS. 11-15, there is a range of distances, typically very close to a viewer, where the accommodation-vergence mismatch is large, but where content may nevertheless be displayed. As discussed herein, such content may cause viewer discomfort and, as a result, may be undesirable. In some embodiments, display content that is determined to cause an unacceptable accommodation-vergence mismatch is modified to guard against viewer discomfort.

Figure 21A:
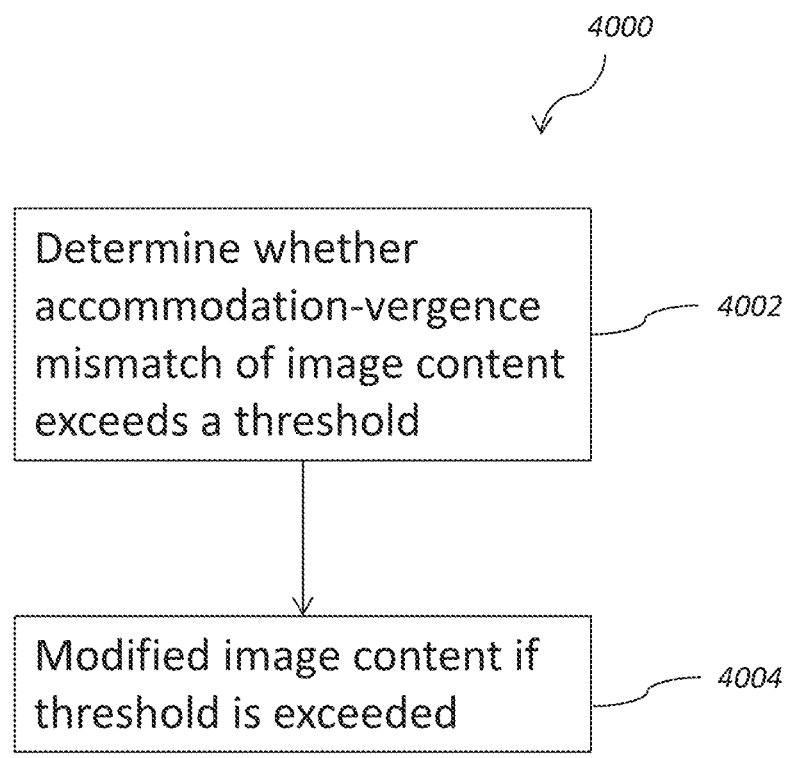
FIG. 21A illustrates an example of a method for maintaining viewer comfort when image content provides an accommodation-vergence mismatch that exceeds a threshold.

FIG. 21A illustrates an example of a method 4000 for maintaining viewer comfort when image content provides an accommodation-vergence mismatch that exceeds a threshold. At block 4002, image content is analyzed to determine whether the image content would result in an accommodation-vergence mismatch that exceeds a threshold. At block 4004, if the mismatch is determined to exceed the threshold, then the image content is modified. In some embodiments, the accommodation-vergence mismatch threshold is 0.5 dpt or less, or 0.33 dpt or less.

The modification of the image content may include one or more of the following: reducing a duration that the content is displayed, fading the image content (e.g., by reducing a resolution or spatial frequency of the image content), or simply not displaying the content that is causing the threshold to be exceeded. In some embodiments, where the resolution of the image content is decreased, the degree of the reduction in the resolution of the image content increases with increasing accommodation-vergence mismatch (e.g., as the content comes closer to the viewer).

Figure 21B:
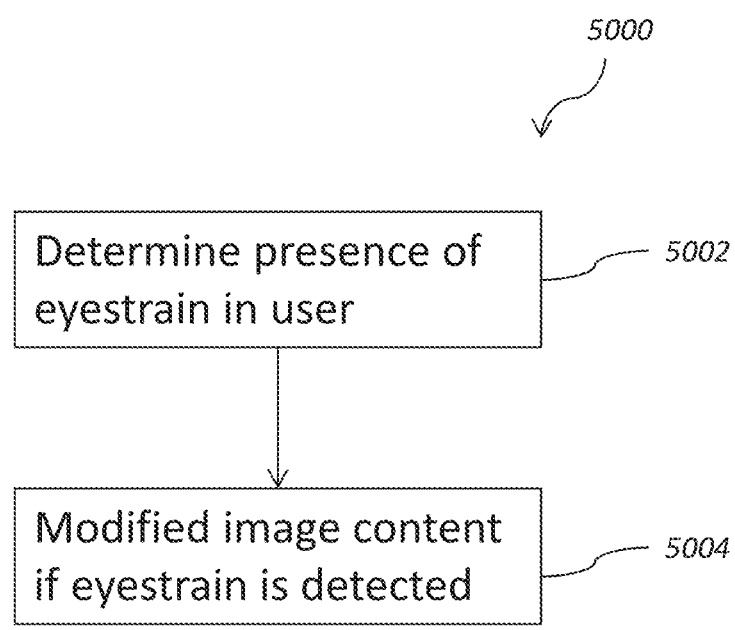
FIG. 21B illustrates an example of a method for reducing user eyestrain.

Even where the accommodation-vergence mismatch is acceptable, it will be appreciated that long-term usage of a head-mounted display device may nevertheless potentially cause some eyestrain. With reference now to FIG. 21B, an example of a method 5000 for reducing viewer eyestrain is illustrated. At block 5002, the presence of eye strain in the user is determined. At block 5004, if eyestrain is determined to be present, the image content is modified.

It will be appreciated that determining the presence of eyestrain may include imaging one or both eyes of the user, e.g., utilizing camera assembly 500 (FIG. 6). Determining the presence of eyestrain may include detecting one or more of pupil dilation, convergence oscillation, and pupil oscillation. In some embodiments, determining the presence of eyestrain comprises measuring a galvanic skin response. In some other embodiments, determining the presence of eyestrain comprises detecting a duration of exposure to image content having an accommodation-vergence mismatch greater than 0.25 dpt, greater than 0.33 dpt, or greater than 0.5 dpt. While the above-detected stressors may be caused by other issues, one or more of these methods for determining the presence of eyestrain may be implemented together, such that multiple variables are evaluated, in order to increase the accuracy of the determination of eyestrain. For example, one or more of the above-recited methods may be implemented, and evaluated, to determine whether the stressors are, at least in part, associated with use of the head-mounted display device. In addition, the occurrence of the stressors may be measured with respect to time and correlated with content being displayed by the display system and/or the duration of use of the display system to further increase the confidence that a stressor is the result of the display. In addition, determination of eyestrain may involve evaluating changes in one or more of these variables, or determine whether or not a variable exceeds a predetermined threshold value.

If eyestrain is determined to be present, the image content is modified to reduce eyestrain. In some embodiments, modifying the image content may include one or more of: increasing a size of features of the image content; reducing a resolution of the image content; and displaying the image content on a depth plane farther from the viewer than originally specified for the image content. For example, when displaying content for, e.g., a videogame, the content that the viewer is encouraged to focus on may be selected to be on a farther depth plane. In one example, rather than interacting with virtual objects in the immediate vicinity of the viewer, the game may be directed to provide interactions in which the objects are at a distance from the viewer.

In some embodiments, the determination of eyestrain and the modification of image content may be conducted continuously. Upon determining that eyestrain is no longer present, the image modification may cease. In some other embodiments, the image modification may be set to occur for a set duration, or until a certain event occurs (e.g., when the viewer playing a videogame reaches a new level).

Structures to Support and/or Balance the Head-Mounted Display

Figure 22A:
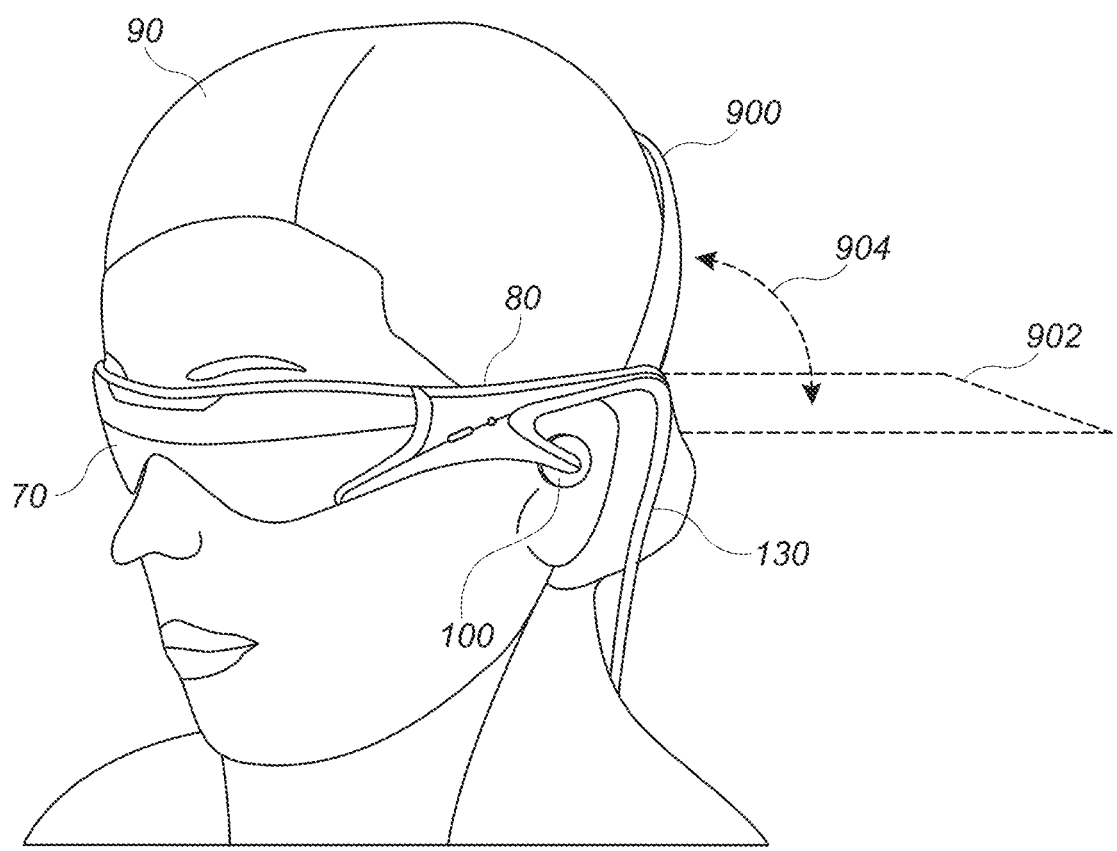
FIG. 22A illustrates an example of a head-mounted display with a support structure.
Figure 22B:
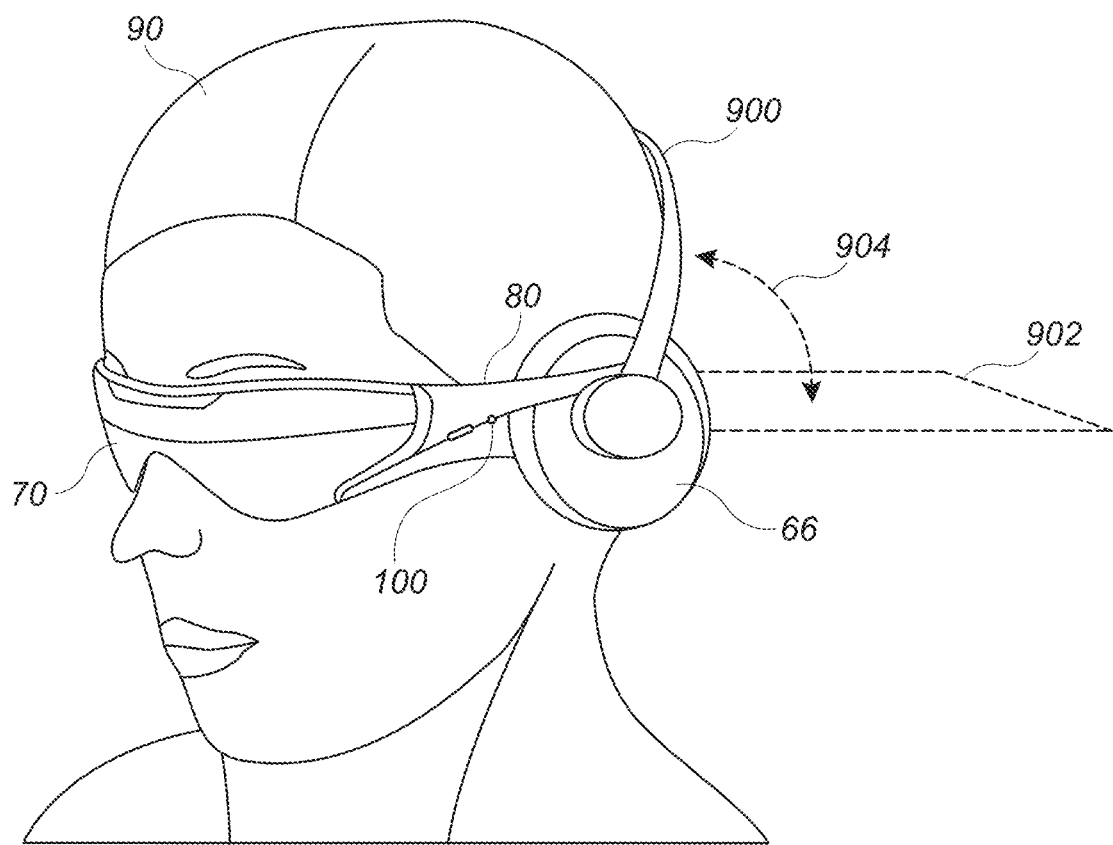
FIG. 22B illustrates an example of a head-mounted display with a support structure and integrated speakers.

With reference now to FIGS. 22A-22B, as discussed herein, a head-mounted display system may be bulky or heavy which may be detrimental to the comfort of the systems, particularly for long-term use. In addition, the distribution of weight of the system on a user's head may be uneven, which may also contribute to discomfort during long-term use. Advantageously, the head-mounted display systems may be outfitted with one or more support structures to increase user comfort.

FIG. 22A illustrates an example embodiment of a head-mounted display with a support structure. As shown in FIG. 22A, a user 90 is depicted wearing the head-mounted display system, which includes the frame structure coupled to a display 70 positioned in front of the eyes of the user 90.

A support structure 900 may be included as part of the head-mounted display system to distribute the weight of the display to different parts of the user 90's head, e.g., for weight balance and to reduce pressure points (such as on the nose of the user 90 due to weight distributed on the nose pads of the display system). In some embodiments, the support structure 900 is configured to extend from one side of a head of the user to the other side of the head. In some embodiments, the support structure 900 may optionally include a sound transducer (e.g., speaker) 100. The support structure 900 may be a band (e.g., a metal band and/or a plastic band) that is configured to extend from one side of the head to the other side of the head. In some embodiments, the support structure 900 crosses the head laterally from ear to ear. In some embodiments, the support structure 900 may cross the head longitudinally from the eyes to the back of the head. In some embodiments, the support structure may include multiple such support structures 900 that cross the head at intervals of angles either latitudinally or longitudinally.

The support structure 900 may cross the head of the user at different angles. FIG. 22A illustrates an example in which the support structure 900 crosses the head of the user latitudinally, that is, approximately from ear to ear. An angle 904 may be defined between a plane 902, which intersects the eyes and ears of the user, and a centerline of the support structure extending from one side of the head to the other side of the head of the user 90. In certain embodiments, the angle 904 is about 35-55 degrees. In some other embodiments, the angle 904 is about 80-100 degrees. In still other embodiments, the angle 904 may be approximately zero degrees when, for example, the support structure 900 is approximately in the plane 902 of the user's eyes and ears. As discussed herein, the head-mounted display system may comprise multiple such support structures 900 that cross the user's head at various angles 904. Moreover, in some embodiments, the position of the support structure 900 relative to the user's head may be moved such that the angle 904 relative to the plane 902 is adjustable.

The frame 80 may intersect the support structure 900 at various positions. In some embodiments, for example as shown in FIG. 22A, the frame 80 may intersect the support structure 900 above the user's ear. In some other embodiments, the frame 80 may intersect at the sound transducer 100. In still other embodiments, the frame 80 and support structure 900 may be integrated into a single structure that crosses the user's head as described herein. In some embodiments, the sound transducer 100 is attached to the frame 80. In some embodiments, the sound transducer may be attached to the support structure 900. In other embodiments (not shown), the sound transducer may be attached by other means or by a separate structure altogether. As described herein, in certain embodiments, the head-mounted display may comprise a frame 80 and a support structure 900 but not contain a sound transducer 100.

FIG. 22B illustrates an example embodiment where the sound transducer is a speaker that covers the ear of the user. A speaker may optionally be coupled to the frame 80 in the depicted configuration and positioned over the ear of the user and/or adjacent the ear canal of the user (in one embodiment, another speaker, not shown, is positioned over the ear and/or adjacent the other ear canal of the user to provide for stereo/shapeable sound control).

It will be appreciated that each of the processes, methods, and algorithms described herein and/or depicted in the figures may be embodied in, and fully or partially automated by, code modules executed by one or more physical computing systems, hardware computer processors, application-specific circuitry, and/or electronic hardware configured to execute specific and particular computer instructions. For example, computing systems may include general purpose computers (e.g., servers) programmed with specific computer instructions or special purpose computers, special purpose circuitry, and so forth. A code module may be compiled and linked into an executable program, installed in a dynamic link library, or may be written in an interpreted programming language. In some embodiments, particular operations and methods may be performed by circuitry that is specific to a given function.

Further, certain embodiments of the functionality of the present disclosure are sufficiently mathematically, computationally, or technically complex that application-specific hardware or one or more physical computing devices (utilizing appropriate specialized executable instructions) may be necessary to perform the functionality, for example, due to the volume or complexity of the calculations involved or to provide results substantially in real-time. For example, a video may include many frames, with each frame having millions of pixels, and specifically programmed computer hardware is necessary to process the video data to provide a desired image processing task or application in a commercially reasonable amount of time.

Code modules or any type of data may be stored on any type of non-transitory computer-readable medium, such as physical computer storage including hard drives, solid state memory, random access memory (RAM), read only memory (ROM), optical disc, volatile or non-volatile storage, combinations of the same and/or the like. In some embodiments, the non-transitory computer-readable medium may be part of one or more of the local processing and data module (140), the remote processing module (150), and remote data repository (160). The methods and modules (or data) may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The results of the disclosed processes or process steps may be stored, persistently or otherwise, in any type of non-transitory, tangible computer storage or may be communicated via a computer-readable transmission medium.

Any processes, blocks, states, steps, or functionalities in flow diagrams described herein and/or depicted in the attached figures should be understood as potentially representing code modules, segments, or portions of code which include one or more executable instructions for implementing specific functions (e.g., logical or arithmetical) or steps in the process. The various processes, blocks, states, steps, or functionalities may be combined, rearranged, added to, deleted from, modified, or otherwise changed from the illustrative examples provided herein. In some embodiments, additional or different computing systems or code modules may perform some or all of the functionalities described herein. The methods and processes described herein are also not limited to any particular sequence, and the blocks, steps, or states relating thereto may be performed in other sequences that are appropriate, for example, in serial, in parallel, or in some other manner. Tasks or events may be added to or removed from the disclosed example embodiments. Moreover, the separation of various system components in the embodiments described herein is for illustrative purposes and should not be understood as requiring such separation in all embodiments. It should be understood that the described program components, methods, and systems may generally be integrated together in a single computer product or packaged into multiple computer products.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than restrictive sense.

Indeed, it will be appreciated that the systems and methods of the disclosure each have several innovative aspects, no single one of which is solely responsible or required for the desirable attributes disclosed herein. The various features and processes described above may be used independently of one another, or may be combined in various ways. All possible combinations and subcombinations are intended to fall within the scope of this disclosure.

Certain features that are described in this specification in the context of separate embodiments also may be implemented in combination in a single embodiment. Conversely, various features that are described in the context of a single embodiment also may be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination. No single feature or group of features is necessary or indispensable to each and every embodiment.

It will be appreciated that conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise. Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one more example processes in the form of a flowchart. However, other operations that are not depicted may be incorporated in the example methods and processes that are schematically illustrated. For example, one or more additional operations may be performed before, after, simultaneously, or between any of the illustrated operations. Additionally, the operations may be rearranged or reordered in other embodiments. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products. Additionally, other embodiments are within the scope of the following claims. In some cases, the actions recited in the claims may be performed in a different order and still achieve desirable results.

Accordingly, the claims are not intended to be limited to the embodiments shown herein, but are to be accorded the widest scope consistent with this disclosure, the principles and the novel features disclosed herein.

What is claimed is:

1. A method implemented by a display system comprising one or more processors, the display system further comprising a head-mountable display configured to display image content with a range of vergence cues and one or more discrete accommodation cues to define the plurality of depth planes, wherein a possible number of vergence cues in a range of vergence cues is larger than the possible number of accommodation cues, the method comprising:
    selecting a waveguide of the head-mountable display to provide content on an associated depth plane, wherein the head-mountable display comprises a plurality of waveguides having optical power for providing the one or more accommodation cues; and
    causing the output of light, via the one or more selected waveguides, to display the content on the associated depth planes, the light providing one of the one or more accommodation cues,
    wherein the accommodation cues provided by the head-mountable display for any image content correspond to depth planes at less than optical infinity.

2. The method of claim 1, wherein a farthest one of the depth planes is within about 0.50 dpt. of optical infinity.

3. The method of claim 2, wherein a farthest one of the depth planes is within about 0.33 dpt. of optical infinity.

4. The method of claim 3, wherein a farthest one of the depth planes is within about 0.25 dpt. of optical infinity.

5. The method of claim 1, wherein the depth planes are separated by no more than about 0.7 dpt.

6. The method of claim 5, wherein the depth planes are separated by no more than about 0.5 dpt.

7. The method of claim 1, wherein each waveguide comprises incoupling optical elements configured to redirect incident light to propagate by total internal reflection inside the waveguide.

8. The method of claim 7, wherein the incoupling optical elements of each waveguide are configured to selectively redirect light having wavelengths corresponding to a single component color.

9. The method of claim 7, wherein, as seen in a top-down plan view, the incoupling optical elements of each waveguide are laterally spaced-apart from the incoupling optical elements of other waveguides.

10. The method of claim 7, wherein each waveguide further comprises outcoupling optical elements configured to redirect light propagating within each waveguide out of the waveguide.

11. The method of claim 7, further comprising a light projector system configured to direct image content to the incoupling optical elements of the waveguides, the light projector system comprising:
    a light emitter; and
    a spatial light modulator.

12. A method implemented by a display system comprising one or more processors, the display system further comprising a head-mountable display configured to display image content with a range of vergence cues and one or more discrete accommodation cues to define the plurality of depth planes, wherein a possible number of vergence cues in a range of vergence cues is larger than the possible number of accommodation cues, the method comprising:
    selecting a waveguide of the head-mountable display to provide content on an associated depth plane, wherein the head-mountable display comprises a plurality of waveguides forming a stack of waveguides, at least some of the stack of waveguides having optical power for providing the one or more accommodation cues; and
    providing, via the one or more selected waveguides, light to display the content on the associated depth planes, the light comprising one of the one or more discrete accommodation cues,
    wherein a farthest depth plane of the depth planes is within an accommodation-vergence mismatch tolerance of optical infinity, wherein the accommodation cues output by the head-mountable display for the farthest depth plane correspond to less than optical infinity and wherein the mismatch tolerance is about 0.5 dpt or less.

13. The method of claim 12, wherein a separation between an associated depth plane and a nearest associated depth plane of the stack is about twice the mismatch tolerance or less.

14. The method of claim 12, wherein a total number of depth planes is four or less.

15. The method of claim 12, wherein each waveguide comprises:
    incoupling optical elements configured to redirect incident light to propagate by total internal reflection inside the waveguide; and
    outcoupling optical elements configured to redirect light propagating within each waveguide out of the waveguide.

16. The method of claim 15, wherein the incoupling optical elements of each waveguide are configured to selectively redirect light having wavelengths corresponding to a single component color.

17. The method of claim 15, wherein, as seen in a top-down plan view, the incoupling optical elements of each waveguide are laterally spaced-apart from the incoupling optical elements of other waveguides.

18. The method of claim 15, further comprising a light projector system configured to direct image content to the incoupling optical elements of the waveguides, the light projector system comprising:
   a light emitter; and
   a spatial light modulator.

19. The method of claim 1, wherein the range of vergence cues comprises a vergence cue corresponding to optical infinity.

20. The method of claim 12, wherein the range of vergence cues comprises a vergence cue corresponding to optical infinity.

* * * * *